(12) United States Patent
Dispennette et al.

(10) Patent No.: US 6,430,031 B1
(45) Date of Patent: Aug. 6, 2002

(54) LOW RESISTANCE BONDING IN A MULTI-ELECTRODE DOUBLE LAYER CAPACITOR HAVING SINGLE ELECTROLYTE SEAL AND ALUMINUM-IMPREGNATED CARBON CLOTH ELECTRODES

(75) Inventors: John M. Dispennette, Oceanside; Edward Blank, San Diego; Robert W. Crawford, Menifee, all of CA (US)

(73) Assignee: Maxwell Electronic Components Group, Inc., San Diego, CA (US)

( * ) Notice: Subject to any disclaimer, the term of this patent is extended or adjusted under 35 U.S.C. 154(b) by 0 days.

(21) Appl. No.: 09/782,577

(22) Filed: Feb. 12, 2001

Related U.S. Application Data

(60) Division of application No. 09/377,327, filed on Aug. 18, 1999, now Pat. No. 6,233,135, which is a continuation-in-part of application No. 09/087,471, filed on May 29, 1998, now Pat. No. 5,907,472, which is a division of application No. 08/726,728, filed on Oct. 7, 1996, now Pat. No. 5,862, 035, which is a continuation-in-part of application No. 08/319,493, filed on Oct. 7, 1994, now Pat. No. 5,621,607.

(51) Int. Cl.[7] .................................................. H01G 9/00
(52) U.S. Cl. ....................... 361/502; 361/503; 361/504; 361/509; 361/512; 361/523
(58) Field of Search .................................. 361/502, 503, 361/504, 519, 521, 306.1, 510, 512, 523, 525, 528, 529

(56) References Cited

U.S. PATENT DOCUMENTS

| 2,800,616 A | 7/1957 | Becker et al. ............... 317/230 |
| 3,105,178 A | 9/1963 | Meyers ........................ 317/262 |

(List continued on next page.)

FOREIGN PATENT DOCUMENTS

| EP | 0680061 | 3/1965 |
| EP | 0112923 | 6/1983 |
| EP | 0134706 | 8/1984 |
| EP | 0207167 | 12/1985 |
| JP | 5599714 | 7/1980 |
| JP | 594114 | 1/1984 |
| JP | 59105312 | 6/1984 |
| JP | 63261817 | 10/1988 |
| JP | 64001220 | 1/1989 |
| JP | 64001222 | 1/1989 |
| JP | 153524 | 3/1989 |
| JP | 1201908 | 8/1989 |
| JP | 1298712 | 12/1989 |
| JP | 266917 | 3/1990 |
| JP | 2177525 | 7/1990 |
| JP | 2248025 | 10/1990 |
| JP | 256805 | 12/1990 |

(List continued on next page.)

OTHER PUBLICATIONS

Cheng et al.; "Preparation of Carbon Fibre Reinforced Aluminum Via Ultrasonic Liquid Infiltration Technique", *Materials Science and Technology*, 9, pp. 609–614 (Jul. 1993).

(List continued on next page.)
F

*Primary Examiner*—Dean A. Reichard
*Assistant Examiner*—Nguyen T Ha
(74) *Attorney, Agent, or Firm*—Fitch, Even, Tabin & Flannery

(57) ABSTRACT

An ultrasonically bonded electrical interconnection for use in a double layer capacitor consists of ten or more current collector foils bonded together and at least one dummy collector foil bonded to the ten or more current collector foils. The at least one dummy collector foil does not function as a current collector foil as a result of the ultrasonic bonding.

12 Claims, 25 Drawing Sheets

U.S. PATENT DOCUMENTS

| | | | |
|---|---|---|---|
| 3,536,963 A | 10/1970 | Boos | 317/230 |
| 3,648,126 A | 3/1972 | Boos et al. | 317/230 |
| 3,652,902 A | 3/1972 | Hart et al. | 317/230 |
| 3,700,975 A | 10/1972 | Butherus et al. | 317/230 |
| 4,313,084 A | 1/1982 | Hosokawa et al. | 323/370 |
| 4,438,481 A | 3/1984 | Phillips et al. | 361/433 |
| 4,562,511 A | 12/1985 | Nishino et al. | 361/324 |
| 4,597,028 A | 6/1986 | Yoshida et al. | 361/305 |
| 4,622,611 A | 11/1986 | Bennett et al. | 361/433 |
| 4,709,303 A | 11/1987 | Fujiwara et al. | 361/433 |
| 4,724,927 A | 2/1988 | Morimoto et al. | 361/433 |
| 5,065,286 A | 11/1991 | Kurabayashi, et al. | 361/502 |
| 5,072,335 A | 12/1991 | Kurabayashi et al. | 361/502 |
| 5,072,336 A | 12/1991 | Kurabayashi et al. | 361/502 |
| 5,072,337 A | 12/1991 | Kurabayashi et al. | 361/502 |
| 5,080,963 A | 1/1992 | Tatarchuk et al. | 428/225 |
| 5,086,373 A | 2/1992 | Kurabayashi et al. | 361/502 |
| 5,096,663 A | 3/1992 | Tatarchuk | 419/11 |
| 5,099,398 A | 3/1992 | Kirabayashi et al. | 361/502 |
| 5,102,745 A | 4/1992 | Tatarchuk et al. | 428/605 |
| 5,121,301 A | 6/1992 | Kurabayashi et al. | 361/502 |
| 5,136,472 A | 8/1992 | Tsuchiya et al. | 361/502 |
| 5,142,451 A | 8/1992 | Kurabayashi et al. | 361/502 |
| 5,150,283 A | 9/1992 | Yoshida et al. | 361/502 |
| 5,304,330 A | 4/1994 | Tatarchuk et al. | 264/61 |
| 5,450,279 A | 9/1995 | Yoshida et al. | 361/502 |
| 5,907,472 A * | 5/1999 | Farahmandi et al. | 361/502 |
| 6,201,685 B1 * | 3/2001 | Jerabek et al. | 361/502 |
| 6,212,061 B1 * | 4/2001 | Irwin et al. | 361/502 |
| 6,212,062 B1 * | 4/2001 | Day et al. | 361/502 |
| 6,256,190 B1 * | 7/2001 | Wei et al. | 361/502 |

FOREIGN PATENT DOCUMENTS

| | | |
|---|---|---|
| JP | 2297915 | 12/1990 |
| JP | 3038815 | 2/1991 |
| JP | 3141629 | 6/1991 |
| JP | 465814 | 3/1992 |
| JP | 4206914 | 7/1992 |
| JP | 4206916 | 7/1992 |
| JP | 5299295 | 11/1993 |
| JP | 6275469 | 6/1994 |

OTHER PUBLICATIONS

Foster, et al.; "New Highly Conductive Inorganic Electrolytes", *J. Electrochem. Soc.*, pp. 2682–2686, (Nov. 1988).

Farahmandi, et al.; "Optimization of Carbon Fibers Used in Electrochemical Capacitors for Electric Vehicle Applications", *The 36th Power Sources Conference, Cherry Hill, New Jersey*, pp. 23–26 (Jun. 6–9, 1994).

Farahmandi, et al.; "Bipolar Electrochemical Capacitors Based on Organic Electrolytes for Electric Vehicle Applications", *The Fourth International Seminar on Double Layer Capacitors and Similar Energy Storage Devices, Boca Raton, Florida*, (Dec. 12–14, 1994). arahmandi, et al.; "A Comparison of Electrochemical Capacitors Using Organic and Aqueous Electrolytic Solutions for Electric Vehicle Applications", *Third International Seminar on Double Layer Capacitors and Similar Energy Storage Devices, Deerfield Beach, Florida*, (Dec. 6–8, 1993).

Fujii; "KYNOL Novoloid Fibers", *Information Brochure*, (1990).

*Technical Notes*, "The Charcoal Cloth", (1987).

* cited by examiner

Goal: Reduce Transverse Resistance by Impregnating Aluminum Deep into Tow of each Bundle at Surface Points of Cloth

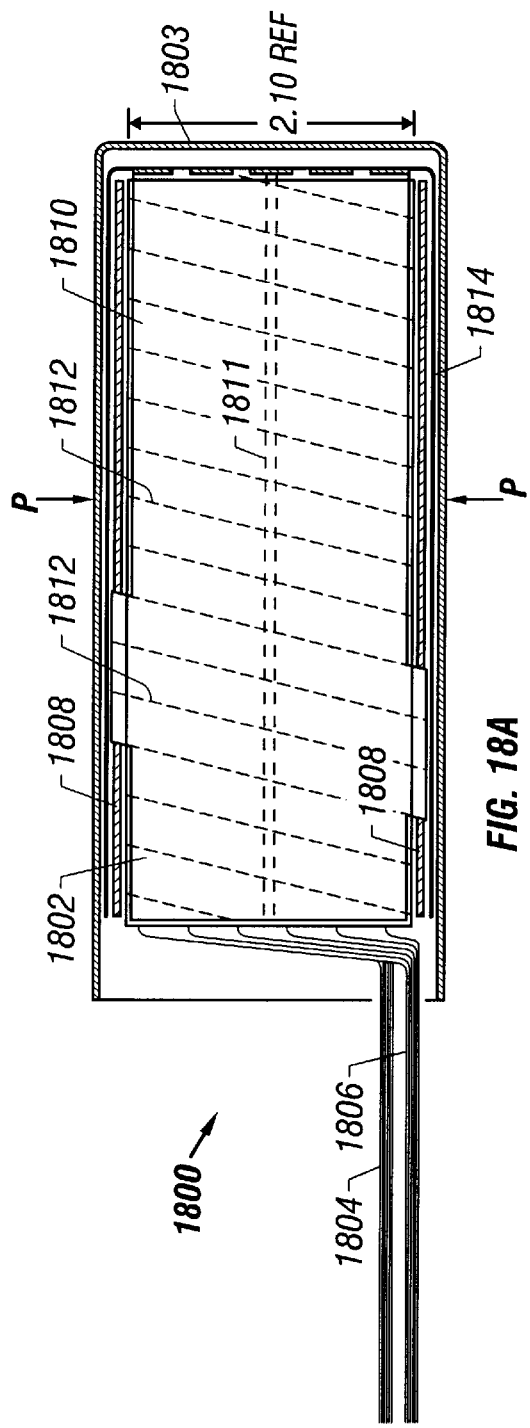
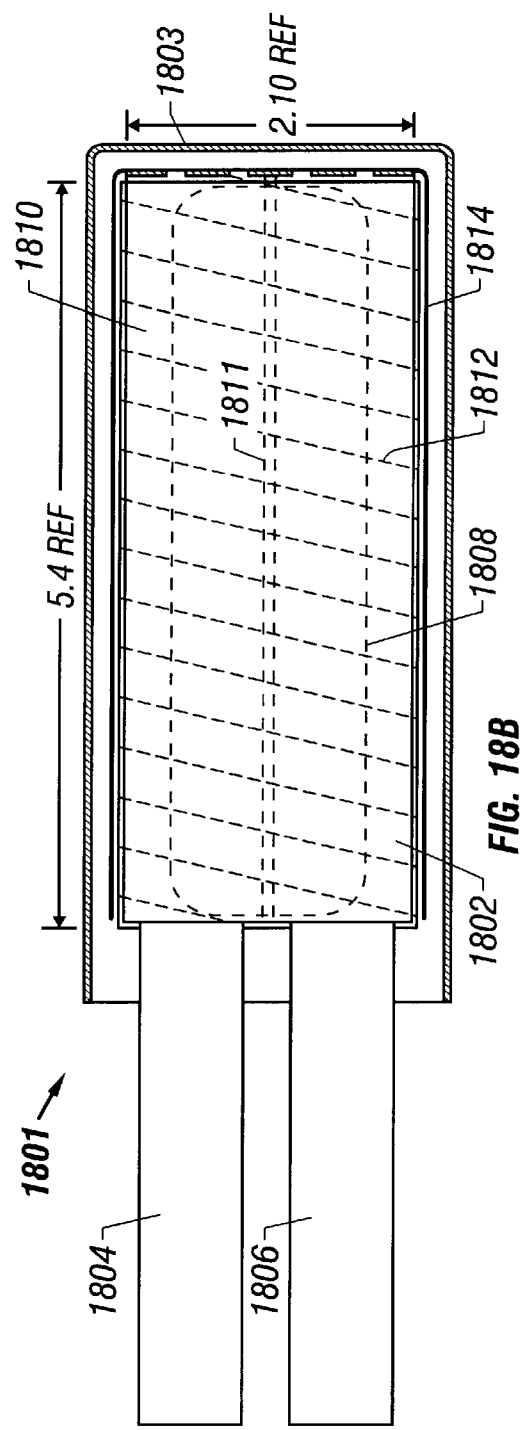

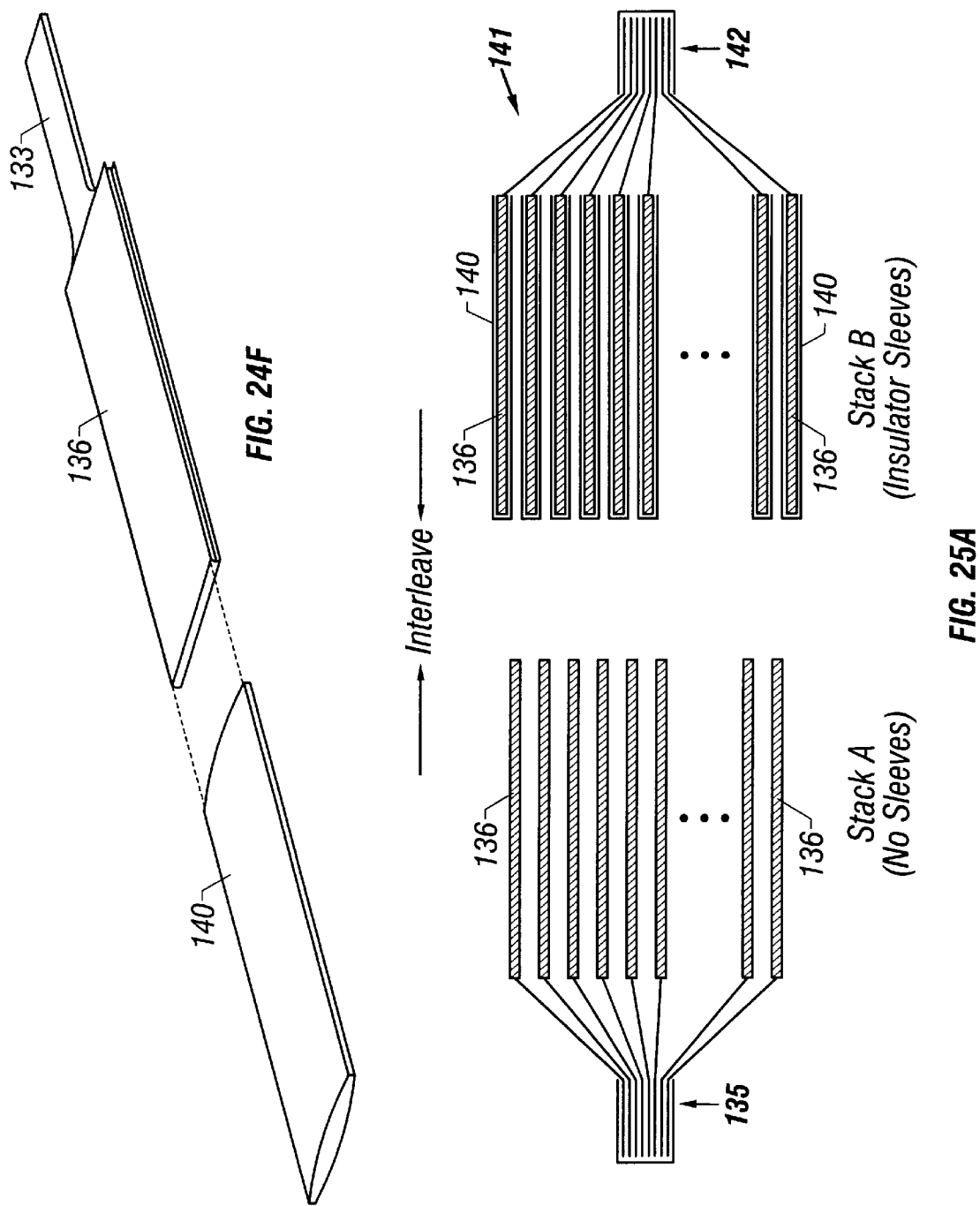

LOW RESISTANCE BONDING IN A MULTI-ELECTRODE DOUBLE LAYER CAPACITOR HAVING SINGLE ELECTROLYTE SEAL AND ALUMINUM-IMPREGNATED CARBON CLOTH ELECTRODES

This application is a Divisional Application of application Ser. No. 09/377,327 entitled MULTI-ELECTRODE DOUBLE LAYER CAPACITOR HAVING SINGLE ELECTROLYTE SEAL AND ALUMINUM IMPREGNATED CARBON CLOTH ELECTRODES, of Farahmandi, et al., filed Aug. 18, 1999, now U.S. Pat. No. 6,233,135, which is a Continuation-in-Part of application Ser. No. 09/087,471 entitled MULTI-ELECTRODE DOUBLE LAYER CAPACITOR HAVING SINGLE ELECTROLYTE SEAL AND ALUMINUM IMPREGNATED CARBON CLOTH ELECTRODES, of Farahmandi, et al. filed May 29, 1998, now U.S. Pat. No. 5,907,472, which is a Divisional Application of application Ser. No. 08/726,728, filed Oct. 7, 1996, now U.S. Pat. No. 5,862,035; which is a Continuation-In-Part of U.S. patent application Ser. No. 08/319,493, filed Oct. 7, 1994, now U.S. Pat. No. 5,621,607, all of which are incorporated herein by reference.

BACKGROUND OF THE INVENTION

The present invention relates generally to an electric double layer capacitor, and more particularly to a high performance double layer capacitor made with low-resistance aluminum-impregnated carbon-cloth electrodes and a high performance electrolytic solution.

Double layer capacitors, also referred to as electrochemical capacitors, are energy storage devices that are able to store more energy per unit weight and unit volume than traditional capacitors. In addition, they can typically deliver the stored energy at a higher power rating than rechargeable batteries. Double layer capacitors consist of two porous electrodes that are isolated from electrical contact by a porous separator. Both the separator and the electrodes are impregnated with an electrolytic solution. This allows ionic current to flow between the electrodes through the separator at the same time that the separator prevents an electrical or electronic (as opposed to an ionic) current from shorting the cell. Coupled to the back of each of the active electrodes is a current collecting plate. One purpose of the current collecting plate is to reduce ohmic losses in the double layer capacitor. If these current collecting plates are non-porous, they can also be used as part of the capacitor seal.

Double layer capacitors store electrostatic energy in a polarized liquid layer which forms when a potential exists between two electrodes immersed in an electrolyte. When the potential is applied across the electrodes, a double layer of positive and negative charges is formed at the electrode-electrolyte interface (hence, the name "double layer" capacitor) by the polarization of the electrolyte ions due to charge separation under the applied electric field, and also due to the dipole orientation and alignment of electrolyte molecules over the entire surface of the electrodes.

The use of carbon electrodes in electrochemical capacitors with high power and energy density represents a significant advantage in this technology because carbon has a low density and carbon electrodes can be fabricated with very high surface areas. Fabrication of double layer capacitors with carbon electrodes has been known in the art for quite some time, as evidenced by U.S. Pat. No. 2,800,616 (Becker), and U.S. Pat. No. 3,648,126 (Boos et al.).

A major problem in many carbon electrode capacitors, including double layer capacitors, is that the performance of the capacitor is often limited because of the high internal resistance of the carbon electrodes. This high internal resistance may be due to several factors, including the high contact resistance of the internal carbon-carbon contacts, and the contact resistance of the electrodes with a current collector. This high resistance translates to large ohmic losses in the capacitor during the charging and discharge phases, which losses further adversely affect the characteristic RC (resistance×capacitance) time constant of the capacitor and interfere with its ability to be efficiently charged and/or discharged in a short period of time. There is thus a need in the art for lowering the internal resistance, and hence the time constant, of double layer capacitors.

Various electrode fabrication techniques have been disclosed over recent years. For example, the Yoshida et al. patent (U.S. Pat. No. 5,150,283) discloses a method of connecting a carbon electrode to a current collector by depositing carbon powder and other electrical conductivity-improving agents on an aluminum substrate.

Another related approach for reducing the internal resistance of carbon electrodes is disclosed in U.S. Pat. No. 4,597,028 (Yoshida et al.) which teaches that the incorporation of metals such as aluminum into carbon fiber electrodes can be accomplished through weaving metallic fibers into carbon fiber preforms.

Yet another approach for reducing the resistance of a carbon electrode is taught in U.S. Pat. No. 4,562,511 (Nishino et al.) wherein the carbon fiber is dipped into an aqueous solution to form a layer of a conductive metal oxide, and preferably a transition metal oxide, in the pores of the carbon fibers. Nishino et al. also discloses the formation of metal oxides, such as tin oxide or indium oxide by vapor deposition.

Still another related approach for achieving low resistance is disclosed in U.S. Pat. Nos. 5,102,745, 5,304,330, and 5,080,963 (Tatarchuk et al.). The Tatarchuk et al. patents demonstrate that metal fibers can be intermixed with a carbon preform and sintered to create a structurally stable conductive matrix which may be used as an electrode. The Tatarchuk et al. patents also teach a process that reduces the electrical resistance in the electrode by reducing the number of carbon-carbon contacts through which current must flow to reach the metal conductor. This approach works well if stainless steel or nickel fibers are used as the metal. However, applicants have learned that this approach has not been successful when aluminum fibers are used because of the formation of aluminum carbide during the sintering or heating of the electrode.

Another area of concern in the fabrication of double layer capacitors relates to the method of connecting the current collector plate to the electrode. This is important because the interface between the electrode and the current collector plate is another source of internal resistance of the double layer capacitor, and such internal resistance must be kept as low as possible.

U.S. Pat. No. 4,562,511 (Nishino et al.) suggests plasma spraying of molten metals such as aluminum onto one side of a polarizable electrode to form a current collector layer on the surface of the electrode. Alternative techniques for bonding and/or forming the current collector are also considered in the '511 Nishino et al. patent, including arc-spraying, vacuum deposition, sputtering, non-electrolytic plating, and use of conductive paints.

The previously-cited Tatarchuk et al. patents (U.S. Pat. Nos. 5,102,745, 5,304,330, and 5,080,963) show the bonding of a metal foil current collector to the electrode by sinter bonding the metal foil to the electrode element.

U.S. Pat. No. 5,142,451 (Kurabayashi et al.) discloses a method of bonding the current collector to the surface of the electrode by a hot curing process which causes the material of the current collectors to enter the pores of the electrode elements.

Still other related art concerned with the method of fabricating and adhering current collector plates can be found in U.S. Pat. Nos. 5,065,286; 5,072,335; 5,072,336; 5,072,337; and 5,121,301 all issued to Kurabayashi et al.

It is thus apparent that there is a continuing need for improved double layer capacitors. Such improved double layer capacitors need to deliver large amounts of useful energy at a very high power output and energy density ratings within a relatively short period of time. Such improved double layer capacitors should also have a relatively low internal resistance and yet be capable of yielding a relatively high operating voltage.

Furthermore, it is also apparent that improvements are needed in the techniques and methods of fabricating double layer capacitor electrodes so as to lower the internal resistance of the double layer capacitor and maximize the operating voltage. Since capacitor energy density increases with the square of the operating voltage, higher operating voltages thus translate directly into significantly higher energy densities and, as a result, higher power output ratings. It is thus readily apparent that improved techniques and methods are needed to lower the internal resistance of the electrodes used within a double layer capacitor and increase the operating voltage.

SUMMARY OF THE INVENTION

The present invention addresses the above and other needs by providing a high performance double layer capacitor having multiple electrodes wherein the multiple electrodes are made from activated carbon that is volume impregnated with aluminum in order to significantly reduce the internal electrode resistance by decreasing the contact resistance between the activated carbon elements.

In one embodiment, the present invention can be characterized as a double layer capacitor, and method of making the same, comprising a capacitor case having a first part and a second part fastenable to each other to form a sealed capacitor case. The sealed capacitor case has a first capacitor terminal and a second capacitor terminal associated therewith. Also an electrode stack is contained within the sealed capacitor container. The electrode stack comprises a plurality of electrodes, each electrode includes a current collector foil and a carbon cloth impregnated with a specified metal in direct physical contact with the current collector foil. The current collector foils of alternating electrodes are coupled to the first capacitor terminal and the current collector foils of other alternating electrodes are coupled to the second capacitor terminal. A porous separator material is positioned between each electrode of the electrode stack. The porous separator material has pores therein through which ions may readily pass. The porous separator material prevents adjacent electrodes from electrically contacting each other. The electrode stack is maintained under a constant modest pressure within the sealed capacitor case. And a prescribed electrolytic solution is sealed within the sealed capacitor case, whereby the electrode stack is saturated and immersed within the electrolytic solution. In one embodiment, the porous separator material comprises a contiguous porous separator sheet that winds in between each electrode of the electrode stack in a serpentine manner.

In another embodiment, the present invention can be characterized as a wrapped electrode stack, and method of making the same comprising a plurality of impregnated carbon cloths, each having been impregnated with a specified metal; a plurality of current collector foils, each having a tab portion and a paddle portion; and a plurality of electrodes, each electrode comprising one of the plurality of current collector foils making direct contact with one of the plurality of impregnated carbon cloths. An electrode stack comprises the plurality of electrodes stacked such that alternating tab portions align with each other, forming a first set of aligned tab portions and a second set of aligned tab portions. And a contiguous porous separator sheet winds throughout the electrode stack in a serpentine manner between each of the plurality of electrodes and wrapped around the electrode stack, such that the contiguous porous separator sheet acts as an electrical insulator between adjacent electrodes of the electrode stack.

In a further embodiment, the present invention can be characterized as a double layer capacitor, and method of making the same. The double layer capacitor includes a capacitor case comprising a first part and a second part fastenable to each other to form a sealed capacitor case. The sealed capacitor case has a first capacitor terminal and a second capacitor terminal associated therewith. The double layer capacitor includes a first electrode comprising a first current collector foil and a first carbon cloth impregnated with a specified metal. The first current collector foil has a first tab portion and a first paddle portion. The first carbon cloth makes direct physical contact with the first paddle portion and the first tab portion is coupled to a first capacitor terminal. Also included is a second electrode comprising a second current collector foil and a second carbon cloth impregnated with the specified metal. The second current collector foil has a second tab portion and a second paddle portion. The second carbon cloth makes direct physical contact with the second paddle portion and the second tab portion is coupled to a second capacitor terminal. The first electrode and the second electrode are placed against each other, wherein a porous separator material separates the first electrode from the second electrode. The porous separator material wraps around the first electrode and the second electrode and acts as an electrical insulator between the first and second electrodes. The first electrode and the second electrode are compressed against each other with a modest constant pressure within the sealed capacitor case. And a prescribed electrolytic solution is sealed within the sealed capacitor case to saturate and immerse the first electrode, the second electrode, and the porous separator material with the prescribed electrolytic solution. Again, in one embodiment, the porous separator material may be a contiguous porous separator sheet that winds in between the first and second electrodes in a serpentine manner.

In yet another embodiment, the present invention can be characterized as a method of applying a modest constant pressure to an electrode stack comprising first providing an electrode stack. The electrode stack contains a plurality of electrodes, each electrode having a current collector foil and a metal impregnated carbon cloth placed thereagainst, and a contiguous porous separator sheet that winds throughout the electrode stack in a serpentine manner. A shim is placed against an exterior of the electrode stack, the shim having a specified thickness. And the electrode stack and the shim are inserted into a container, the container having an interior dimension less than the exterior dimension of the electrode stack having the shim placed thereagainst.

In yet another further embodiment, the present invention can be characterized as a method of ultrasonically bonding multiple foils together to form an electrical interconnection, and electrical interconnection formed, including the steps of: stacking a plurality of metal foils to be bonded together, each of the plurality of metal foils being coupled to an electrical device; positioning at least one dummy metal foil against the plurality of metal foils; and using a high frequency horn for ultrasonically bonding the plurality of metal foils and the at least one dummy metal foil together, the high frequency horn being directed at the least one dummy metal foil, wherein the plurality of metal foils remain intact and are bonded to each other and the at least one dummy metal foil.

In still another embodiment, the present invention can be characterized as a carbon cloth electrode for use in a capacitor comprising a carbon cloth comprising a plurality of twisted carbon fiber bundles that are woven together to form the carbon cloth. Each of the plurality of twisted carbon fiber bundles comprises a plurality of carbon fiber bundles which comprise a plurality of carbon fibers. Each of the plurality of carbon fiber bundles are twisted together such that an exterior of each of the plurality of carbon fiber bundles slightly frays to form the respective ones of the plurality of twisted carbon fiber bundles. The use of the plurality of twisted carbon fiber bundles reduces the transverse resistance of the carbon cloth electrode.

BRIEF DESCRIPTION OF DRAWINGS

The above and other aspects, features, and advantages of the present invention will be more apparent from the following more particular description thereof, presented in conjunction with the following drawings and Appendix, wherein:

FIGS. 18A and 18B are a side and top view, respectively, of the brick assembly of FIG. 14 having been compressed inside the capacitor container of FIGS. 16A and 16B;

FIGS. 24A–24F illustrate a method for making a stack of electrodes for use in a multi-electrode double layer capacitor according to one embodiment of the present invention; for example, the "clamshell" design;

FIG. 25A illustrates how the individual electrodes of two electrode stacks, made as illustrated in FIGS. 24A–24F, one stack of which has a porous separator positioned against each electrode as shown in FIG. 24F, are interleaved to form an electrode assembly;

Figure 1:
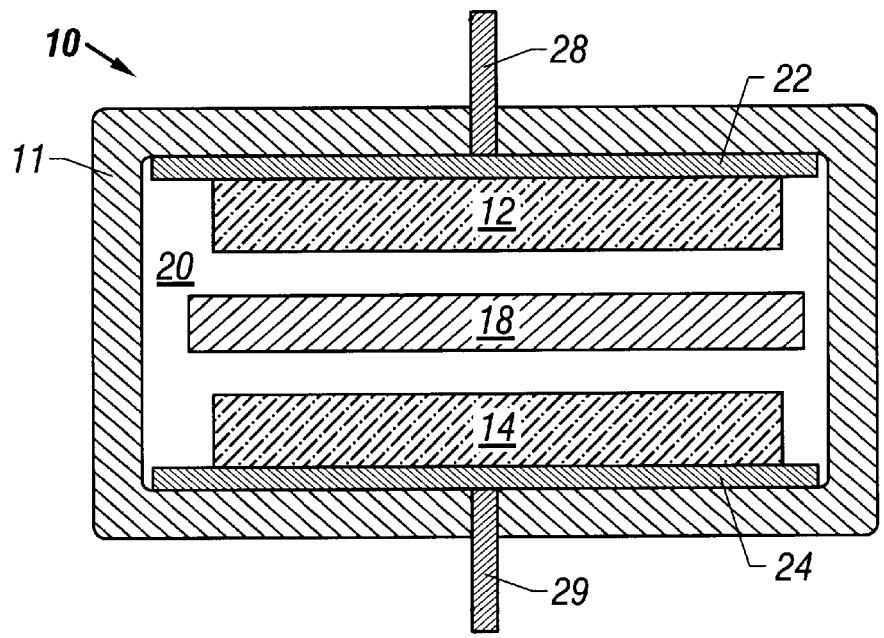
FIG. 1 is a sectional view of a single cell high performance double layer capacitor made in accordance with the present invention.

Appendix A sets forth the presently-used acceptance test procedures to test the performance of a capacitor after fabrication and assembly in accordance with FIGS. 24A through 26 and 28A and 28B.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Referring to FIG. 1, a single cell, high performance double layer capacitor 10 is illustrated including a cell holder 11, a pair of aluminum/carbon composite electrodes 12 and 14, an electronic separator 18, an electrolyte 20, a pair of current collector plates 22 and 24, and electrical leads 28 and 29, extending from the current collector plates 22 and 24.

The pair of aluminum/carbon composite electrodes 12 and 14 are preferably formed from a porous carbon cloth preform or carbon paper preform which is impregnated with molten aluminum. The invention as described is not limited to using molten aluminum, and can use another suitable metal, such as copper or titanium. The porosity of the aluminum/carbon composite electrodes 12 and 14 must be closely controlled during the impregnation process to subsequently permit a sufficient amount of the electrolyte 20 to be introduced into the double layer capacitor 10 and penetrate the pores of the carbon fibers.

The pair of current collector plates 22 and 24 are attached to the back of each aluminum/carbon composite electrode 12 and 14. Preferably, the current collector plates 22 and 24 are thin layers of aluminum foil.

An electronic separator 18 is placed between the opposing aluminum/carbon composite electrodes 12 and 14. The electronic separator 18 is preferably made from a highly porous material which acts as an electronic insulator between the aluminum/carbon composite electrodes 12 and 14. The purpose of the electronic separator 18 is to assure that the opposing electrodes 12 and 14 are never in contact with one another. Contact between electrodes results in a short circuit and rapid depletion of the charges stored in the electrodes. The porous nature of the electronic separator 18 allows movement of the ions in the electrolyte 20. The preferred electronic separator 18 is a porous polypropylene or polyethylene sheet approximately 1 mil (0.001 inches) thick. If desired, the polypropylene or polyethylene separator may be initially soaked in the electrolyte 20 prior to inserting it between the aluminum/carbon composite electrodes 12 and 14, although such pre-soaking is not required.

The cell holder 11 may be any known packaging means commonly used with double layer capacitors. Several types of packaging are described hereinafter. In order to maximize the energy density of the double layer capacitors, it is an advantage to minimize the weight of the packaging means. Packaged double layer capacitors are typically expected to weigh not more than 25 percent of the unpackaged double layer capacitor. Electrical leads 28 and 29 extend from the current collector plates 22 and 24 through the cell holder 11 and are adapted for connection with an electrical circuit (not shown).

Figure 2A:
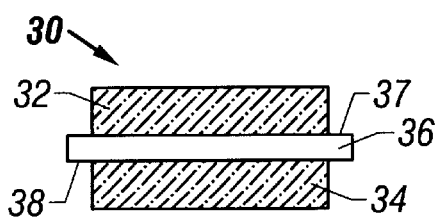
FIG. 2A is a sectional representation of a bipolar aluminum/carbon composite electrode made in accordance with the invention.
Figure 2B:
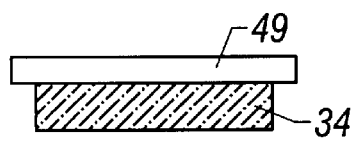
FIG. 2B illustrates an upper portion of a bipolar stack of FIG. 2A.
Figure 2C:
FIG. 2C illustrates a lower portion of a bipolar stack of FIG. 2A.
Figure 3:
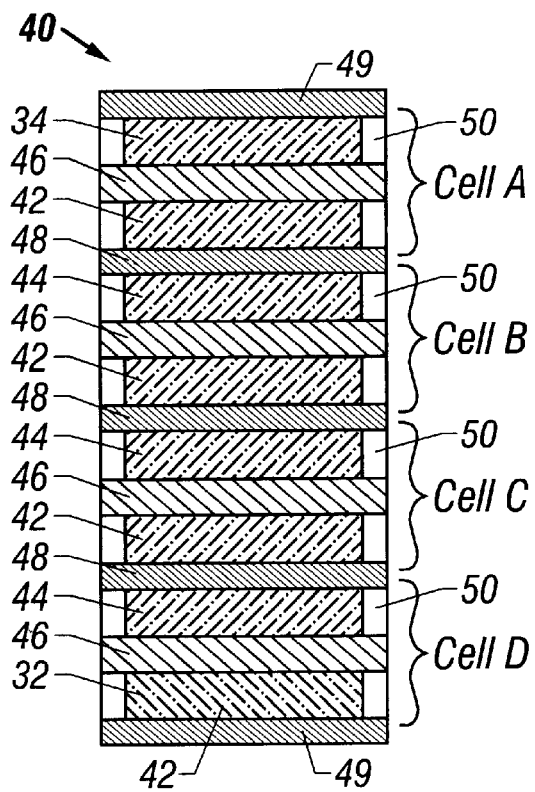
FIG. 3 is a sectional representation of a series bipolar stack of high performance bipolar type double layer capacitors of the type shown in FIG. 2A.

A bipolar aluminum/carbon composite electrode 30, as shown in FIG. 2A, may be utilized in combination with end portions as shown in FIGS. 2B and 2C in a corresponding series stack of such electrodes to form a high performance bipolar double layer capacitor 40 as shown in FIG. 3. The aluminum/carbon composite electrode 30 (FIG. 2A) comprises a polarized aluminum/carbon composite body separated with a non-porous current collector plate 36. Attached to one surface 37 of the current collector plate 36 is a charged electrode 32 for a first electrode. Attached to the opposite surface 38 of the current collector plate 36, is an oppositely charged electrode 34. Such electrode structure may then be stacked as shown in FIG. 3, with a series stack of the bipolar capacitors as shown in FIG. 2A being stacked between the two end portions of the stack shown in FIGS. 2B and 2C, thereby forming a bipolar double layer capacitor 40. As seen in FIG. 3, if the first electrode 34 is a negative electrode for a first capacitor cell "A", the second (or bottom) electrode of cell "A", electrode 42, becomes oppositely charged, i.e., becomes a positive electrode. The same charge of electrode 42 carries over to a first electrode 44 of cell "B", i.e., electrode 44 of cell "B" becomes positively charged relative to electrode 34. This causes the bottom electrode 42 of cell "B" to become oppositely charged, i.e., negatively charged relative to electrode 44 of cell "B". A series stack of the high performance bipolar double layer capacitors 40 thus includes a plurality of cells (A, B, C, and D) which are connected in series. Each cell includes a pair of aluminum impregnated carbon composite porous electrodes. Cell "A" includes electrodes 34 and 42 facing one another with an ionically conductive separator 46 disposed between them. Cells "B" and "C" include electrodes 44 and 42 facing one another with an ionically-conductive separator 46 disposed between them. Cell "D" includes electrodes 44 and 32 facing one another with an ionically-conductive separator 46 disposed between them. A plurality of internal non-porous current collectors 48 are placed between each cell, having two adjoining polarized electrodes 42 and 44 on each side thereof. Exterior current collecting plates 49 are placed at each end of the stack. A sufficient amount of an electrolyte 50 is introduced within each cell such that the electrolyte 50 saturates the composite electrodes 32, 34, 42 or 44 and separator 46 within each cell.

The individual carbon electrode structures 32, 34, 42 and/or 44 are preferably formed in a manner similar to the process described elsewhere herein. Each electrode structure is fabricated from a carbon cloth preform or carbon paper preform which is volume impregnated with molten aluminum. As is explained more fully below, such impregnation serves to significantly reduce the electrode resistance.

More particularly, each of the electrode structures 32, 34, 42 and/or 44 is fabricated from a carbon cloth preform or carbon paper preform which is impregnated with molten aluminum. The porosity of the electrode structures 32, 34, 42 and/or 44 should be controlled during the impregnation process to subsequently permit a sufficient amount of the electrolyte 50 to be introduced into the capacitor cell and penetrate the pores of the carbon fibers.

The aluminum impregnated carbon composite electrodes 32, 34, 42 and/or 44 are sufficiently porous, and preferably have a sufficient aluminum impregnant within the activated carbon fibers such that the equivalent series resistance of each electrode when used in a 2.3–3.0 volt cell is about 1.5 $\Omega cm^2$ or less, and the capacitance of each composite electrode 42 and 44 is approximately 30 F/g or greater. Such large capacitance is achievable due to the large surface area made available through the use of activated carbon fibers, and the very small separation distance between the capacitor layers, as explained more fully below.

The internal current collector plates 48 of each bipolar electrode are preferably non-porous layers of aluminum foil designed to separate the electrolyte 50 between adjacent cells. The exterior current collecting plates 49 are also non-porous such that they can be used as part of the external capacitor seal, if necessary.

An electronic separator 46 or porous separator is placed between the opposing electrode structures 42 and 44 within a particular internal capacitor cell, or between opposing electrode structures 34 and 42, or 44 and 32, of end capacitor cells. The electronic separator 46 is preferably a porous polypropylene-based or polyethylene-based sheet.

Many of the attendant advantages of the present double layer capacitor result from the preferred methods of fabricating the carbon electrode structures, the preferred method of connecting the current collector, and the use of high performance electrolytes. Each of these aspects of the invention are discussed in further detail below.

As identified above, the carbon electrode structure is preferably made from a porous carbon fiber cloth preform or carbon fiber paper preform which is impregnated with molten aluminum. The preform can be fabricated from any suitable activated carbon fiber material such as carbon fiber felt or other activated carbon fiber substrates having a sufficient porosity to receive the impregnated molten aluminum and electrolytic solution.

The aluminum, or alternatively, copper or titanium, is volumetrically impregnated deep into the tow of the bundles of carbon fibers within the carbon cloth, as explained more fully below in connection with FIGS. 9A, 9B, 9C, and 9D. The result of impregnating the aluminum into the tow of the fibrous carbon bundles is a low resistance current path between the activated carbon elements within the electrode. However, with the low resistance current path, the electrode structure also remains sufficiently porous so that an electrolytic solution, preferably a non-aqueous electrolytic solution, infiltrates the pores of the activated carbon fibers.

The fabrication process of the aluminum/carbon composite electrodes of the double layer capacitor starts with the fabrication of a carbon fiber electrode preform. The carbon fiber electrode preform is typically manufactured paper or cloth preform using high surface area carbon fibers. The preferred carbon fiber preform is carbon fiber cloth. The carbon fiber cloth preform is preferably a commercially available cloth which uses woven carbon fibers also having a surface area no less than 100 $m^2/g$ and typically approximately 500 to 3000 $m^2/g$ and having a diameter of approximately 8–10 $\mu m$. The carbon fiber cloth preform is typically has more structural stability than the carbon fiber paper preform. The surface area and other dimensions of the carbon fibers, however, can be tailored to meet the requirements of the application in which it is used.

Impregnation of the carbon fiber cloth with molten aluminum is preferably accomplished using a wire arc spraying or plasma spraying technique, as described more fully below in connection with FIGS. 8A, 8B, and 8C. Wire arc spraying molten metal onto the surface of a carbon fiber preform has previously been used in double layer capacitor construction as a means for forming a current collector at the surface of the carbon fiber preform. Thus, by definition, involves depositing a thick substantially impermeable layer of metal onto the surface of the carbon fiber cloth. However, to applicants' knowledge, wire arc spraying has never been done to volume impregnate the carbon fiber preform with the sprayed metal so as to reduce the contact resistance between the activated carbon elements, thereby forming a very low resistance carbon/metal composite electrode made up of both the activated carbon and the impregnated metal.

The wire arc spray technique is controlled to penetrate into the carbon fiber cloth preform as described more fully below in connection with FIGS. 9A, 9B, 9C, and 9D. Control is accomplished by adjusting the electrical current to the spray unit, the voltage, the pressure of the molten aluminum, the distance of the wire arc spray unit from the carbon fiber preform, the sweep of the wire arc spray unit, and the ambient airflow during the spraying process. Advantageously, the bulk resistivity of the carbon cloth is dramatically reduced when wire arc spraying is used to impregnate the carbon cloth with aluminum, as described more fully below.

Additional details and information regarding the bipolar double layer capacitor stack shown in FIG. 3, and the electrodes used therein, may be found in patent application, Ser. No. 08/319,493, for a MULTI-ELECTRODE DOUBLE LAYER CAPACITOR HAVING SINGLE ELECTROLYTE SEAL AND ALUMINUM IMPREGNATED CARBON CLOTH ELECTRODES, by Farahmandi, et al., filed Oct. 7, 1994, now U.S. Pat. No. 5,621,607, which application is incorporated herein by reference.

Single Cell, Multi-Electrode Double Layer Capacitor

At this point, a more detailed description of a single cell, multi-electrode double layer capacitor will be presented in conjunction with a more detailed description of FIGS. 4A through 29. A key feature of such a double layer capacitor, as will become more apparent from the description that follows, is the use of multiple electrodes (or, in one embodiment, a electrode stack or a winding assembly) connected in parallel within a capacitor package that requires only a single electrolyte seal. Because only one electrolyte seal is required, it is appropriate to refer to such capacitor as a "single cell" capacitor since it is the electrolyte seal which normally defines what comprises a cell. Such a single cell, multi-electrode double layer capacitor configuration represents the best mode for practicing the invention at the present time. It is to be emphasized, however, that the invention is not intended to be limited to such mode or embodiment. Rather, it is contemplated that the invention extend to all double layer capacitors that use low-resistance carbon electrodes in conjunction with aluminum of the type described herein, regardless of the specific electrode configuration that may eventually be used to make the capacitor, and regardless of the specific high conductivity electrolytic solution that is employed. Such electrode configurations may include, e.g., multiple electrodes connected in parallel in a single cell (as is described more fully herein); a pair of electrodes arranged in a spiral pattern in a single cell; electrodes connected in series in stacked cells; or other electrode configurations.

Figure 4A:
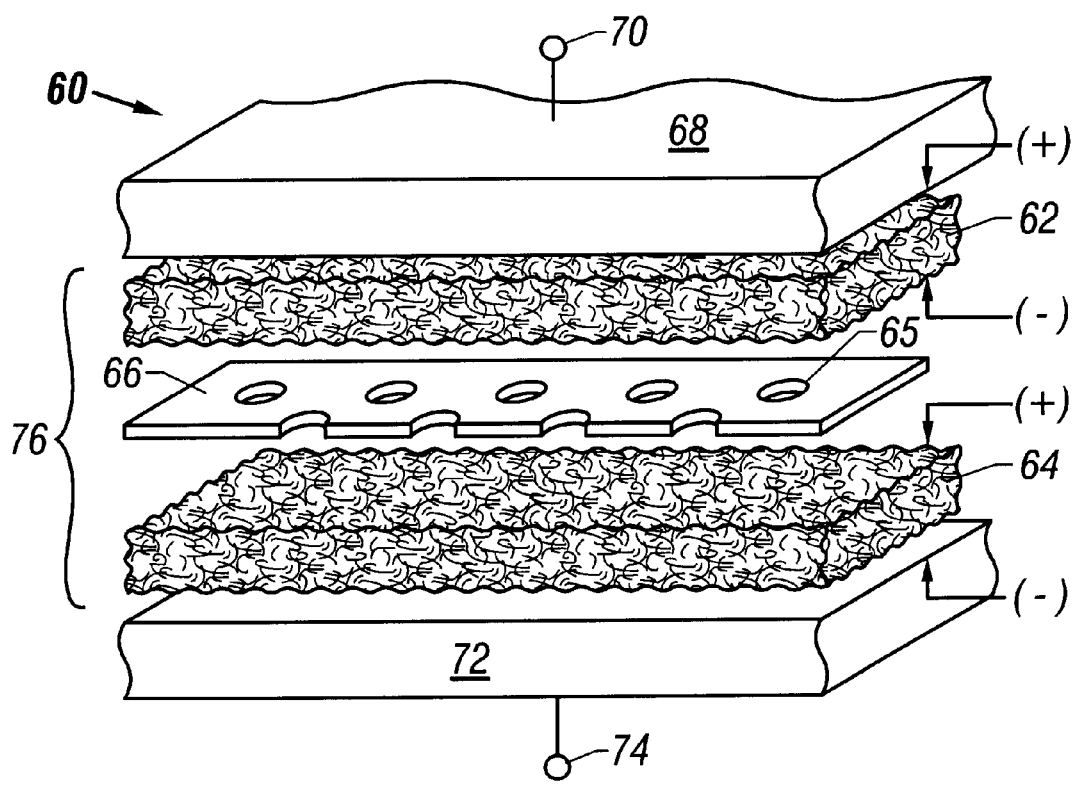
FIG. 4A schematically shows a basic double layer capacitor made in accordance with one embodiment of the invention.

Turning to FIG. 4A, a schematic representation of a two-electrode single cell double layer capacitor 60 made in accordance with the present invention is illustrated. The capacitor includes two spaced apart aluminum-impregnated carbon electrodes 62 and 64 electrically separated by a porous separator 66. The electrodes 62 and 64, as explained in more detail below, comprise a relatively dense weave of activated carbon fibers, forming a carbon cloth, in which molten aluminum has been impregnated.

The electrode 62 is in contact with a current collector plate 68, which plate 68 is in turn connected to a first electrical terminal 70 of the capacitor 60. Similarly, the electrode 64 is in contact with another current collector plate 72, which plate 72 is connected to a second electrical terminal 74 of the capacitor 60. The region between the electrodes 62 and 64, as well as all of the available spaces and voids within the electrodes 62 and 64, are filled with a highly conductive non-aqueous electrolytic solution 76. The ions of the electrolytic solution 76 are free to pass through pores or holes 65 of the separator 66; yet the separator 66 prevents the electrode 62 from physically contacting, and hence electrically shorting with, the electrode 64. A preferred separator, for example, is polypropylene-based. Polypropylene includes pore openings having dimensions on the order of 0.04 by 0.12 $\mu$m. This size pore prevents the fibers of the carbon cloth, which have a diameter on the order of 8–10 $\mu$m, from poking through the pores. Another suitable separator material is comprised of polyethylene. Polyethylene generally has pore sizes on the order of 0.1 $\mu$m diameter or less, thereby also preventing carbon fibers having a minimum diameter of 8 $\mu$m from poking therethrough.

In operation, when an electrical potential is applied across the terminals 70 and 74, and hence across the series-connected electrodes 62 and 64, a polarized liquid layer forms at each electrode immersed in the electrolyte. It is these polarized liquid layers which store electrostatic energy and function as the double layer capacitor—i.e., that function as two capacitors in series. More particularly, as conceptually depicted in FIG. 4A by the "+" and "−" symbols (representing the electrical charge at the electrode-electrolyte interface of each electrode that is immersed in the electrolyte), when a voltage is applied across the electrodes, e.g., when electrode 62 is charged positive relative to electrode 64, a double layer is formed (symbolically depicted by the two "+/−" layers shown in FIG. 4A) by the polarization of the electrolyte ions due to charge separation under the applied electric field and also due to the dipole orientation and alignment of electrolyte molecules over the entire surface of the electrodes. This polarization stores energy in the capacitor according to the following relationships:

$$C = k_e A / d \qquad (1)$$

and $$E = CV^2 / 2 \qquad (2)$$

where C is the capacitance, $k_e$ is the effective dielectric constant of the double layer, d is the separation distance between the layers, A is the surface area of the electrodes that is immersed in the electrolytic solution, V is the voltage applied across the electrodes, and E is the energy stored in the capacitor.

In a double layer capacitor, the separation distance d is so small that it is measured in angstroms, while the surface area A, i.e., the surface area "A" per gram of electrode material, may be very large. Hence, as can be seen from Eq. (1), when d is very small, and A is very large, the capacitance will be very large.

The surface area "A" is large because of the make-up of the electrodes, each electrode comprising a weave of activated carbon fiber bundles to form a carbon cloth. The activated carbon fibers do not have a smooth surface, but are pitted with numerous holes and pores 80, as suggested by FIG. 4B. That is, FIG. 4B conceptually illustrates a small section of an activated carbon fiber 78 having numerous pits or holes 80 therein. The fiber 78, as previously indicated, typically has a diameter on the order of 8–10 $\mu$m; while the pits or holes of the activated carbon fiber have a typical size of about 40 angstroms. The fiber 78 is immersed in an electrolytic solution 76. Each pit or hole 80 significantly increases the surface area of the fiber that is exposed to the electrolytic solution 76. Because there are a large number of fibers 80 in each bundle, and because there are several bundles within the weave that form the carbon cloth, the result is a three-dimensional electrode structure which allows the electrolyte to penetrate into the weave of the fibers and contact all, or most all, of the surface area of the fibers, thereby dramatically increasing the surface area "A" of the electrode over which the double layer of charged molecules is formed.

Figure 4B:
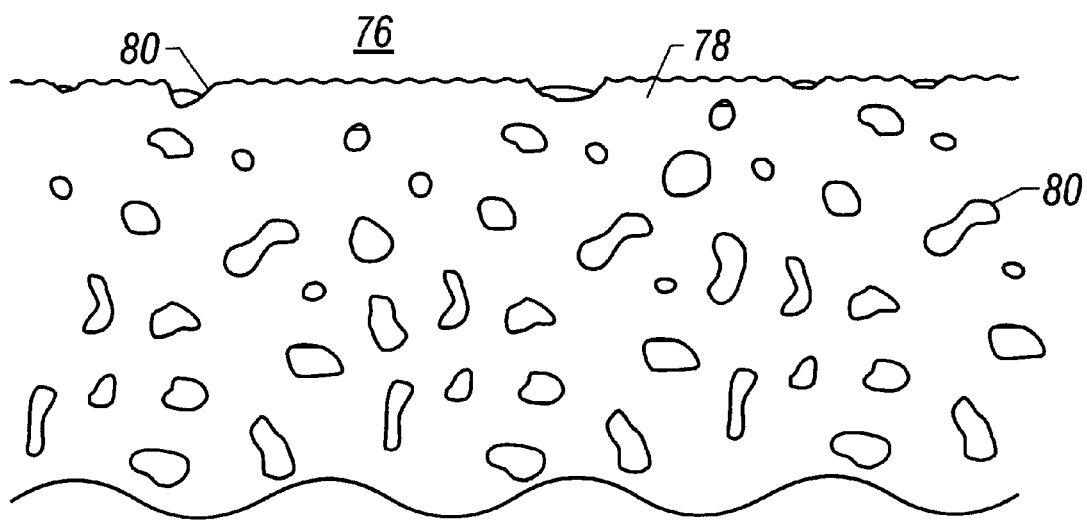
FIG. 4B conceptually illustrates the activated carbon fibers that form part of the carbon cloth used in the electrodes of the double layer capacitor, and additionally helps illustrate how a double layer capacitor is able to achieve such a large surface area, and hence a large capacitance.

By way of example, a suitable carbon cloth that may be used to make the electrodes of the present invention is commercially available. The diameter of the carbon fibers of such cloth, such as the fiber 78 shown in FIG. 4B, is on the order of 8 microns ($8 \times 10^{-6}$ m); whereas the overall thickness of the carbon cloth is about 0.53 millimeters (mm). The average diameter of the pores in the activated carbon fibers is some 44 angstroms, and the pore/void volume is about 1.2 ml/g. It should be noted that the pore/void volume results from three different types of voids or pores in the cloth: (1) the pores or pits in the individual activated carbon fibers (such as the pores 80 shown in FIG. 4B that cover most of the surface area of the activated carbon fibers); (2) the space between the fibers that form a carbon bundle (which space, for purposes of the present invention, when viewed in a cross section, as in FIG. 9B, is referred to as the "tow" of the fiber bundle); and (3) the voids between the fiber bundles that are woven to form the cloth. Such pore volume results in an overall surface area of the carbon cloth of about 2500 $m^2/g$. Because of the pore/void volume of the cloth, the cloth is somewhat spongy, and therefore compressible. The density of the cloth is typically about 0.26 $g/cm^3$, resulting in an theoretical effective area/unit-volume (i.e. void volume) of about 650 $m^2/cm^3$. With such an area/unit-volume, it is thus possible, see Eq. (1) to achieve capacitances on the order of 6 $F/cm^3$.

Achieving a high capacitance, however, is only part of the invention. If such high capacitance is to be of practical use, it must be able to store and discharge energy in a relatively quick time period. The charge/discharge time of a capacitor, as discussed more fully below, is governed by the internal resistance of the capacitor. The lower the internal resistance, the shorter the charge/discharge time.

Figure 5:
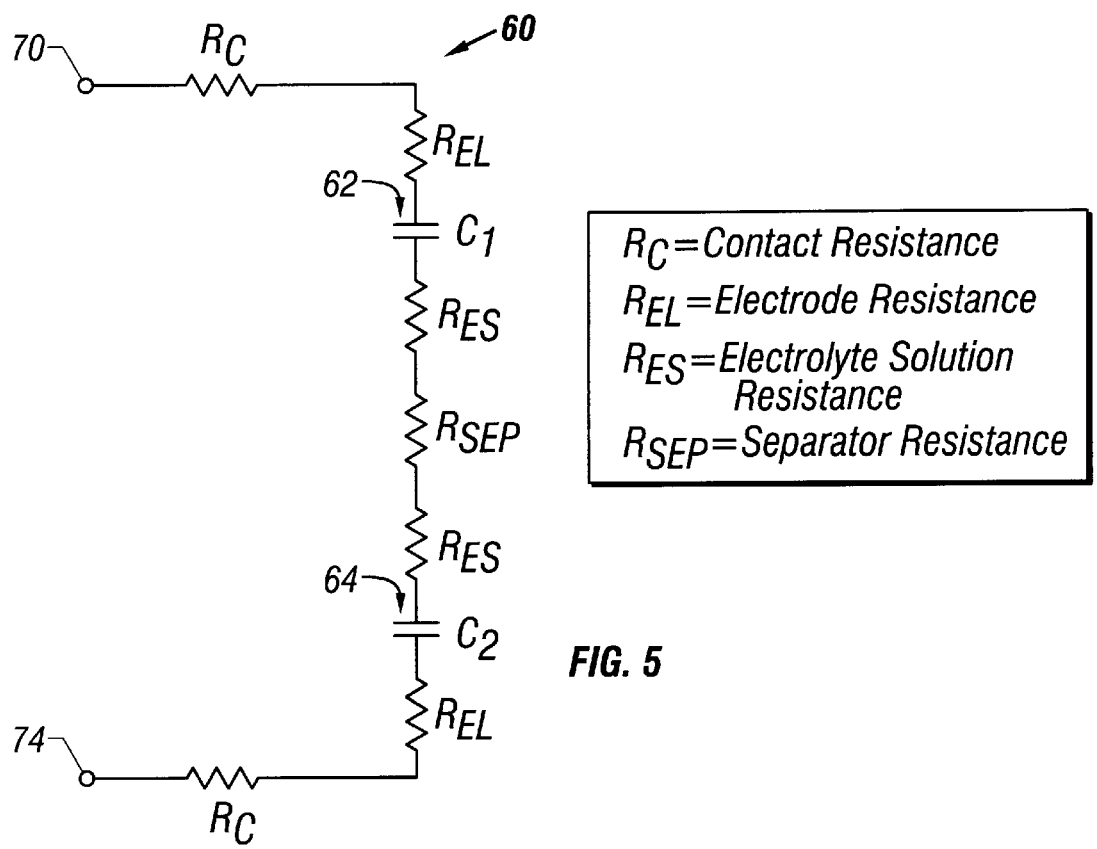
FIG. 5 shows the equivalent circuit diagram of the basic double layer capacitor of FIGS. 4A and 4B.

The internal resistance of the basic double layer capacitor 60 depicted in FIG. 4A is made up of several components, as illustrated in the equivalent circuit diagram of the capacitor 60 shown in FIG. 5. As seen in FIG. 5, the internal resistance of the double layer capacitor 60 includes a contact resistance, $R_C$, which represents all of the resistance in the current path between the capacitor terminal 70 up to the electrode 62 (represented in FIG. 5 as the upper plate of capacitor C1), or all of the resistance in the current path between the capacitor terminal 74 and the electrode 64 (represented in FIG. 5 as the lower plate of capacitor C2).

As further seen in FIG. 5, the internal resistance of the capacitor 60 also includes an electrode resistance, $R_{EL}$ which represents the resistance within the electrode 62 (or within the electrode 64) between the surface of the carbon cloth used to make the electrode and all of the individual activated carbon fibers used within the carbon cloth, i.e., $R_{EL}$ represents the internal contact resistance between the carbon fibers within the electrode. Additionally, an electrolytic solution resistance, $R_{ES}$, exits relative to the electrolytic solution 76; and a separator resistance, $R_{SEP}$, exists relative to the porous separator 66.

Any energy stored within the double layer capacitor 60 must enter or exit the capacitor by way of an electrical current that flows through $R_C$, $R_{EL}$, $R_{ES}$, and $R_{SEP}$. Thus, it is seen that in order for practical charge/discharge times to be achieved, the values of $R_C$, $R_E$, $R_{ES}$, and $R_{SEP}$, which in combination with the capacitance C or $C_1+C_2$ define the time constant $\tau_C$ of the capacitor, must be kept as low as possible.

The resistance of the separator, $R_{SEP}$, is a function of the porosity and thickness of the separator. A preferred separator material is comprised of polypropylene having a thickness of about 0.001 inches (0.025 mm). An alternative separator material is comprised of polyethylene, also having a thickness of about 0.001 inches (0.025 mm). The polypropylene separator inherently has a smaller pore size with a 20–40% porosity. The polyethylene separator has a larger pore size with a 60–80% porosity yet has a more tortuose or twisted path than the polypropylene separator in which the electrolyte ions may flow. The polypropylene separator has a sheet structure while the polyethylene separator has a more lamellar structure.

The resistance of the electrolytic solution is determined by the conductivity of the particular electrolytic solution that is used. In selecting the type of electrolytic solution to use, several tradeoffs must be considered. Aqueous electrolytic solutions generally have a higher conductivity than do non-aqueous solutions (e.g., by a factor of 10 to 100). However, aqueous solutions limit the working voltage of the capacitor cell to around 0.5 to 1.0 volt. Because the energy stored in the cell is a function of the square of the voltage, see Eq. (2) above, high energy applications are probably better served using a non-aqueous electrolyte, which permits cell voltages on the order of 2.0 to 3.0 volts. As previously indicated, the preferred electrolyte for use with the double layer capacitor described herein is made from a mixture of acetonitrile ($CH_3CN$) and a suitable salt, which mixture exhibits a conductivity on the order of 50 $ohm^{-1}/cm$. It is to be emphasized, however, that the invention herein described contemplates the use of alternate electrolytic solutions, particularly non-aqueous (or organic) electrolytic solutions, other than the solution made from acetonitrile described above. For example, several alternative electrolytic solutions are disclosed in the previously cited U.S. patent application Ser. No. 08/319,493, for MULTI-ELECTRODE DOUBLE LAYER CAPACITOR HAVING SINGLE ELECTROLYTE SEAL AND ALUMINUM-IMPREGNATED CARBON CLOTH ELECTRODES, by Farahmandi, et al., filed Oct. 7, 1994, now U.S. Pat. No. 5,621,607.

The contact resistance $R_C$ in combination with the electrode resistance $R_{EL}$ represent a significant source of internal resistance of the capacitor 60. A high electrode resistance has heretofore been a major stumbling block in the development of commercially viable, high energy density, double layer capacitors. A key feature of the present invention is to provide a double layer capacitor having a very low electrode resistance in combination with a high energy density. A major objective of the present invention is to reduce $R_C+R_{EL}$ to a value that is small in comparison to $R_{SEP}$. To that end, much of the discussion that follows focuses on manufacturing and assembly techniques that reduce the electrode resistance, $R_{EL}$, as well as the contact resistance, $R_C$.

Alternatively, $C_1$ and $C_2$ in FIG. 5 may each represent the total capacitance of multiple electrodes in parallel, such that $C_1$ is the equivalent capacitance of an electrode stack connected in parallel.

Figure 6A:
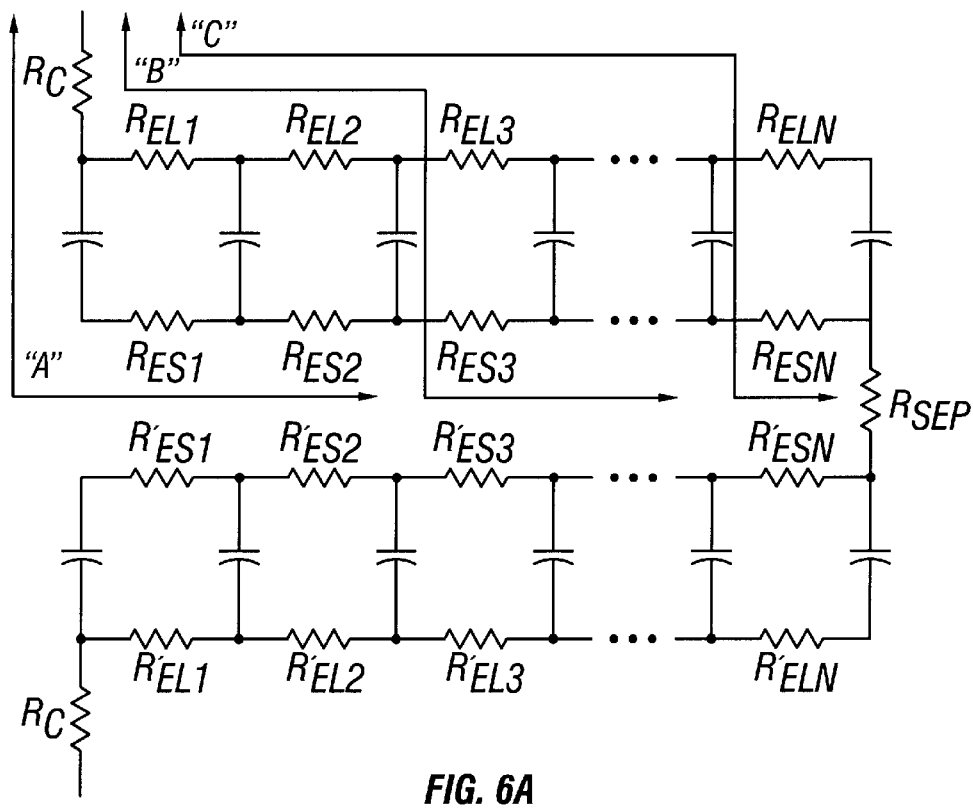
FIG. 6A shows a more detailed representation of the equivalent circuit diagram of FIG. 5, particularly illustrating a relationship between electrode resistance and electrolyte solution resistance.

To further illustrate the significant role that the electrode resistance $R_{EL}$ plays in the operation of the double layer capacitor 60 of the present embodiment, reference is next made to FIG. 6A. FIG. 6A shows an equivalent circuit diagram of an aluminum impregnated carbon cloth electrode double layer capacitor 60. Unlike the representation in FIG. 5, the electrode resistance $R_{EL}$ is represented as a series of separate resistances $R_{EL1}$, $R_{EL2}$, $R_{ELn}$, signifying increasing resistance as a function of distance in the activated carbon fiber (electrically speaking) through which a particular portion of the current travels before passing into the electrolyte (as ionic current).

Typically, current entering and exiting activated carbon fibers near the current collector, sees a relatively lower electrode resistance than does current that travels through activated carbon fibers through the entire thickness of the carbon fiber cloth before passing into the electrolyte.

At the same time, current that passes into the electrolyte near the current collector foil (after having traveled relatively little distance through the activated carbon fibers) has a greater path distance through the electrolyte solution and thus a greater electrolyte solution resistance $R_{ES}$, than does current that passes into the electrolyte solution after having traveled through the entire thickness of the carbon cloth, and thus has a lesser electrolyte solution resistance $R_{ES}$. FIG. 6A depicts schematically near the inverse relationship between $R_{EL}$ and $R_{ES}$ through a series/parallel circuit having a "ladder" structure on which the individual capacitance functions of each unit of surface area are the "rungs" of the ladder and a series of individual electrode resistances form one "leg" of the ladder, and a series of individual electrolyte solution resistances form another "leg" of the ladder. The contact resistance is coupled to one end of the one leg, and the separator resistance is coupled to another end of the other leg, such that current traveling through each individual capacitance has "seen" at least one of the electrode resistances and at least one of the electrolyte solution resistances, with the number of, i.e., the amount of resistance of, the electrode resistances being inversely proportional to the number of, i.e., the resistance of, the electrolyte solution resistances.

FIG. 6A further illustrates a first portion of current taking path "A" entering and exiting the carbon fiber cloth relatively near to the current collector foil/carbon fiber cloth interface, and traveling a relatively greater distance through the electrolyte solution, a second portion of current taking path "B" entering the carbon fiber cloth at the current collector foil/carbon fiber cloth interface and exiting at an intermediate position, with an intermediate distance of travel through the electrolytic solution, and a third portion of current taking path "C" entering the carbon fiber cloth at the current collector foil/carbon fiber cloth after having passed through the entire thickness of the carbon fiber cloth, with a relatively shorter distance of travel through the electrolyte solution.

Understanding of these sources of resistance by the inventors remains significant to their success at reducing the resistances to a level that permits the making of a commercially viable, practical, high-voltage, low internal resistance, small size, long life, double layer capacitor.

Advantageously, in the present embodiment, total resistance seen by the entire amount of current passing through the double layer capacitor is no more than 900 $\mu\Omega$.

Figure 6B:
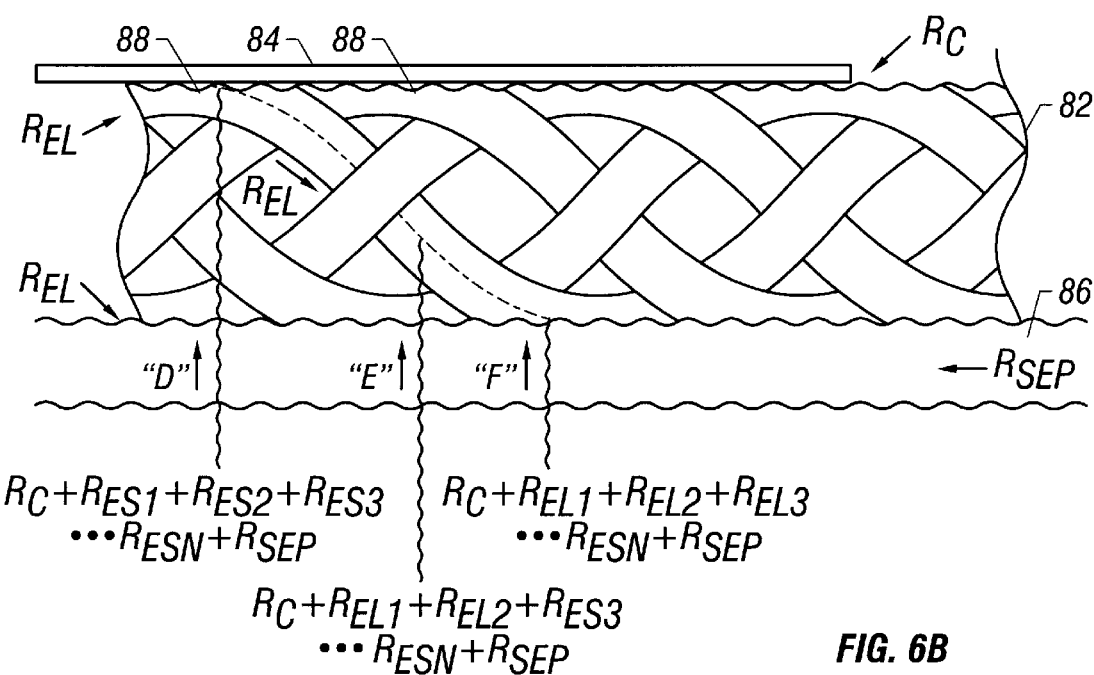
FIG. 6B conceptually shows the alternate paths ions may take as the current flows through a single electrode to illustrate resistance and capacitance at various points in the electrode in accordance with one embodiment of the present invention.

Referring next to FIG. 6B, a diagram is shown that conceptually shows the alternate paths ions may take as the current flows through a single electrode to illustrate resistance and capacitance at various points in the electrode in accordance with one embodiment of the present invention. Shown are a single electrode 82 having been impregnated with metal, a single current collector 84 and a single separator 86. Also shown are carbon fiber bundles 88 within the carbon fiber cloth 82. A charge may take path "D" through the electrode 82 experiencing $R_{SEP}$, then enter the electrode 82 until it enters a carbon fiber bundle 88. Then, the charge travels axially through the carbon fiber bundle 88 to the current collector 84. The charge experiences resistance from the electrode, $R_{EL}$, and resistance from the electrolyte solution, $R_{ES}$. The current then flows through the collector foil 84, experiencing $R_C$. As shown by the different paths "D", "E", and "F", the amount of electrode and solution resistance varies for each charge and the path it takes. A charge taking path "D" experiences more solution resistance ($R_{ES}$) and less electrode resistance ($R_{EL}$) than a charge in path "F", for example. Each path generates a separate capacitance as well. The effective capacitance is the sum of the separate capacitances $C_1$ through $C_N$.

Figure 7:
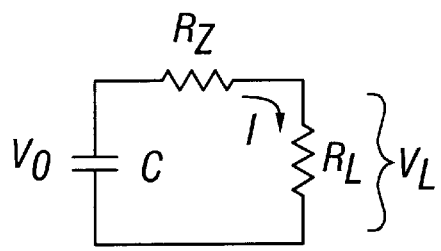
FIG. 7 is a simplified electrical equivalent circuit that illustrates the role the internal resistance of the capacitor, $R_Z$, plays in efficiently delivering energy to a load.

A simplified circuit that illustrates the use of a capacitor as a power source to deliver energy to a load, $R_L$, is shown in FIG. 7. In FIG. 7, all of the capacitor resistances shown in FIG. 5, including the contact resistance $2 \times R_C$ associated with both terminals, the aluminum impregnated carbon cloth electrode resistance $2 \times R_{EL}$ and further including the electrolyte solution resistance $2 \times R_{ES}$ and the separator resistance $R_{SEP}$ (if not sufficiently low to be neglected), are included in the capacitor resistance $R_Z$.

The total resistance $R_T$ of the power delivery circuit in FIG. 7 is $$R_T = R_Z + R_L. \quad (3)$$

The total time constant $\tau$ of the power delivery circuit is thus:

$$\tau = R_T C, \quad (4)$$

whereas the time constant $\tau_C$ of just the capacitor is $$\tau_C = R_Z C. \quad (5)$$

The voltage developed across the load $V_L$ is $$V_L = V_O(R_L/R_T) = V_O(1 - R_C/R_T) \quad (6)$$

and the power delivered to the load is $$P = IV_L = IV_O(1 - R_C/R_T) = IV_O(1 - CR_C/CR_T) \quad (7)$$

or $$P = IV_O(1 - \tau_C/\tau). \quad (8)$$

The expression $(1-\tau_C/\tau)$ represents the efficiency rating $\in$ of the power delivery circuit, i.e., $$\in = (1 - \tau_C/\tau). \quad (9)$$

The degree to which the power source (in this case the capacitor C charged to a voltage $V_O$) is able to efficiently deliver power to the load, $R_L$ is thus highly dependent upon the characteristic RC time constant of the capacitor $\tau_C$. The characteristic RC time constant of the capacitor, in turn, is directly related to the resistance of the capacitor, $R_Z$. For an efficient power delivery circuit to be achieved using the double layer capacitor C, it is thus apparent that the resistance of the capacitor, $R_Z$, must be minimized so that a low time constant of the capacitor $T_C$ can be realized. In one embodiment, $R_Z$ is less than 900 $\mu\Omega$.

Advantageously, the present invention provides a multi-electrode double layer capacitor of the type represented in the equivalent circuit of FIG. 6 that, when configured substantially as described below in connection with FIGS. 9A through 22B, has performance specifications as set forth in Table 1. Such configuration (i.e., the configuration shown in FIGS. 21A and 21B) may be referred to herein as the PC 2500 or "prismatic" design double layer capacitor. Significantly, a capacitor operating in accordance with the specifications shown in Table 1 exhibits a time constant $\tau_C$ of about 2 seconds. The energy density achieved is in the range of 2.9–3.5 W-hr/kg, and the power rating is over 1000 W/kg (at 400 A). Such performance in a single cell double layer capacitor, to applicants' knowledge, has never been achieved before.

TABLE 1

| Performance Specifications of PC 2500 | | |
|---|---|---|
| Parameter | Value | Units |
| Capacitance | 2,500 | Farad |
| Tolerance | ±5 | % |
| Rated Voltage | 2.3 | Volts |
| Max Surge Voltage | 2.7 | Volts |

TABLE 1-continued

| Rated Energy | 6,600 | Joules |
|---|---|---|
| ESR*, room temp | 900 | $\mu\Omega$ |
| ESR*, high temp | 2.7E+3 | $\mu\Omega$ |
| ESR*, low temp | 900 | $\mu\Omega$ |
| Case Style | Elongated can with lid | |
| Electrical Connection | Two terminals having opposite polarity | |
| Case Dimensions | 2.375 × 2.375 × 6.1 inches 60.1 × 60.1 × 155 mm | |
| Approx. Weight | 1.5 lbs 0.68 kg | |
| Electrolyte: | Organic Impregnant (solvent + salt) solvent: acetonitrile ($CH_3CN$) salt: tetraethylammonium tetraflouraborate $(CH_3CH_2)_4N^+BF_4^-$ Ratio salt/solvent: 303.8 g/liter | |

(*ESR = Electrode Series Resistance)

Prismatic Design, PC 2500

Turning next to FIGS. 8A through 21B, the basic technique used in making a double layer capacitor in accordance with the "prismatic" design embodiment of the present invention will be described. FIGS. 22A and 22B are a flow chart that illustrates the main steps in such process; while FIGS. 8A through 21B illustrate individual steps of the process. Hence, in the description of the assembly and fabrication process that follows, reference will be made to specific blocks or boxes of the flow chart of FIGS. 22A and 22B to identify particular steps, at the same time that reference is made to respective ones of FIGS. 8A through 21B to illustrate the step being carried out.

Referring to FIG. 22A, a flowchart that illustrates the method of making and assembling a wrapped electrode stack or winding assembly of an embodiment to be used in a "prismatic" design double layer capacitor.

Figure 8A:
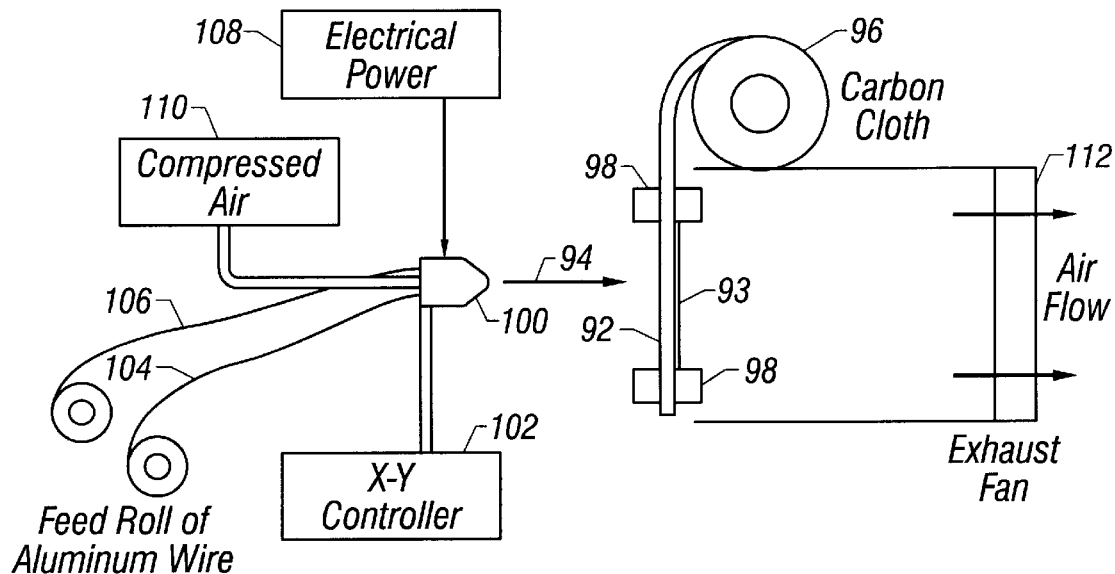
FIGS. 8A and 8B schematically show one technique that may be used to wire arc spray an activated carbon cloth with aluminum, thereby impregnating aluminum into the tows of the carbon fiber bundles of the cloth, as illustrated in FIGS. 9A–9B.
Figure 8B:
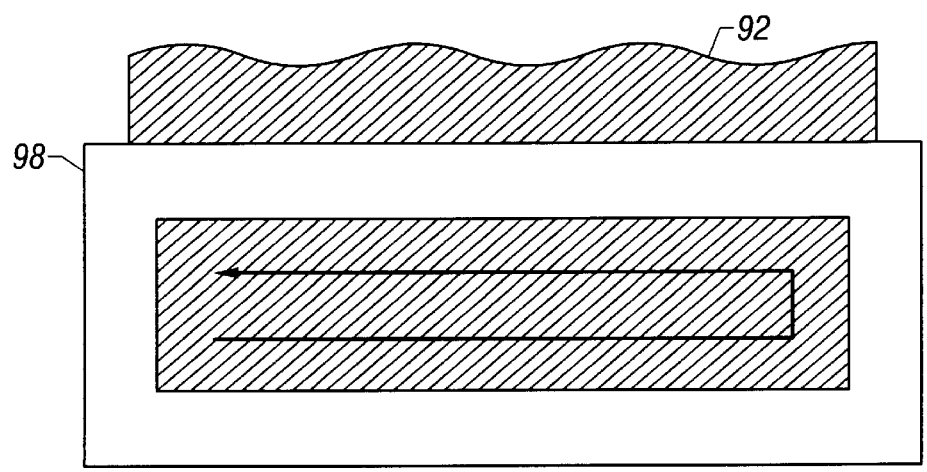
Figure 8C:
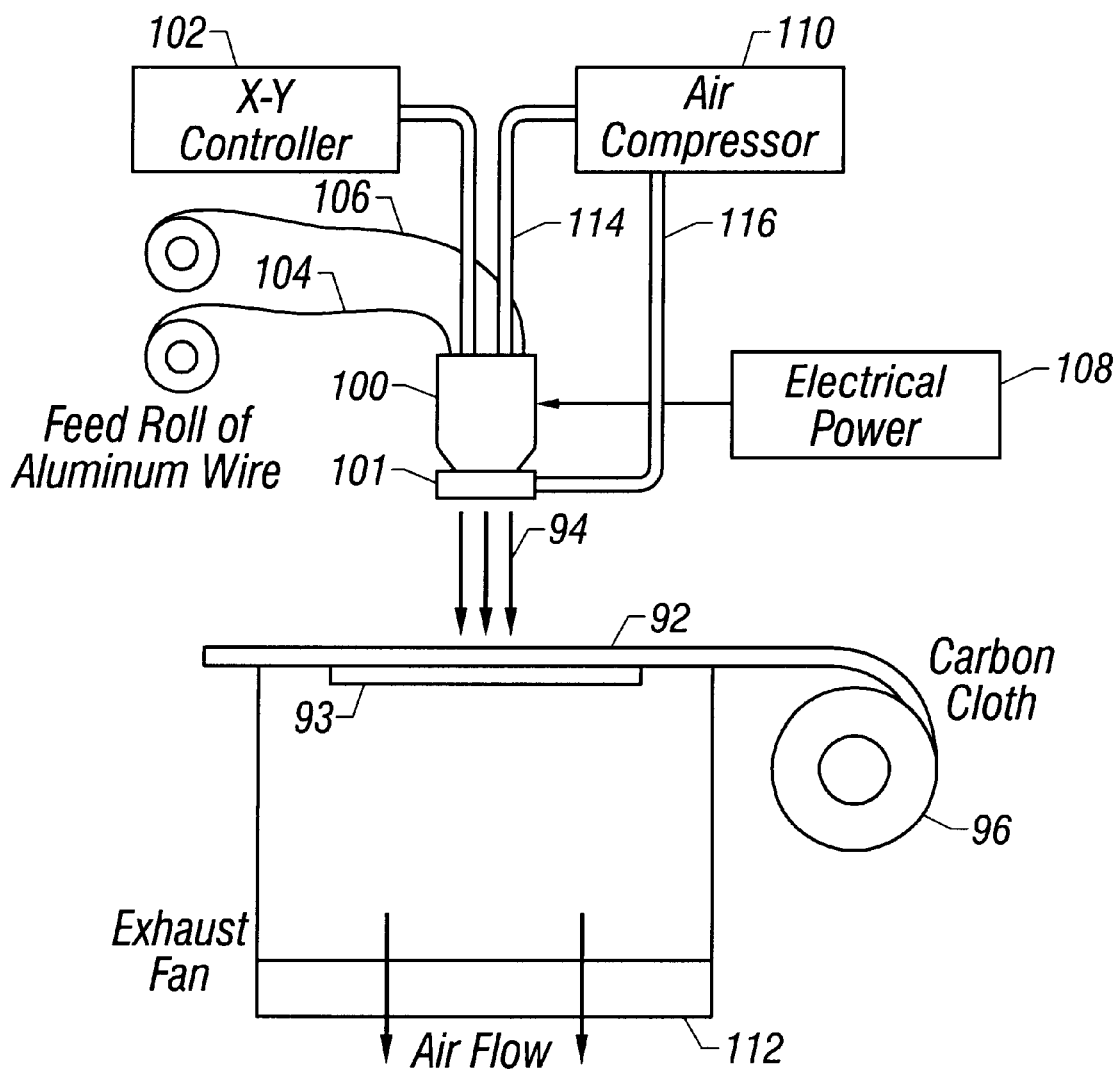
FIG. 8C schematically shows a jet spray technique that may be used to wire arc spray an activated carbon cloth with aluminum, as illustrated in FIGS. 9C–9D.

With reference first to block 2204 of FIG. 22A, and with reference also to FIGS. 8A, 8B, and 8C an initial step to be carried out in making a capacitor 60 (FIG. 5) in accordance with the present invention is to plasma spray or wire arc spray a suitable carbon cloth 92 (FIG. 8A) with molten aluminum spray 94 so that the aluminum is impregnated deep into the tow of the fibers of the carbon cloth 92. The carbon cloth 92 to be sprayed is preferably a commercially-available carbon cloths as known in the art. As seen in FIGS. 8A and 8C, the carbon cloth 92 is typically obtained in a roll 96. The roll is typically about 36 inches wide. A length of carbon cloth 92 is extracted from the roll 96 and held in a suitable frame 98. The frame includes a backup mesh 93. The frame is positioned in front of a spray nozzle 100. The frame 98 exposes a "window" of the cloth having approximate dimensions of 2.31 inches by 34.25 inches, to the plasma spray 94. The wire arc spray nozzle is controlled by an X-Y controller 102 to provide a desired spray pattern on the carbon cloth.

The molten aluminum spray 94 is formed by feeding two aluminum wires 104 and 106 from respective rolls of aluminum wire into the nozzle 100 at a controlled rate. The wires 104 and 106 are not limited to aluminum wires and may comprise another suitable metal, such as copper or titanium. The tips of the wires are held within the nozzle a specified distance apart. A source of electrical power 108 causes an electrical current to flow through the wires and arc across the tips of the wires. The electrical arcing causes the aluminum to melt. As the aluminum melts, it is carried out of the nozzle 100 in a stream by compressed air, provided by air compressor 110. As the aluminum is spent and carried away in the molten aluminum stream 94, additional aluminum wire 104, 106 is metered into the nozzle 100 to maintain the desired gap for the electrical arc. In this manner, a source of aluminum is continually metered into the nozzle so that a constant stream of molten aluminum can be directed at the carbon cloth.

The molten stream of aluminum is sprayed onto and into the carbon cloth 92 following an over-up-and-back spray pattern as shown in FIG. 8B. The backup mesh 93, which has mesh openings on the order of 0.0036 in$^2$, allows the molten aluminum flow to continue through the cloth to optimize the volume impregnation with aluminum. The wires 104 and 106 are not limited to aluminum wires and may comprise another suitable metal, such as copper or titanium. The aluminum wires 104, 106 are preferably 99.5% pure aluminum having a diameter of about 1/16th of an inch.

In operation, all of the operative equipment shown in FIG. 8A, e.g., the nozzle 100, X-Y controller 102, frame 98, and wires 104, 106 are placed in a wire arc spray chamber (to confine the aluminum dust). The air in the compressor is dried. An exhaust fan 112 maintains a constant flow of air through the chamber in the direction away from the nozzle 100. The cloth 92 is manually clamped in the frame 98, and a single spray pattern is performed. Only one side of the cloth is sprayed. Once sprayed, the cloth is released from the frame. A new length of unsprayed carbon cloth 92 is then indexed in the frame, as needed, for the next strip of carbon cloth to be sprayed.

Referring to FIG. 8C, an alternate system is shown for jet spraying metal, preferably aluminum, into a carbon cloth. The system of FIG. 8C contains similar elements as FIG. 8A. Shown are an air compressor 110 having a primary line 114 and a secondary line 116, a source of electrical power 108, an x-y controller 102, and aluminum wires 106 and 104, all of which connect to an arc spray nozzle 100. The arc spray nozzle 100 has a jet spray nozzle 101 attached. Also shown are the carbon cloth 92, backup mesh 93, exhaust fan 112, and molten metal spray 94.

The operation is similar to the operation of the arc spraying system of FIG. 8A, except that the jet spraying is done downward onto the carbon cloth 92 which is resting on a backup mesh 93. There is no need to use a frame since the carbon cloth 92 does not need to be held in place. Alternatively, a similar frame or guiding mechanism could be used. Additionally, the arc spray nozzle 100 has an additional jet spray nozzle 101 attached. This jet spray nozzle 101 is actually three separate spray nozzles directed toward the carbon cloth 92. The air compressor 110 sends compressed air into the arc spray nozzle 100 through the primary line 114 at about 50 psi similar to FIG. 8A; however, another line, the secondary line 116, carries compressed air into the jet spray nozzle 101 at about 40 psi. This secondary line 116 further boosts the strength of the molten metal spray 94 against the carbon cloth 92. Using the embodiment in FIG. 8C, less Aluminum is actually sprayed in less time while achieving a more effective impregnation of the carbon cloth 92 than in the wire arc spray technique described in FIG. 8A. The impregnation depth using the system of FIG. 8C is about the same as the impregnation depth using the system of 8A and is typically about ¼ through the entire carbon cloth 92 or about ⅔ to ¾ through just the top carbon fiber bundle of the carbon cloth 92. Additionally, the jet sprayer of FIG. 8C allows less molten metal (i.e. aluminum) to build up on the surface of the carbon cloth 92 than the wire arc sprayer of FIG. 8A.

The operating parameters used during the arc spray process are as follows: The electrical current used to melt the aluminum is 80–90 amperes at an arc voltage of about 31 V. The compressed air is maintained at a pressure of approximately 50–60 psi in FIG. 8A, and 60 and 40 psi for the primary line 114 and the secondary line 116, respectively, in FIG. 8C. The distance between the tip of the nozzle 100 and the cloth is 20 inches in FIG. 8A and between 4.5 to 6 inches in FIG. 8C. The complete spray pattern is traversed at a constant rate in a time period of about 45 seconds for FIG. 8A and about 1 second for FIG. 8C. The nozzles 100 and 101 are adjusted so that the stream of molten aluminum 94 covers the carbon cloth 92 as uniformly as possible with minimum overlap.

Once the arc spraying process has been completed, a layer of aluminum is present on the front side of the carbon cloth 92, and there should be a slight visual pattern of the backup mesh 93 visible on the back side of the carbon cloth. Such pattern provides visual verification that at least some aluminum has penetrated all the way through the carbon cloth to optimize volume impregnation during the arc spraying process. The layer of aluminum using the jet sprayer of FIG. 8C (see FIG. 9C) is much thinner than the layer of aluminum formed using the wire arc sprayer of FIG. 8A (see FIG. 9A).

All of the equipment referenced in FIGS. 8A–8C is conventional. The details and manner of operating such equipment are known to those of skill in the art.

The purpose of spraying the carbon cloth 92 with the aluminum is to reduce the transverse resistance through the carbon cloth 92. Measured data of the electrode series resistance (ESR), taken before and after wire arc spraying using the wire arc sprayer of FIG. 8A and with various amounts of aluminum is summarized in Table 2.

TABLE 2

| Aluminum Density (mg/cm³) | Capacitance (F/g) | ESR of Capacitor (Ω-cm²) |
| --- | --- | --- |
| 0 (unsprayed) | 115 | 52.0 |
| 157 | >130 | 1.509 |
| 209 | >140 | 1.299 |
| 250 | 147 | 1.26 |
| 410 | 144 | 1.08 |
| 509 | >130 | 1.308 |

The data in TABLE 2 was taken using electrodes that were 2500 m²/g cut to 5.1 cm in diameter and that contained approximately 0.2 g of carbon. The carbon density in the unsprayed cloth was 0.26 g/cm³.

As seen from the data in TABLE 2, the resistance of a carbon cloth 92 that has been wire arc sprayed with aluminum reduces the resistance of the carbon cloth by up to a factor of 50. Such a dramatic reduction in resistance, which is caused by a decrease in the volumetric resistivity of the electrode structure, directly influences the electrode resistance, $R_{EL}$, and thus significantly improves the ability of the capacitor to exhibit a low time constant.

As further seen from the data in TABLE 2, reducing the resistance of the electrode through impregnation of aluminum is a process that must be optimized in order to produce the lowest resistance for a desired amount of aluminum. Too little aluminum and the resistance remains too high. Too much aluminum, and the weight of the electrode is increased sufficiently to degrade the energy density. Too much aluminum also blocks the electrolyte from penetrating into the carbon weave so as to contact all of the surface area of the fibers, thereby effectively decreasing the available surface area.

It is significant that the aluminum spray 94 which is directed at the carbon cloth 92 (FIG. 8A) does much more than just coat the surface of the carbon cloth 92 with aluminum. While the aluminum certainly does coat the surface, it also penetrates into the cloth or reaches into the voids (or interstices) in between the carbon fiber bundles of the carbon fiber cloth and; thus, impregnates the cloth with aluminum. The significance of impregnating the cloth with aluminum is best illustrated with reference to FIGS. 9A, 9B, 9C, and 9D.

Figure 9A:
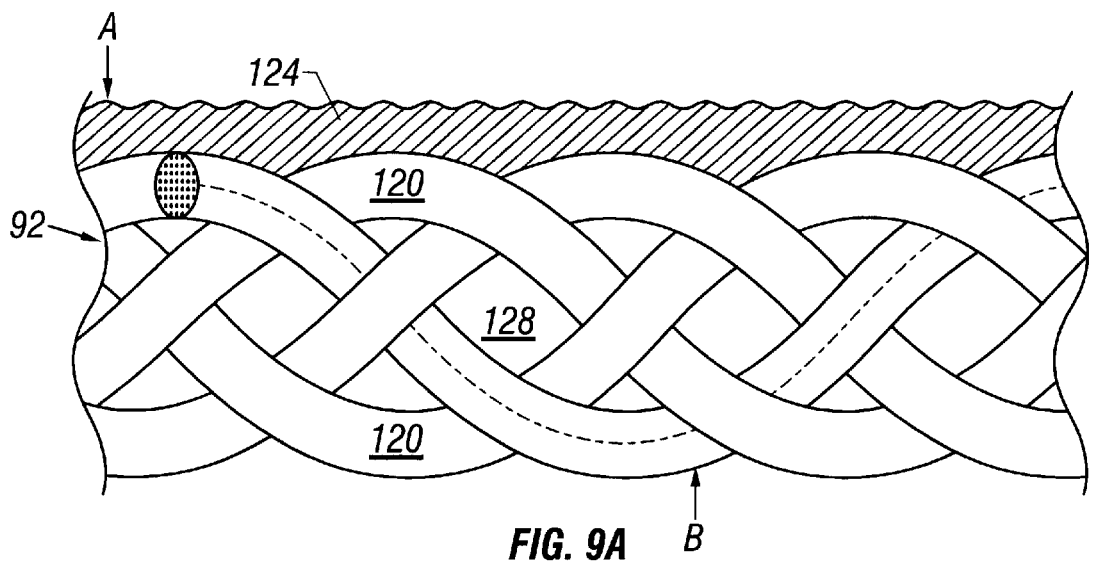
FIG. 9A shows a schematic representation of a side sectional view of the carbon cloth, and illustrates how a plurality of fiber bundles are woven to form the carbon cloth.
Figure 9B:
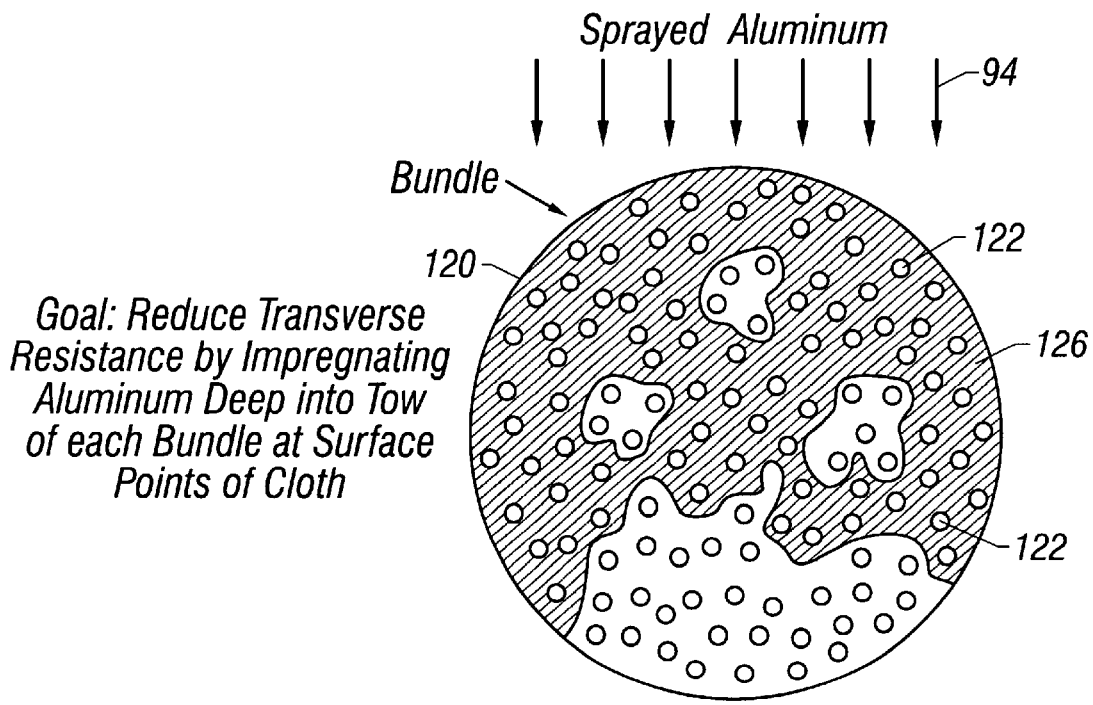
FIG. 9B conceptually illustrates a cross-sectional view of an individual fiber bundle of the carbon cloth, and further conceptually illustrates a preferred penetration of the aluminum deep into the tow of the fiber bundle.

FIG. 9A shows a schematic representation of a side sectional view of the carbon cloth 92. As seen in FIG. 9A, the carbon cloth 92 is made up of a plurality of fiber bundles 120 that are woven to form the carbon cloth 92. For simplicity, only four such fiber bundles 120 are shown in FIG. 9A. Each fiber bundle 120 is made up of many carbon fibers 122, as seen best in FIG. 9B, which conceptually illustrates a cross-sectional view of an individual fiber bundle 120.

The axial resistance of the individual carbon fibers 122 is very low, but the transverse resistance through a carbon bundle 120 is relatively high. It is this transverse resistance, i.e., the resistance from Point "A" on one side of the cloth 92 to Point "B" on the other side of the cloth, which must be lowered in order to reduce the electrode resistance $R_{EL}$. Wire arc spraying the carbon cloth 92 with an aluminum spray 94 advantageously causes the aluminum to flow into the tow 126 of the bundle 120, as shown in FIG. 9B. Such penetration, or impregnation, into the tow of the fiber bundle 120 thereby reduces the contact resistance between the individual fibers 122. Thus, the sprayed aluminum fills some of the voids in the carbon fiber cloth 92. The aluminum reaches into the tow, or in between the interstices of the carbon fiber bundles 121. The resulting low transverse contact resistance together with the intrinsic low axial resistance of the fibers then permits a very low resistance path to be made completely through the width of the cloth 92, i.e., provides a very low transverse resistance through the electrode structure. The transverse resistance of the current flow from Point "A" to Point "B" is also influenced by the weave type, fiber tow size, and the twist of the fiber tow. A more efficient and repetitive path for carrying current from Point "A" to Point "B" can be created with optimization of the above parameters.

Furthermore, the impregnation process does not significantly effect the porosity of the carbon cloth 92. The porosity is maintained on a microscopic level such that sufficient electrolytic solution may be enter the pores of the carbon fiber bundles. Thus, even though the metal impregnant takes up some of the void volume of the carbon cloth, it is not small enough to interfere with the porosity of the carbon cloth 92; and, therefore the porosity of the carbon cloth 92 is maintained during the impregnation process. The resulting area/unit-volume of the carbon cloth having been sprayed or the void volume of the carbon cloth 92 having been sprayed is about 600 m²/cm³. On the other hand, if too much metal is impregnated into the carbon cloth, the metal may act as a barrier to the electrolytic solution being able to penetrate into the carbon cloth itself.

When the aluminum spray 94 strikes the cloth 92, it not only impregnates the tow 122 of the fiber bundle 120 with aluminum, as described above, but it also forms a layer 124 of aluminum on the sprayed surface of the carbon cloth. The layer 124 of aluminum contours to the shape of the surface of the carbon cloth 92. FIG. 9A illustrates the resulting layer 124 formed using the wire arc sprayer of FIG. 8A. The jet sprayer of FIG. 8C results in a much thinner layer 124 of aluminum (see FIG. 9C). Note that the layer 124 is uneven and is not intended to be used as a current collector. In addition, some of the aluminum also fills some of the voids 128 between the fiber bundles. The aluminum layer 124 helps to make good (low resistance) electrical contact with the foil current collectors 68 and 72 (FIG. 4A). That is, the aluminum layer 124 serves to lower the contact resistance, $R_C$. The presence of aluminum in the voids 128 between the fiber bundles adds weight to the electrode and should thus be minimized after achieving adequate volumetric resistivity and a low characteristic RC time constant.

Figure 9C:
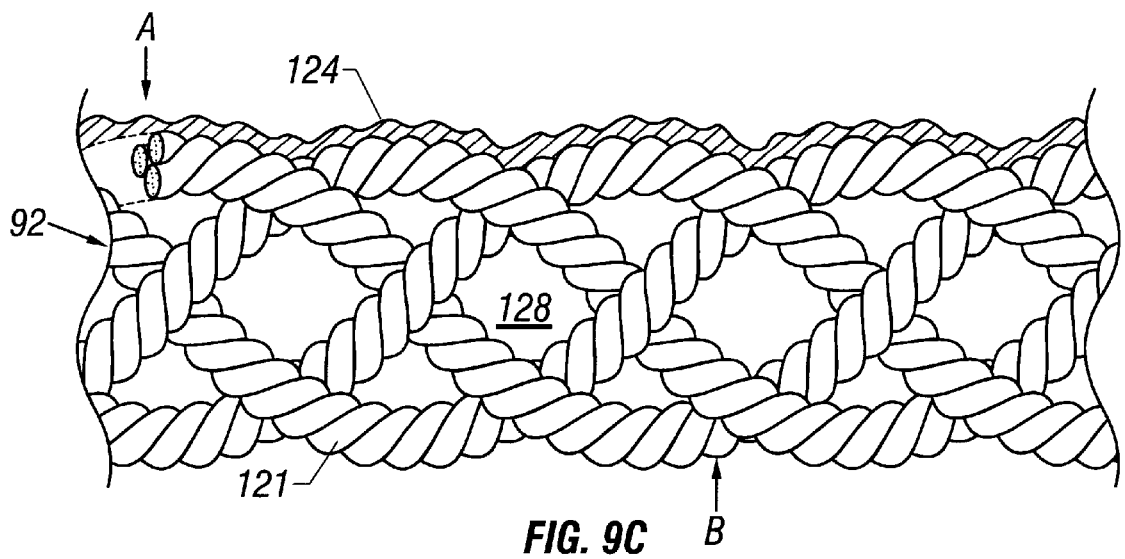
FIG. 9C shows a schematic representation of a side sectional view of the carbon cloth made out of twisted carbon fiber bundles, and illustrates how a plurality of twisted fiber bundles are woven to form the carbon cloth.

Referring to FIG. 9C, a representation of a side sectional view of the carbon cloth 92 made out of triple twisted carbon fiber bundles 121 is shown. A cross-section of one of the triple-twisted carbon fiber bundle is shown and further described in FIG. 9D. The carbon cloth 92 is entirely weaved from the triple twisted carbon fiber bundles 121. Further illustrated is the layer 124 of aluminum formed using the jet sprayer of FIG. 8C. The layer 124 (in FIG. 9C) formed using the jet spray technique is thinner than the layer 124 (in FIG. 9A) formed with the wire arc spray technique. Typically, the layer 124 formed with the jet spray technique is not more than ¼ of the thickness of a single carbon fiber bundle 121 (or carbon fiber bundle 120 if using the carbon cloth in FIG. 9A).

Figure 9D:
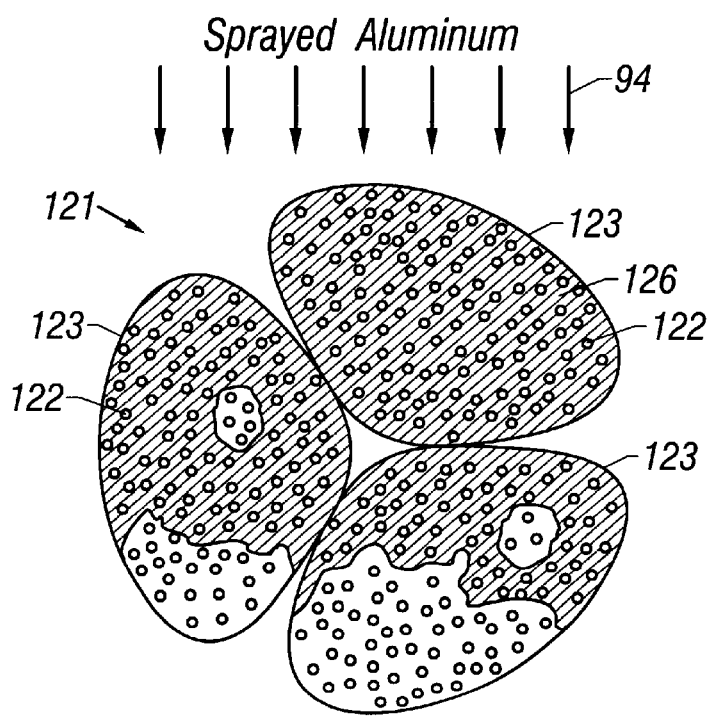
FIG. 9D conceptually illustrates a cross-sectional view of a triple twisted carbon fiber bundle of the carbon cloth, and further conceptually illustrates a preferred penetration of the aluminum deep into the tow of the fiber bundle.

Referring to FIG. 9D, conceptually shown is a cross sectional view of a triple twisted carbon fiber bundle 121 in the embodiment of the carbon cloth shown in FIG. 9C. Three carbon fiber bundles 123 have individual fibers and the tow of each carbon fiber bundle is shown, as well as the ideal impregnation depth of metal into the triple twisted carbon fiber bundle 121.

The three carbon fiber bundles 123 are twisted together to form a triple twisted carbon fiber bundle 121, which is about the same size as the carbon fiber bundle 120 of FIGS. 9A and 9B. The carbon cloth of FIG. 9C will be woven out of many triple twisted carbon fiber bundles 123. The twisting rotates the individual carbon fibers as they extend radially through the length of the fiber bundle 123; thus, less aluminum needs to be impregnated to reach all of the individual fibers of the triple twisted fiber bundle 123. This decreases the amount of carbon to carbon contacts within the fiber bundle 123 and; therefore, lowers the transverse resistance of the carbon cloth 92 using triple twisted fiber bundles even further than with the single fiber bundles 120 in FIG. 9B. The twisting force displaces the shape of the carbon fibers, especially at the edge of each carbon fiber bundle 123, where the carbon fiber bundles 123 begin to fray slightly; thus, allowing more aluminum 94 to be impregnated within the tow 126. Thus, the flow of current from the direction of Point "B" to Point "A" in FIG. 9A is improved with the triple twisted fiber bundle shown in FIG. 9C. By varying the twist and the tow size of the carbon fiber bundles 121, the transverse resistance can be lowered; thus, optimizing the transverse current flow in the carbon cloth 92.

The ideal impregnation depth of the aluminum into the tow 126 of the carbon fiber bundles 120 or the triple twisted carbon fiber bundles 121 has not yet been quantified. It is believed, however, that the impregnation pattern, when viewed in cross-section, is similar to that illustrated in FIGS. 9B and 9D, filling about ⅔ to ¾ of the available tow volume at the point where the bundle is exposed at the surface of the cloth using either the wire arc spraying technique in FIGS. 8A and 8B or the jet spray technique in FIG. 8C. In other words, the impregnation depth is approximately ¼ through the entire carbon cloth 92.

The weight of aluminum retained on or in the carbon cloth is maintained at between about 20–30%, e.g., 25%, of the total weight of the carbon cloth plus aluminum, or about 15% of the total weight, including the electrolyte for the jet spray technique of FIG. 8C. In contrast, the wire arc spray technique of FIG. 8A results in a much thicker layer 124; thus, the weight of aluminum retained on the carbon cloth is about 50% of the total weight of the carbon cloth plus aluminum, including the electrolyte.

Returning to FIG. 22A, it is seen that after the carbon cloth has been sprayed and impregnated with aluminum (block 2204), the impregnated roll of carbon cloth is sliced into strips having a width for the desired capacitor assembly, typically greater than 2 by 10 inches; thus, forming carbon cloth strips (block 2206). For the "prismatic design", the dimension is about 2.2 by 10.8 inches. Alternatively, in an automated assembly process, the impregnated roll of carbon cloth is sliced into smaller rolls having a width of the respective part, in the case of the "prismatic" design, about 10.8 inches. The smaller rolls are then unrolled and cut into the desired size strip needed for assembly of the electrode.

Figure 10A:
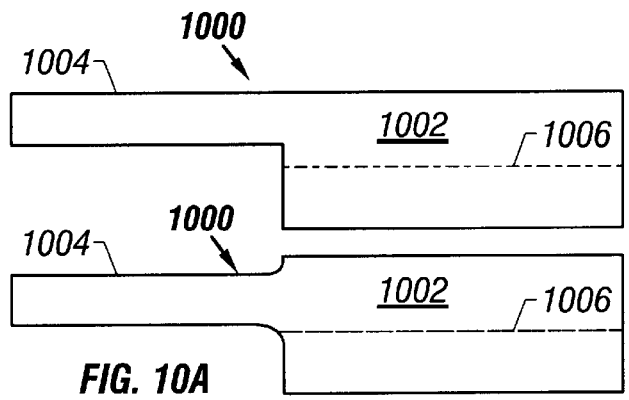
FIGS. 10A–10E illustrates a method for making a plurality of electrodes for use in a multi-electrode double layer capacitor according to the "prismatic" design embodiment of the present invention.

Referring again to FIG. 22A, in a parallel path to preparing the impregnated carbon cloth strips, the current collector foils are also prepared, indicated in step 2202. A first step in preparing the current collector foils is to precut a sheet of aluminum foil into coupons (block 2202). Next, the coupons of aluminum foil is die cut to the exact dimensions necessary (block 2210). FIG. 10A (see below) shows the desired shape of the current collector foil used in the "prismatic" design embodiment. In order to die cut, it is necessary to place sheets of a stiff paper, such as white butcher paper, having the same size as the aluminum foil coupons in between the coupons. The paper adds rigidity to the foil during the die cut and also prevents the coupons from cold fusing together.

Referring to FIG. 22A, after the metal impregnated carbon cloth electrodes and aluminum current collector foils are formed, the electrodes are formed, shown by block 2212. The steps of forming the electrodes are illustrated in FIGS. 10A–10E.

Thus, Referring to FIGS. 10A through 10E, an illustration is shown for making an electrode to be used in a stack of electrodes or winding assembly in "prismatic" design double layer capacitor embodiment of the present invention. Referring to FIG. 10A, a current collector foil 1000 having a tab portion 1004 and a paddle portion 1002 is shown.

The current collector foil 1000 is constructed from a sheet of aluminum foil with a thickness of approximately 0.002 inches. The foil is cut to a shape substantially as shown in FIG. 10A. The tab portion 1004 does not have to flush the edge of the paddle portion 1002, so long as the tab portion 1004 is offset from a central axis 1006 of the paddle portion 1002. Since the tab portion 1004 is offset from the central axis 1006 of the paddle portion 1002 as shown, multiple current collector foils can be stacked on top of each other so that the tab portions face, generally the same direction but do not touch (see FIG. 13). The tab portion 1004 and the paddle portion 1002, thus, comprise a current collector foil 1000 (sometimes referred to as the current collector plate). The current collector foil 1000 is about ten inches long. The paddle portion 1002 is about 5.2 inches long, and the tab portion 1004 is about 4 inches long. The paddle portion 1002 has a width of about 2 inches, and the tab portion 1004 has a width of about 0.75 inch.

Referring to FIGS. 10B, 10C, 10D, and 10E, an illustration of how to make an electrode with an impregnated carbon cloth and a current collector foil 1000 of FIG. 10A is shown. The elements illustrated are the current collector foil 1000 having a paddle portion 1002 and a tab portion 1004, and the metal impregnated carbon cloth 1008 having a central fold line 1010 and an arc sprayed surface 1012.

Figure 10B:
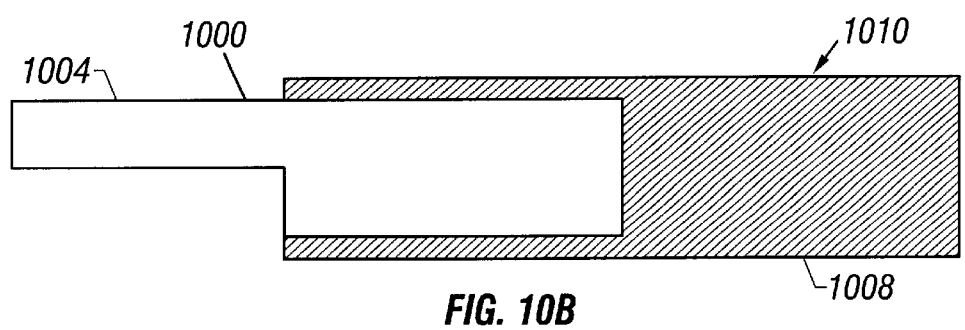
Figure 10C:
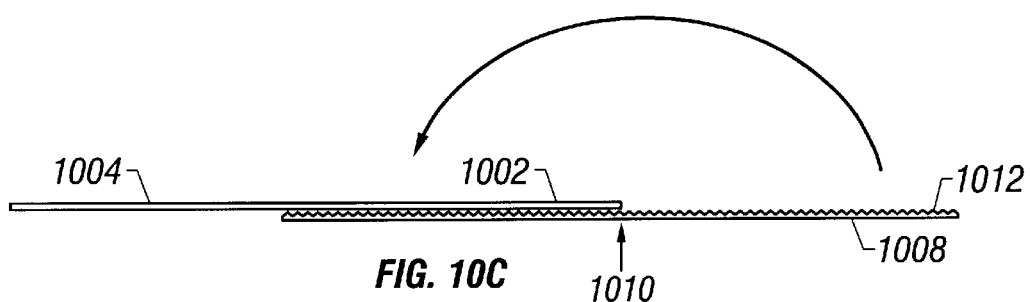
Figure 10D:
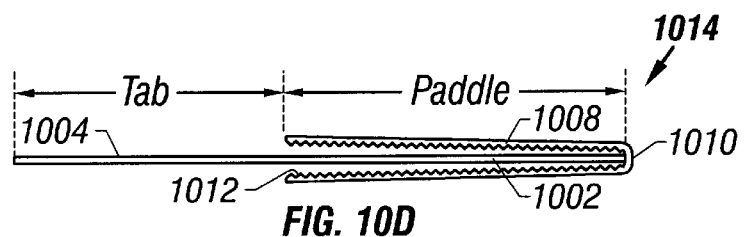
Figure 10E:
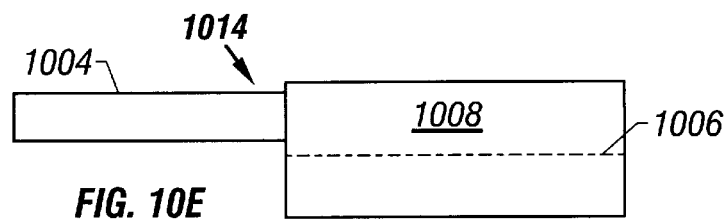

FIG. 10B shows a top view of a strip of metal impregnated carbon cloth 1008 with the current collector foil 1000 of FIG. 10A positioned thereon is shown. The metal impregnated carbon cloth 1008 is formed by arc spraying metal into the carbon cloth strip as discussed with reference to FIGS. 9A–9D. The metal (preferably aluminum) impregnated carbon cloth 1008 is shown having the arc sprayed surface 1012 facing up or toward the current collector foil. The current collector foil 1000 is positioned such that the carbon cloth overlaps the sides of the paddle portion 1002 by a small amount. The arc sprayed carbon cloth 1008 is then folded over a central line 1010 such that the first end of the cloth and the second end of the cloth meet, shown as a side view in FIGS. 10C and 10D. Thus, the arc sprayed surface 1012 of the carbon cloth 1008 contacts the current collector foil 1000. The electrode 1114 comprises the current collector foil 1000 and the aluminum sprayed carbon cloth 1008 contacting the paddle portion 1002 of the current collector foil 1000. FIG. 10D is a side view of the electrode 1014 with the impregnated carbon cloth 1008 folded against the paddle portion 1002 so that the tab portion 1004 extends freely from the electrode 1014. A top view of the electrode 1014 is shown with reference to FIG. 10E. Again the tab portion 1004 is offset from the central axis 1006 of the paddle portion 1002 of the current collector foil 1000. Alternatively, the impregnated carbon cloth strips could be cut along the central line 1010, such that the current collector has one impregnated carbon cloth strip 1008 on one side and another impregnated carbon cloth strip 1008 on the other side, instead of one piece of cloth folded around the current collector foil.

Once the electrode 1014 is formed (Block 2212 of FIG. 22A), the electrode 1014 is pressed with a mechanical press. The electrode 1014 may be pressed at 1800 psi, for example. The impregnated carbon cloth 1008 is compressible or somewhat spongy, so application of this pressure serves to compress somewhat the weave of the fiber bundles so as to make the impregnated carbon cloth 1008 thinner by about 15–20%. This reduction in the thickness of the impregnated carbon cloth translates directly to a reduction in the thickness of the electrode structure, when assembled, and to a reduction in the resistance of the electrode 1014. Further, and more importantly, application of the pressure to the impregnated carbon cloth strips smooths the sprayed side of the carbon cloth 1008 (smooths out the valleys and peaks) so that more surface area of the sprayed aluminum layer 1012 is able to contact the paddle portion 1002 of the current collector foils, so as to reduce the contact resistance $R_C$ of the assembled capacitor. The pressing further helps when wrapping the electrodes as described below. Alternatively, many electrodes 1014 could be stacked and pressed at once; thus, saving time.

Referring back to FIG. 22A, once the electrodes have been formed, a contiguous porous separator sheet is provided to be used in forming the electrode stack or winding assembly, indicated by block 2208.

The contiguous porous separator sheet is made from a suitable insulator/separator based of material, such as polypropylene-based separator or polyethylene-based separator. The separator is typically a polypropylene-based material that is approximately 0.001 inches thick, and has an average pore size of about 0.04×0.12 μm. The separator material used is a roll of material about 5.6 inches wide, enough to slightly overlap the paddle portion 1002 of the electrode 1014, and about 12 feet in unrolled length.

Figure 11:
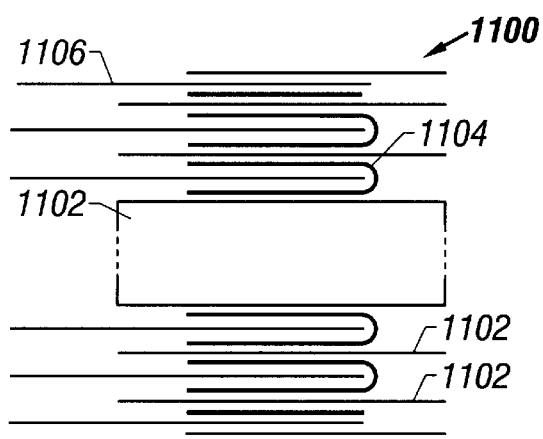
FIG. 11 is a side view of a wrapped electrode stack or winding assembly made from the electrodes in FIG. 10E illustrating the porous separator material winding throughout the electrode stack in a serpentine fashion in accordance with one embodiment of the present invention.
Figure 12:
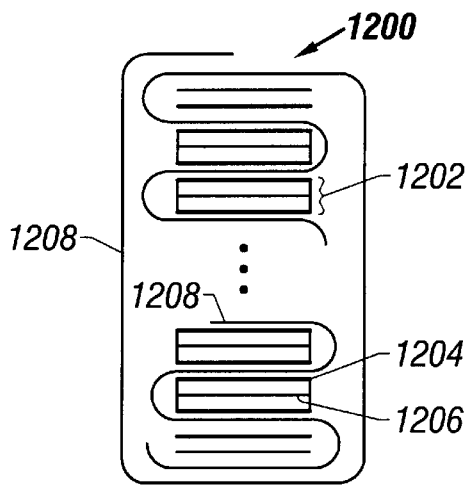
FIG. 12 is a front end view of a winding assembly of FIG. 11, further illustrating the porous separator material winding throughout the electrode stack in a serpentine fashion.
Figure 13:
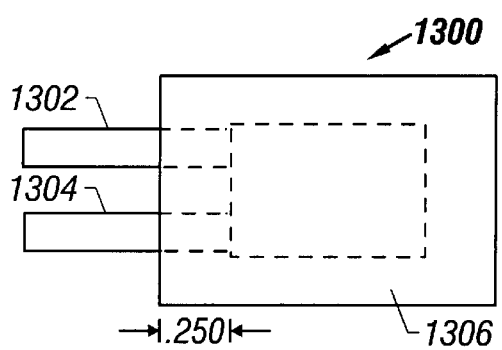
FIG. 13 is a top view of a winding assembly of FIG. 11, illustrating the orientation of the tab portions in the winding assembly in accordance with one embodiment of the present invention.

In block 2214 of FIG. 22A, the wrapped electrode stack or winding assembly is formed. FIGS. 11–13 illustrate how the winding assembly is formed.

Referring to FIG. 11, a side sectional view of an embodiment of a wrapped electrode stack or winding assembly comprising the electrodes of FIGS. 10A–10E is shown. The wrapped electrode stack or winding assembly 1100 has a contiguous porous separator sheet 1102, and a plurality of electrodes 1104 having a tab portion 1106 extending therefrom.

Fifty electrodes, for example, as shown in FIGS. 10A–10E are stacked such that the orientation of the tab portions 1106 is reversed for each adjacent electrode 1104. Thus, the tab portions 1106 of all of the electrodes 1104 of the stack extend in the same direction, but two sets of tab portions are formed. The orientation of the tab portions 1106 is not shown in FIG. 11, but is reflected in FIG. 13. Every other tab portion is in one set of tab portions and the remaining every other tab portions are in the other set of tab portions. The two sets of tab portions connect every other electrode in parallel and; thus, will become the positive and negative terminals of the capacitor.

The electrodes 1104 are stacked such that a contiguous porous separator sheet 1102 is interweaved between each electrode 1104 of the stack. The porous separator sheet 1102 electrically insulates adjacent electrodes 1104 to prevent electrically shorting against each other. The porous separator sheet 1102 overlaps the impregnated carbon cloth strips by approximately 0.250 inches; thus, the separator sheet 1102 extends 0.250 inches over both ends of the electrode (see FIG. 13). The overlap ensures the electrodes 1104 will be completely insulated from each other.

The wrapped electrode stack or winding assembly 1100 is formed by stacking the electrodes and interweaving the separate sheet 1102 in such a way that a first electrode is placed upon the porous separator sheet 1102, then the separator sheet 1102 is folded over the first electrode. Next, a second electrode having its tab portion offset from the first electrode is placed on top of the covered first electrode and the separator sheet 1102 is folded over. Then, a third electrode is stacked on top of the covered second electrode, the third electrode having the same tab portion orientation as the first electrode. The separator sheet 1102 is folded over the third electrode. The process repeats until the desired number of electrodes have all been used. In this embodiment, 50 impregnated carbon cloth electrodes 1104 are used.

Alternatively, the separator sheet 1102 may be cut into pieces that are placed in between the adjacent electrodes. Then, the electrode stack is wrapped with a separator sheet 1102.

In another aspect of the present invention, the capacitor design lends itself to multi-electrode scale up or scale down in order to meet the needs of a particular double layer capacitor application. Thus, by simply increasing or decreasing the size and number of composite electrodes that are used within the electrode stack, and by making appropriate scaled changes in the physical parameters (size, weight, volume) of the capacitor (see FIGS. 16A–21B), it is possible to provide a high performance double layer capacitor that is tailored to a specific application. With such a capacitor, the door is thus opened to a wide variety of applications wherein relatively large amounts of energy must be stored and retrieved from a compact storage device in a relatively short period of time.

Note that the bottom and top electrodes of the winding assembly 1100 need only have impregnated carbon cloth placed against one side of the paddle portion of the current collector foil. The impregnated carbon cloth strips are only necessary on the side of the current collector foil facing the other electrodes. This cloth can be formed by cutting the impregnated cloth of FIG. 10A along the central fold line 1010.

Referring to FIG. 12, a front end sectional view of the wrapped electrode stack or winding assembly 1100 of FIG. 11 is shown. The winding assembly 1200 has a plurality of impregnated carbon cloth electrodes 1202 having current collector foils 1206 and aluminum impregnated carbon cloth strips 1204. The contiguous porous separator sheet 1208 is shown.

From this view, the serpentine manner in which the contiguous separator sheet 1208 winds throughout the winding assembly 1200 is better illustrated. The contiguous separator sheet 1208 winds in between and around adjacent electrodes 1202 in the winding assembly 1200; thus, electrically insulating the adjacent electrodes 1202 and the winding assembly 1200. Once the separator sheet 1208 winds through the entire stack, the separator sheet 1208 continues to wrap around the entire electrode assembly, forming the winding assembly 1200.

Referring to FIG. 13, a top view of the embodiment shown in FIGS. 11 and 12 is shown. The wrapped electrode stack or winding assembly 1300 is shown such that the orientation of the tab portions is illustrated, as earlier discussed with reference to FIGS. 11 and 12. For example, the tab portions of the first, third, fifth, etc. electrodes (starting from the bottom) are aligned in a first set of tab portions 1302. While the tab portions of the second, fourth, sixth, etc. electrodes are aligned in the second set of tab portions 1304. The two sets of tab portions 1302 and 1304 are physically separated and electrically insulated from each other. Once the "prismatic" design double layer capacitor is finished, the first set of tab portions 1302 will be coupled to one capacitor terminal and the second set of tab portions 1304 will be coupled to another capacitor terminal. As will be seen in the FIGS. 18A through 19B, the first, third, fifth, etc., electrode will be connected in parallel and the second, fourth, sixth, etc. electrodes will be connected in parallel. Also shown is the porous separator sheet 1306 and that it should overlap the paddle portion by approximately 0.250 inches as shown.

Alternatively, the process of making the wrapped electrode stack or winding assembly could be automated. The automated process uses reels of impregnated carbon cloth having the desired width, reels of aluminum to be used for current collector foils having the desired width, and a reel of the contiguous porous separator sheet. As the reel of aluminum foil is unrolled, the current collector foils are cut to the shape shown in FIG. 10A. The reels of impregnated carbon cloth are unrolled and cut into strips to be placed against the current collector foils as shown in FIGS. 10B–10E. As the electrodes are stacked, the reel containing the separator sheet is unrolled and wrapped over and around the stack of electrodes by an arm that moves the separator sheet back and forth in the serpentine manner shown in FIGS. 11–13.

Referring back to FIG. 22A, next the winding assembly is pressed (Block 2216). The winding assembly is pressed in a mechanical press at 1800 psi, for example. This pressing step may be in addition to previously having pressed the electrodes or may be the first time the electrodes are pressed. In addition to reducing the contact resistance $R_C$ of the assembled capacitor, the pressing makes it easier to wrap the winding assembly; thus, forming the brick assembly as described below.

Referring again back to FIG. 22A, the next step is to form the brick assembly, indicated in block 2218. The brick assembly is the wrapped electrode stack or winding assembly having been tightly wrapped with an insulating film and containing corner protectors and shims.

Figure 14A:
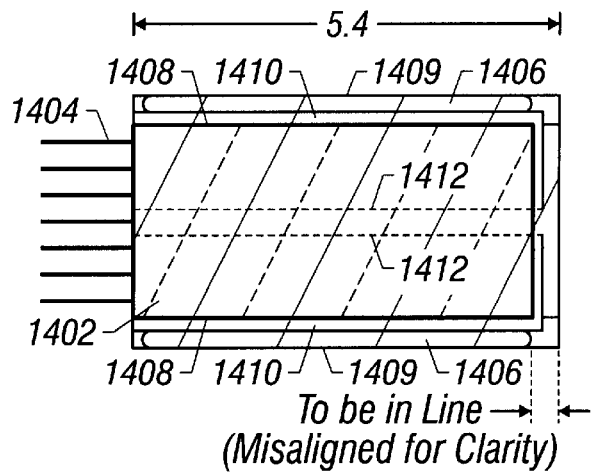
FIGS. 14A and 14B are a side view and an end view, respectively, of a brick assembly made from the winding assembly of FIG. 11.
Figure 14B:
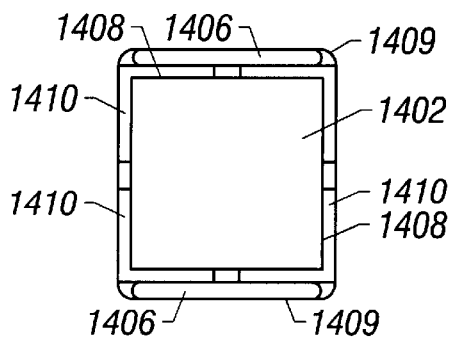

Referring to FIGS. 14A and 14B, shown are a side view and end view, respectively, of a brick assembly 1400 made from the winding assembly shown in FIGS. 11 through 13. The winding assembly 1402 contains the electrode stack wrapped in a contiguous porous separator sheet and having tab portions 1404 extending in the same direction as illustrated in FIG. 13. Also shown are respective shims 1406, insulating film 1408 and 1409, and respective corner protectors 1410 having edges 1412.

Figure 19C:
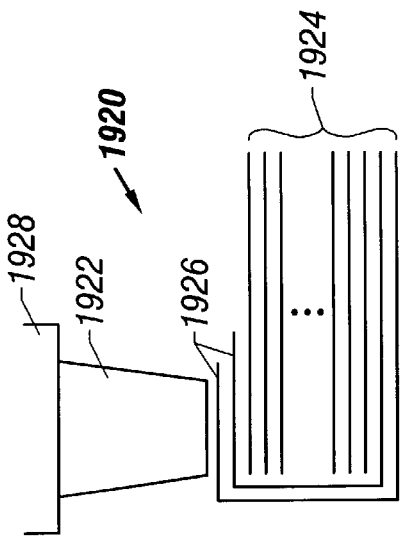
FIGS. 19C and 19D show a representation of an ultrasonic bonding technique used for bonding many current collector foils together.
Figure 19D:
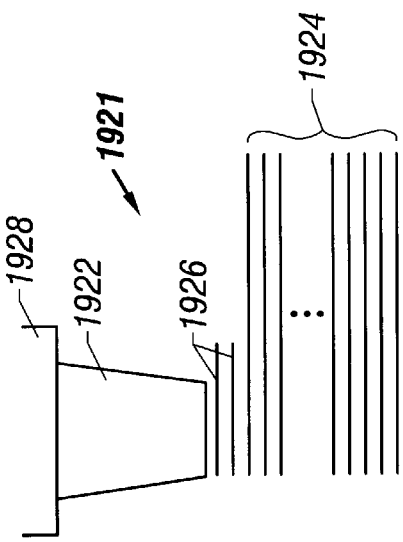

For this embodiment of the present invention, the brick assembly 1400 is used to construct a "prismatic" design double layer capacitor, also referred to as the PC 2500 design. The electrode stack is interweaved and wrapped with the contiguous porous separator sheet as shown above with reference to FIGS. 11–13. In order to add to the height of the winding assembly 1402, a respective shim 1406 is placed on top and bottom of the winding assembly 1402. FIGS. 18B and 19B illustrate the position of a shim 1406 from a top view. Once the brick assembly 1400 is inserted into a capacitor container, the shims 1406 will exert a modest constant pressure against the winding assembly 1402 so that the exterior dimension (height) of the brick assembly 1400 is forced to conform with the interior height of the capacitor container (see FIGS. 17 through 18B). This modest constant pressure forces the aluminum impregnated carbon cloth strips into tight contact with the respective current collector foils, so that the collector resistance is minimized.

Figure 15:
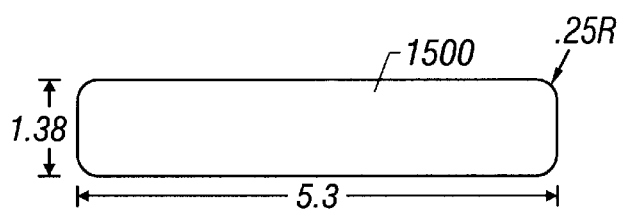
FIG. 15 is a shim that is used in the construction of the brick assembly of FIG. 14.

Briefly referring to FIG. 15, a 1500 shim is shown for use in forming a brick assembly. The shims 1500 are rectangular in shape having rounded edges. The shim 1500 is made of a chemically neutral material, e.g. aluminum and is approximately 1.38 inches wide and 5.3 inches long. The width of the shim 1500 varies depending on the interior dimensions of the capacitor container and the exterior dimension of the winding assembly. In this embodiment, the shim is 0.05 inches thick.

Referring back to FIG. 14, a shim 1406 is placed on top of the winding assembly 1402 and is held in place by tightly wrapping a layer of polyester insulating film 1408 around the winding assembly 1402 once. The insulating film 1408 (and 1409) is a chemically neutral insulator, such as polyester, having a width of about 1 inch and a thickness of about 0.005 inches. Typically, the film 1408 is tightly wrapped around the winding assembly 1402 starting at the side opposite the tab portions 1404 and wrapped in the direction of the end having the tab portions 1404. The film 1408 should generously cover the ends of the winding assembly 1402. Next, another shim 1406 is placed on the bottom of the assembly and then tightly wrapped with another layer of polyester film 1408.

After the shims 1406 are wrapped by the insulating film 1408, four Mylar corner protectors 1410 are positioned around each corner, or lengthwise edge, extending the length of the winding assembly 1402. The corner protectors 1410 are similar to the insulating film 1408, except that they comprise a thicker, more rigid film. The corner protectors are a piece of material approximately the length of the winding assembly 1402 or slightly longer (here, about 5.4 inches) and wide enough to be folded along the edge of the assembly (here about 2 inches) overlapping the edge of the assembly as shown by the edge 1412 of the corner protector 1410. The edge 1412 is shown as a dotted line since it is beneath a layer of film 1409. The corner protectors 1408 protect the corners and edges of the brick assembly 1400 during insertion of the brick assembly 1400 into the capacitor container, so that the internal electrodes will not be damaged, discussed further with reference to FIG. 17. Again, another layer of insulating film 1409 is tightly wrapped around the assembly to hold the Mylar corner protectors 1410 in place. The resulting brick assembly 1400 has a fairly rigid shape, but it is still compressible from top to bottom. Once the polyester film 1408 is completely wrapped around the brick assembly 1400, the brick assembly 1400 is tested for electrical shorts between the adjacent electrodes. If the brick assembly 1400 passes, the brick assembly 1400 is ready to inserted into the capacitor container.

Figure 16A:
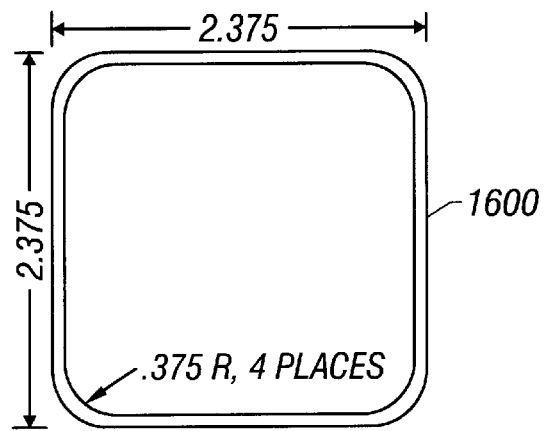
FIGS. 16A and 16B show a front and side view, respectively, of a capacitor container or can used to hold the brick assembly of FIG. 14.
Figure 16B:
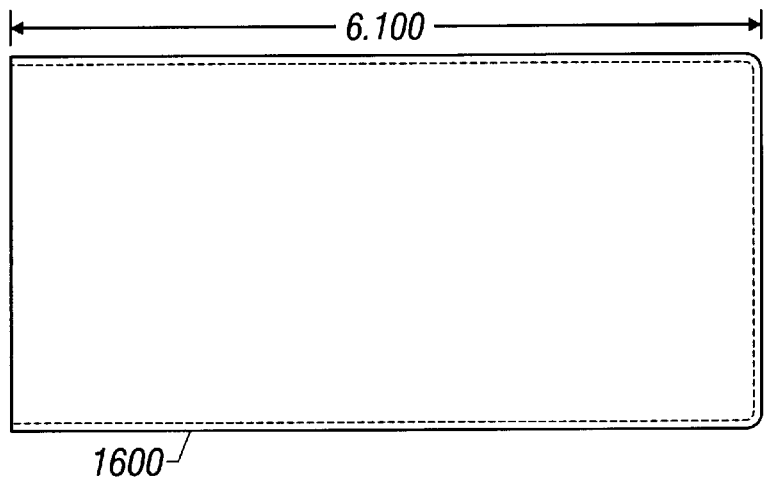

Referring to FIGS. 16A and 16B, a side view and a front view of the capacitor container 1600 is shown. The capacitor container or "can" 1600 for the prismatic design, PC 2500, is an elongated, open-ended container for holding the brick assembly 1400 of FIG. 14. The can 1600 is about 6.1 inches long by 2.375 inches wide. It has rounded corners with a radius of 0.375 inches. The can 1600 is made of an annealed aluminum alloy and is about 0.043 inches thick.

Referring again to FIG. 22A, the brick assembly of FIGS. 14A and 14B is inserted into the can of FIGS. 16A and 16B, shown by block 2220.

Figure 17:
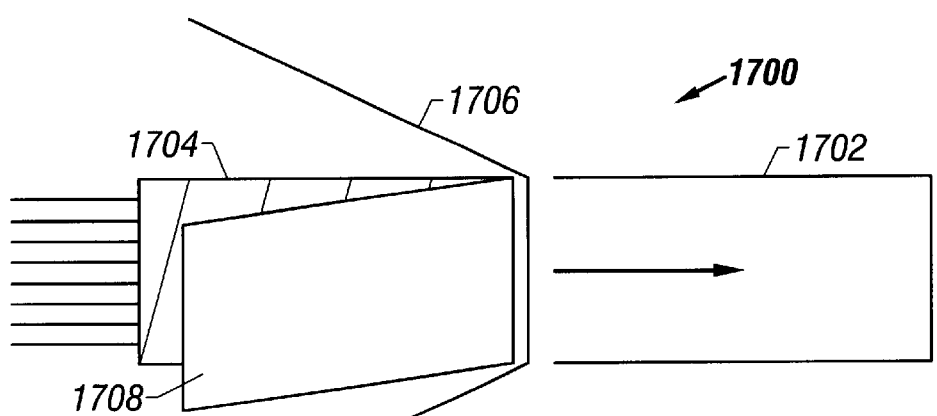
FIG. 17 is a side view illustrating how the brick assembly of FIG. 14 is inserted into the capacitor container of FIGS. 16A and 16B.

Referring to FIG. 17, an illustration 1700 of the brick assembly being inserted into the can is shown. Shown are the brick assembly 1704, the can 1702, and two strips of Mylar corner protector material 1706 and 1708. The two strips of corner protector material 1706 and 1708 are folded about the brick assembly 1704 as shown. As the brick assembly 1704 is pushed into the can 1702, the strips of corner protector material 1706 and 1708 function like a "shoe horn" to guide the brick assembly 1704 into the can 1702 without damaging the internal components of the brick assembly 1704.

The strips of Mylar corner protector material 1706 and 1708, as well as the corner protector material inside the brick assembly 1704, help protect the corners and edges of the brick assembly 1704 and ensure that the electrodes are not deformed upon insertion into the can 1702. The corners of the brick assembly 1704 are straight, while the corners of the can 1702 are rounded.

An important feature of the "prismatic" assembly is that the external dimension (height) of the brick assembly 1704 is slightly greater than the interior dimension (height) of the can 1702. When the brick assembly 1704 is inserted into the can 1702, a modest constant pressure is exerted on the brick assembly 1704. The importance of this feature is discussed with reference to FIG. 18A.

Referring again to FIG. 22A, once the brick assembly is fit into the can, the capacitor terminals are formed in block 2222. FIGS. 18A–19B illustrate this process.

Referring to FIGS. 18A and 18B, a side view 1800 and a top view 1801, respectively, are shown of the brick assembly having been inserted into the can. Shown are the can 1803, brick assembly 1802 having been compressed, and the two sets of tab portions 1804 and 1806. The brick assembly 1802 contains the shims 1808, the corner protectors 1810 having edges 1811, the polyester film 1812, and the folded strips of Mylar 1814.

Shown in FIG. 18A, the tab portions of both sets of tab portions 1804 and 1806 have all been folded down and level with the bottom of the brick assembly 1802. The two sets of tab portions 1804 and 1806 are really aligned, but are intentionally drawn to be misaligned for clarity. The edges 1811 of the corner protectors 1810 are indicated by dashed line.

FIG. 18B shows the positioning of the shim 1808 on the top side of the brick assembly 1802 and the orientation of the sets of tab portions 1804 and 1806 from the top view of the can 1803. A similar shim 1808 is on the bottom side of the brick assembly 1802, as well. The two sets of tab portions 1804 and 1806 are more clearly illustrated. Again the tab portions of each set will be connected to a respective capacitor terminal. One set of tab portions (e.g., 1804) will be a positive polarity and the other set of tab portions (e.g., 1806) will be a negative polarity.

FIG. 18A also illustrates the constant modest pressure that is placed upon the brick assembly 1802. The carbon cloth inside the brick assembly 1802 is somewhat spongy, so that it is compressed sufficient to fit within the can 1803. The shims 1808 give the brick assembly 1802 just enough thickness on the top and bottom such that the interior of the can 1803 puts pressure "P" on the brick assembly 1802. This continual modest pressure further serves to lower the contact and electrode resistance of the electrode assembly because it keeps the paddle portions of the current collector foils in firm mechanical contact with the sprayed side of the respective impregnated carbon cloth strips. The presence of such constant modest pressure is represented in the drawings by the arrows which symbolically represent that the brick assembly 1802 is maintained under a constant modest pressure, "P" applied in a direction so as to force or press the electrodes in contact with the current collector foils. While the modest pressure is about 10 psi, in practice the pressure may vary anywhere from about 5 psi to 18 psi. The structural design of the can 1803, while not comprising a pressure vessel per se, is nonetheless designed to withstand an internal pressure of up to about 70 psi.

Figure 19A:
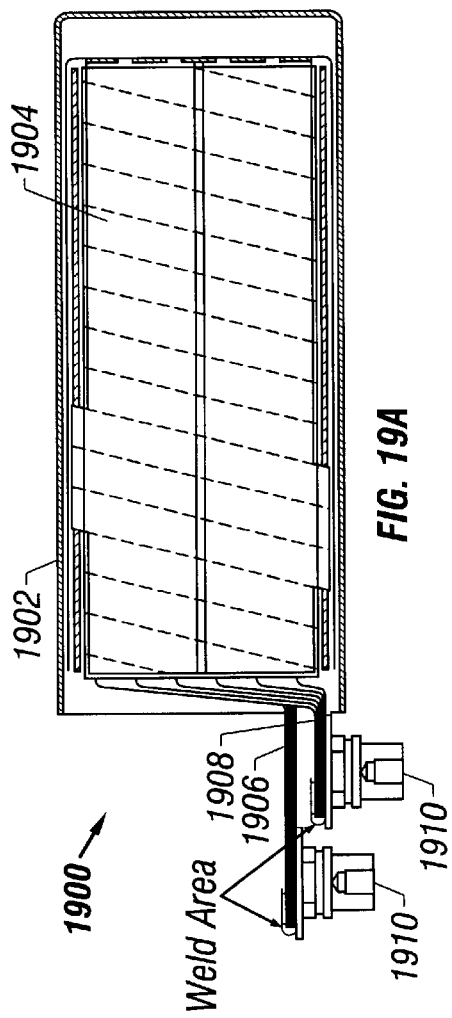
FIGS. 19A and 19B are a side and top view, respectively, illustrating the formation of the capacitor terminals from the tab portions extending from the device of FIGS. 18A and 18B.
Figure 19B:
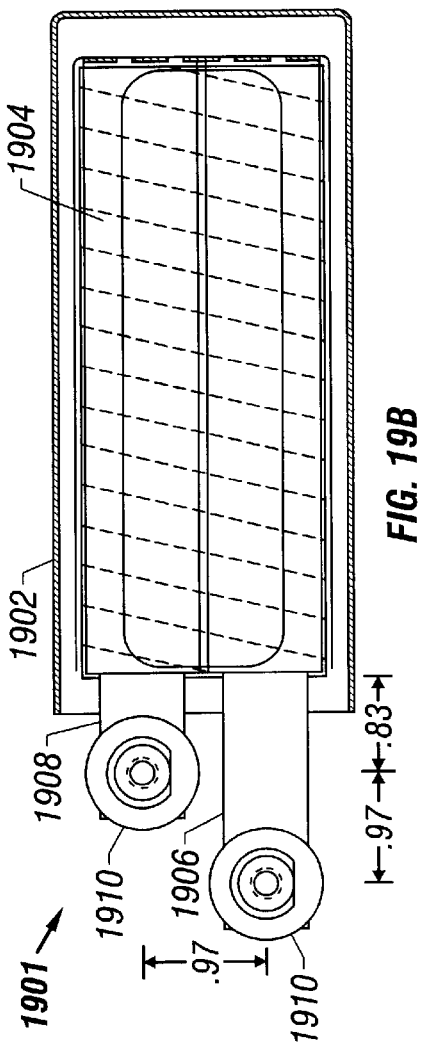
Figure 20A:
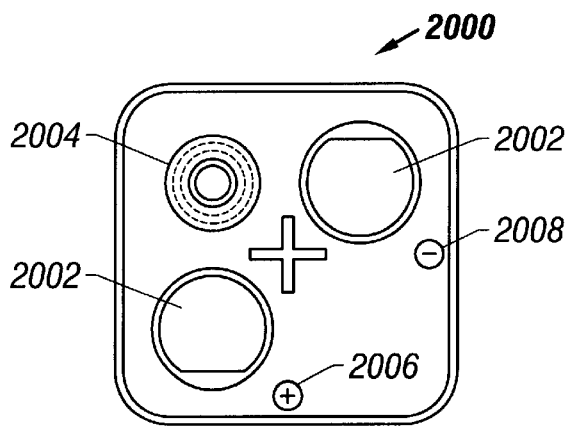
FIGS. 20A and 20B are a front and side view, respectively, of the lid used to close and seal the capacitor case containing the brick assembly of FIGS. 19A and 19B.
Figure 20B:
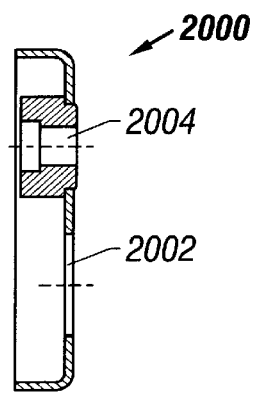

Referring to FIGS. 19A and 19B, the embodiment of the prismatic design of FIGS. 18A (1900) and 18B (1901) is shown having capacitor terminals 1910 welded in position. Shown are the can 1902, the brick assembly 1904, the two sets of tab portions 1906 and 1908, and two capacitor terminals 1910.

The two sets of tab portions 1906 and 1908 are formed by separating the two longest tab portions of each set of tab portions from the other tab portions. For example, the two longest tab portions (the bottom two tab portions) of the first set of tab portions 1906 are left laying flat while the remaining tab portions of the first set of tab portions 1906 are folded back against the brick assembly 1904. The remaining tab portions (23 portions) are cut so that they are flush with the top edge of the brick assembly 1904. The remaining tab portions are then folded back down flat with the two longest tab portions. The two longest tab portions are cut about one inch (+/−0.125 inches is acceptable) longer than the remaining tab portions and then folded over the remaining tab portions.

The other set of tab portions 1908 are formed using the same process, except the 23 separated tab portions are cut 1 inch (not greater than 1.25 inches) away from the top edge of the brick assembly 1904 and the two longest tab portions are cut ¾ inch (+/−0.125 inches is acceptable) longer than the cut remaining tab portions having been folded back flat. Again, the two longest tab portions are folded over the 23 other tab portions.

The folded sets of tab portions 1906 and 1908 are then welded together and to a respective capacitor terminal 1910 using ultrasonic welding such as shown in FIGS. 19C and 19D, or another suitable technique.

The capacitor terminals 1910 shown in FIGS. 19A and 19B as bonded such that the center of the capacitor terminal is about 0.83 inches from the edge of the brick assembly 1904. The centers of capacitor terminal 1910 are located 0.97 inches from each other are in length and width.

Referring next to FIGS. 19C and 19D, a schematic representation is shown for ultrasonically bonding many current collector foils is shown. The representations 1920 and 1921 show a high frequency horn 1922 of the an ultrasonic welder 1928, current collector foils 1924, and "dummy foils" 1926.

Typically, ultrasonic welding is problematic for welding more than 8–10 aluminum current collector foils (here, tab portions) together. The problem is that in order for the high frequency horn 1922 of the ultrasonic welder 1928 to reach all of the layers of foil, the high frequency horn 1922 cuts a pattern into several of the first layers of aluminum foil; thus, reducing the effective transfer of current from the top layers of current collector foils. Therefore, it is difficult to weld more than 10 layers of foil together without destroying the function of the top several foils as current collectors.

A solution is to provide "dummy foils" 1926 that sit on top of the current collector foils 1924 to be bonded. As the high frequency horn 1922 bonds the stack together, the high frequency horn 1922 cuts into the "dummy foils" 1926 and not the current collector foils 1924. The "dummy foils" 1926 are ruined as far as functioning as a current collectors, but there is no harm since the "dummy foils" 1926 are not actually intended to collect current. By adding a variable number of "dummy foils" 1926 to the stack of foils to be bonded, the number of current collector foils 1924 that can be bonded is increased. In the embodiment shown in FIGS. 19A, 19B, and 19C, the two longest tab portions of each set of tab portions (current collector foils 1924) are folded over act as the "dummy foils" 1926; thus, enabling all twenty five current collector foils 1924 (tab portions) to be bonded together and to the respective capacitor terminals 1910 (not shown in FIGS. 19C and 19D. Alternatively, as shown in FIG. 19D, several pieces of foil could be cut and placed on top of the current collector foils 1924 to act as the "dummy foils" 1926 instead of folding over the two longest tab portions.

The technique for ultrasonically bonding a large number of current collector foils 1924 may have other applications than creating a capacitor terminal as shown in FIGS. 19A and 19B. The number of "dummy foils" 1926 used will depend on the number of current collector foils 1924 or metal foils used. The technique described enables at least 25 current collector foils to be bonded to create a single electrical interconnection.

Referring again to FIG. 22A, the next step is to install the capacitor terminals in the lid, block 2224. Then to close and seal the can to form the "prismatic" design double layer capacitor, block 2226. These steps are illustrated in FIGS. 20A through 21B.

Referring 20A and 20B, a front and side view, respectively, of the lid used to close and seal the prismatic design double layer capacitor is shown. The lid 2000 has two terminal holes 2002, one fill hole 2004, and positive 2006 and negative 2008 markings. The terminal holes 2002 are for receiving the capacitor terminals 1910 of FIGS. 19A and 19B. The fill hole 2004 is for saturating the assembly with an electrolytic solution, then receiving a fill plug (not shown). Typically, the lid 2000 is comprised of the same material as the can.

Figure 21A:
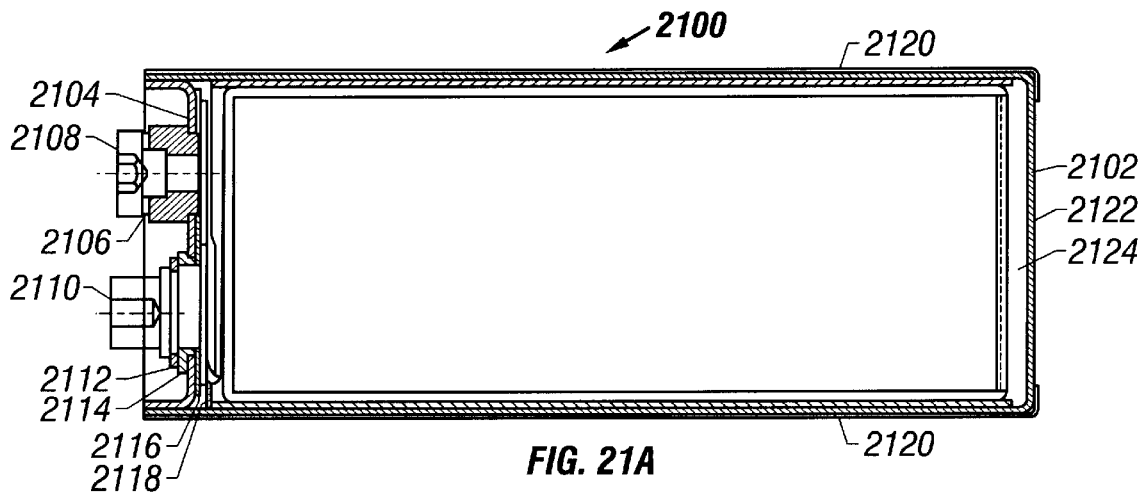
FIGS. 21A and 21B are a side view and a front end view, respectively, of the capacitor container of FIGS. 19A and 19B having been sealed with the lid of FIGS. 20A and 20B.
Figure 21B:
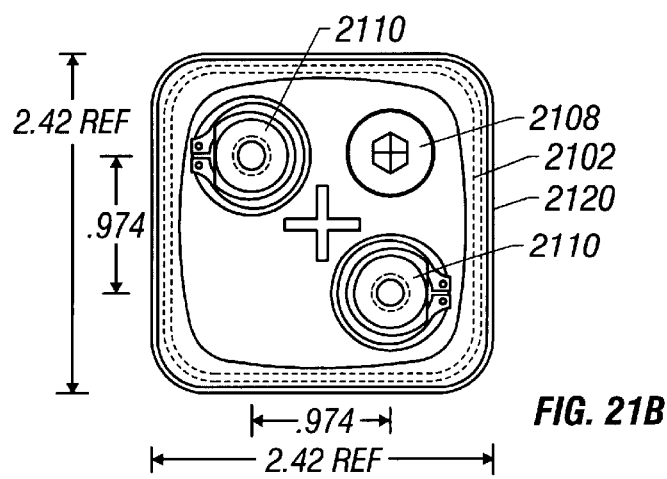
Figure 22A:
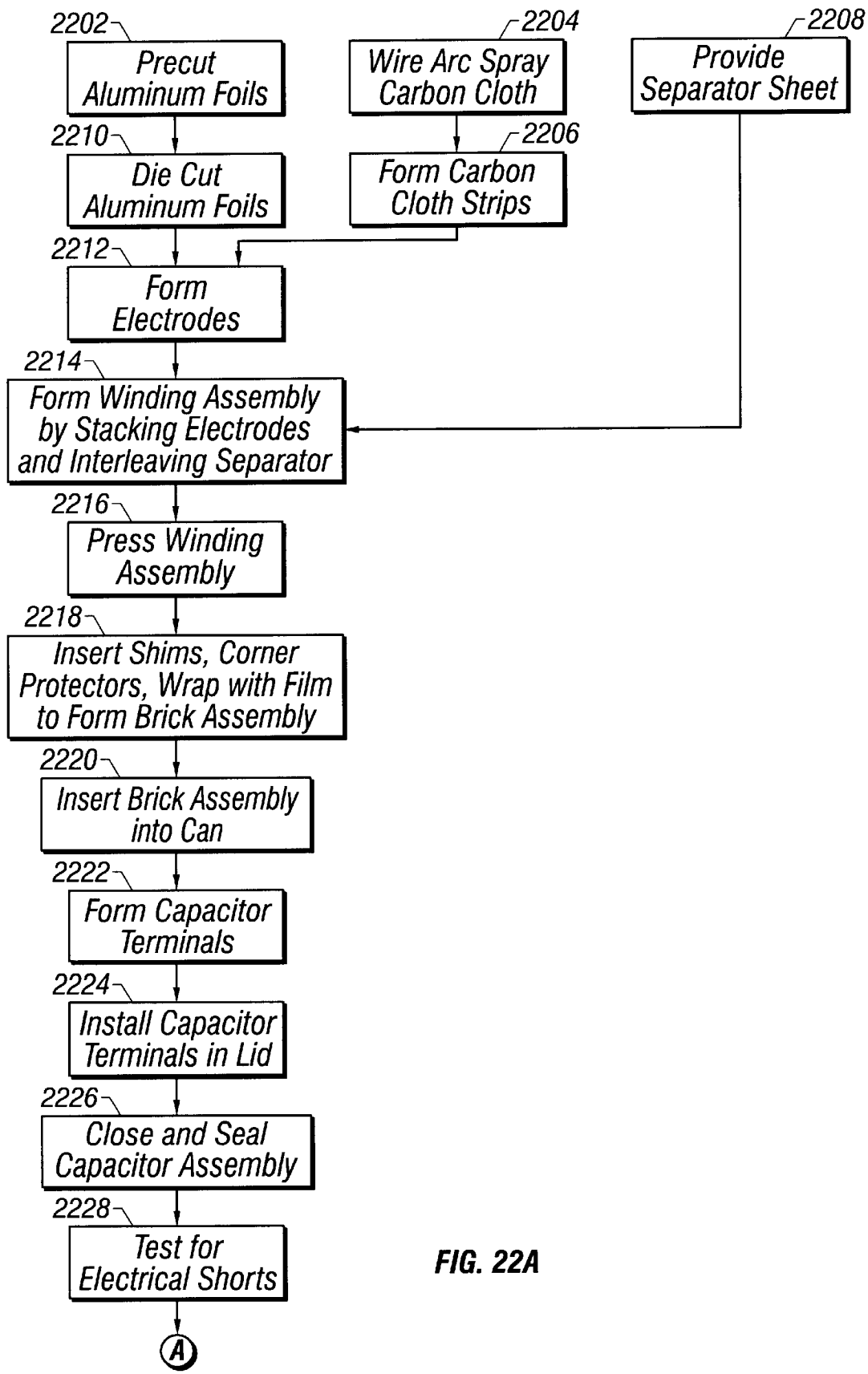
FIGS. 22A and 22B are a flowchart that illustrates the method of making and assembling the preferred embodiment for the "prismatic" design double layer capacitor shown in FIGS. 10A–21.
Figure 22B:
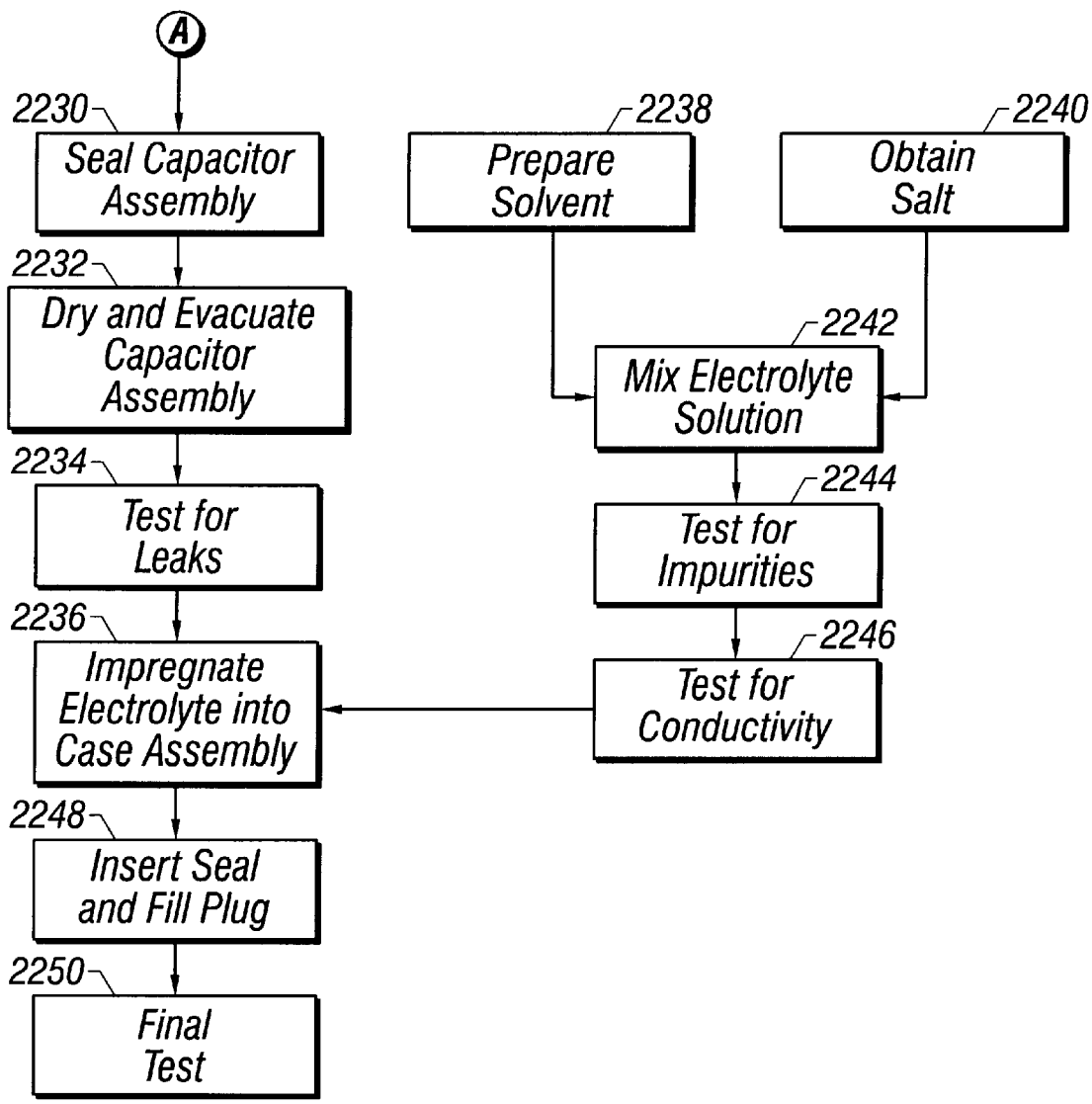

Referring to FIGS. 21A and 21B, a side view and front end view, respectively, of the embodiment of the completed "prismatic" design, PC 2500, is shown as assembled from the components and steps illustrated in FIGS. 10A through 20B. Shown are the can 2102, lid 2104, an O-ring seal 2106, seal plug 2108, capacitor terminal 2110 (only one is shown), a retaining ring 2112, an insulating washer 2114, capacitor terminal seal 2116, an insulator 2118, tubing 2120 and end insulator 2122, and electrolyte solution 2124 (added later).

The capacitor terminals 2110 are installed onto the lid 2104. A retaining ring 2112 and insulating washer 2114 are placed between the external edge of the capacitor terminal 2110 and the lid 2104 for holding the capacitor terminal 2110 firmly and for electrically insulating the lid 2104 and can 2102 from the capacitor terminal 2110. The lid 2102 is then placed into the can 2102 such that the sets of tab portions are bent as shown in order to seal the can 2102. A die cut Teflon insulator 2118 is placed between the lid 2104 and the brick assembly to further insulate the brick assembly. The capacitor terminal seal 2116 is used to seal the capacitor terminal 2110 to the lid 2104. Furthermore, an end insulator 2122 is placed at the end of the can 2102, then the assembly 2100 is layered with a tubing 2120. The tubing is clear PVC that is heat shrunk around the assembly 2100.

An important component needed to complete the capacitor assembly 2100 is a means for filling the closed assembly with a suitable electrolytic solution 2124, and then permanently sealing the assembly 2100. To this end a seal plug 2108, which is threadably received into a fill hole of the lid 2104 is provided. An O-ring seal 2106 is used with the seal plug 2108 in order to effectuate the seal.

Referring again to FIG. 22A, once the capacitor assembly has been closed (block 2226), such as by welding the lid in place on the can, the capacitor assembly is tested for electrical shorts. This test is performed simply by measuring the resistance between the two capacitor terminals, each of which is conductive. In an ideal capacitor, this resistance (for a "dry" assembly—no electrolyte yet introduced into the closed case) should be infinite. A low resistance measurement, e.g., of just a few ohms, between the two terminals of the closed dry assembly, indicates that an electrical short has occurred internal to the assembly. In practice, a dry resistance of at least 20 M$\Omega$ is acceptable to pass this test for electrical shorts.

Referring now to FIG. 22B, the remaining steps are shown for testing and completion of the "prismatic" design double layer capacitor, PC 2500 in accordance with one embodiment of present invention. Once the capacitor has been assembled as shown in FIGS. 21A and 21B and tested for electrical shorts (block 2228, FIG. 22A), the case assembly is sealed (block 2230), as required, or made sealable, using the seal plug and O-ring gasket. The sealable case assembly is then evacuated and the internal components are thoroughly dried (block 2232). Such drying process typically takes place over a 2 or 3 day period, and comprises attaching a vacuum pump to the closed assembly, via the fill hole (FIGS. 21A and 21B), and maintaining a constant negative pressure of about $10^{-6}$ Torr for a specified period of time, e.g., 48 to 72 hours. Once dried, the capacitor assembly is tested for leaks (block 2234). Such leak testing may be done using any suitable technique as is known in the art. A preferred leak test includes spraying an inert gas, e.g., helium (He), over and around the closed case assembly while it is still connected to the vacuum pump, and while a negative pressure is still maintained within it. If there is a leak, the negative pressure inside the case assembly sucks the He gas through the leak, and the He gas can then be detected in the outstream flow of the vacuum pump.

If the leakage test is successfully passed, then the case is ready to be impregnated, through the fill hole, with a prescribed amount of a specified electrolytic solution (block 2236).

The electrolytic solution is mixed by dissolving a selected salt in a prescribed solvent. Hence, to prepare the solution, the solvent is prepared (block 2238) and the specified salt (block 2240) is procured. As previously indicated, the preferred solvent is an organic solvent acetonitrile ($CH_3CN$). The preferred salt is tetraethylammonium tetraflouraborate, or $(CH_3CH_2)_4N^+BF_4^-$. Another preferred salt is triethylmethylammonium tetraflouraborate, or $(CH_3CH_2)_3CH_2N^+BF_4^-$. Other salts, such as Imidizolium based salts may be used by the skilled artisan. The electrolytic solution is mixed (block 2242) by first drying the salt for at least 12 hours, and then dissolving the dried salt in the solvent. The ratio of salt to solvent is 303.8 g/liter, which yields 1.4 moles/liter.

Figure 23A:
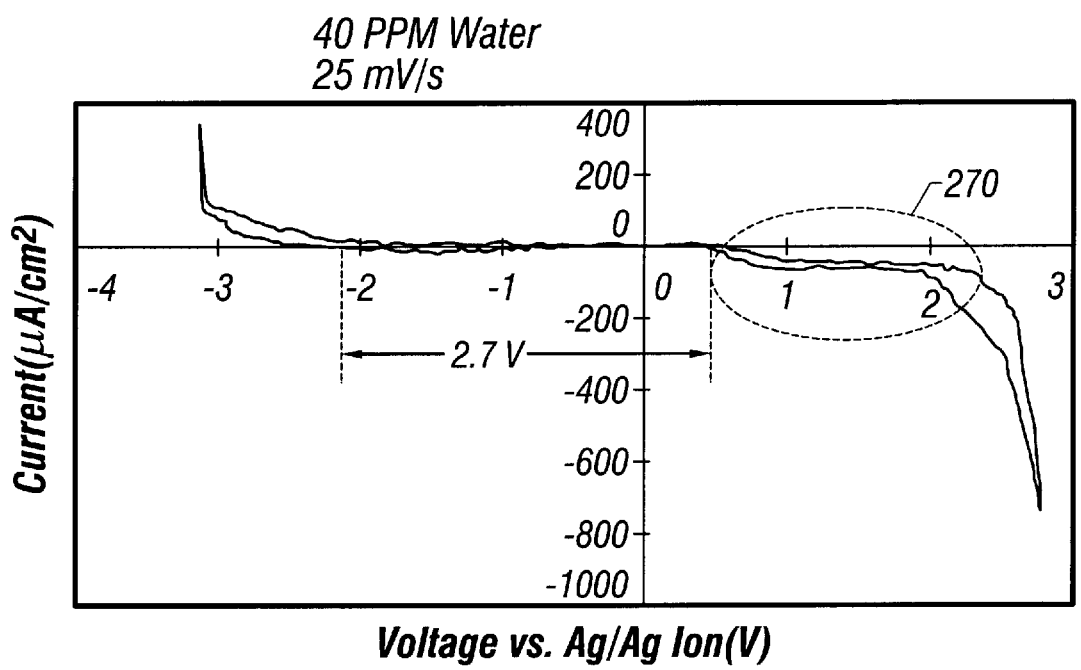
FIGS. 23A and 23B show current-voltage graphs of the double layer capacitor made in accordance with one embodiment of the present invention, and further illustrate the working voltage obtainable with such design for two different levels of impurities (water) in the electrolytic solution.
Figure 23B:
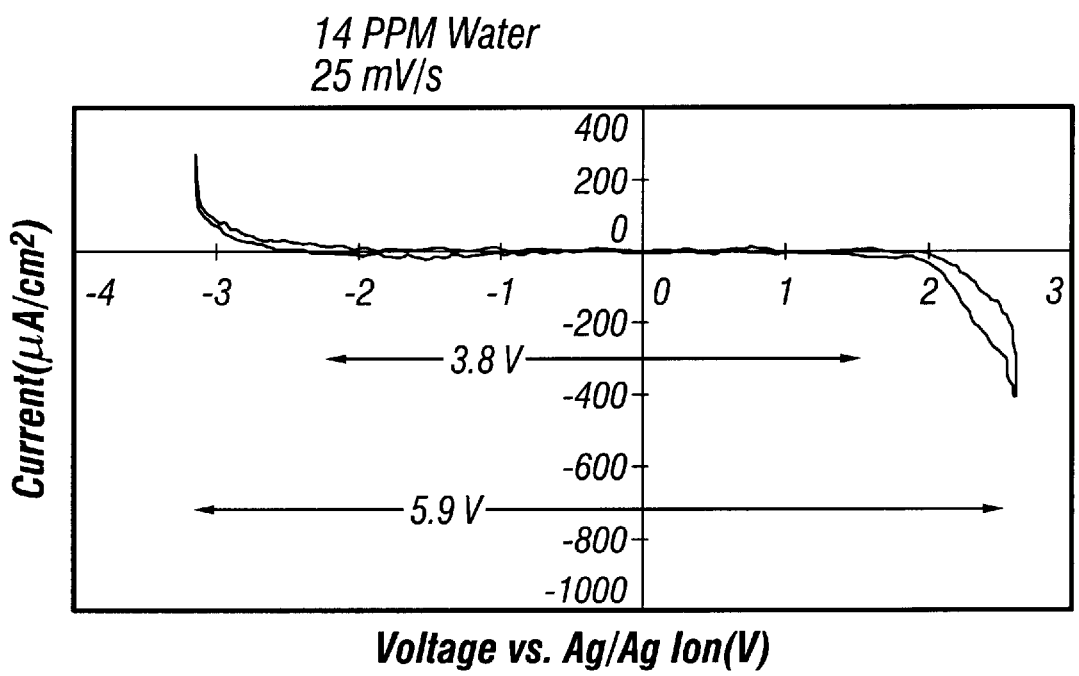

Once mixed, the electrolyte is tested for impurities (block 2244). It is important that the amount of water in the electrolyte be reduced to less than 30 ppm (parts per million), preferably less than about 15 ppm. If the level of impurities, e.g., water, in the electrolyte exceeds 30 ppm, the operating voltage of the capacitor may be adversely affected. For example, when the amount of water in the electrolyte reaches a level of 40 ppm, the useful operating voltage of the capacitor is reduced to about 70% of what it is when the water in the electrolyte is only 14 ppm, as shown in FIGS. 23A and 23B. It is thus seen that it is important for impurities, particularly water, to be removed from the electrolyte before the electrolyte is impregnated into the closed case assembly. (It is noted that some additives may be added to the electrolyte, e.g., to enhance its performance or improve the operating life of the capacitor; but water must be avoided.)

The water content of the solution is measured using a coulometric titrator, as is known in the art. A representative titrator that may be used for this purpose is the LC3000 Titrator available from EM Science Aquastar.

Unfortunately, some water may already be inside of the closed case assembly, despite attempts to thoroughly dry the inside of the assembly. For example, water may be trapped in the carbon fibers of the carbon cloth. Such trapped water may be released into the electrolyte, thereby becoming an impurity within the electrolyte, as soon as the impurity-free electrolyte is impregnated into the case assembly. To remove such water (or similar impurities) from the carbon, it is contemplated that the closed assembly be flushed with a suitable solvent, e.g., acetonitrile, the electrolytic solution, or other water-scavenger material, prior to filling the assembly with the electrolyte. It is also contemplated that the carbon cloth, prior to being impregnated with aluminum, and/or after being impregnated with aluminum, but before being assembled in the electrode stacks, may also be flushed or cleansed with a suitable material (e.g., water scavengers or additives that search out and remove water) selected to remove impurities, especially water.

If the electrolytic solution successfully passes the impurity test (block 2244), it is also tested for conductivity (block 2246). The conductivity test is performed using a conventional conductance meter that measures conductance using an ac signal. The conductance of the solution should be at least 55–58 mmho/cm at 22° C.

Once the electrolytic solution has been mixed and tested for impurities and conductivity, it is impregnated into the closed case assembly (block 2236). Impregnation is preferably done by vacuum backfilling, as known in the art. The amount of electrolytic solution that should be impregnated into the closed case, for the "prismatic" case design shown in FIGS. 21A and 21B, is 280 g (322 ml).

After the prescribed amount of electrolytic solution has been impregnated into the closed case, the seal plug is inserted into the fill hole of the lid to finally seal the case (block 2248). Then, final electrical tests of the capacitor are performed (block 2250) to test whether the capacitor meets its specified performance criteria.

Clamshell and Double-ended Packaging Designs

Alternative designs are possible for the single cell, multi-electrode double layer capacitor. The following embodiments parallel the process used to make the "prismatic design" double layer capacitor with several distinctions. FIG. 22A and 22B, and other appropriate Figures, will be referred to with reference to the following embodiments of the present invention.

Thus, turning to FIGS. 28A through 28B and FIGS. 24A through 27C, the basic technique used in making a double layer capacitor in accordance with this embodiment of the present invention will be described. FIGS. 28A and 28B are a flow chart that illustrates the main steps in such process; while FIGS. 24A through 27C illustrate individual steps of the process. Hence, in the description of the assembly and fabrication process that follows, reference will be made to specific blocks or boxes of the flow chart of FIGS. 28A and 28B to identify particular steps, at the same time that reference is made to respective ones of FIGS. 24A through 27C to illustrate the step being carried out. FIGS. 28A through 28B are similar to FIGS. 22A through 28B with several distinctions. Alternatively, the process used in FIGS. 28A through 28B may use the same steps in FIGS. 22A through 22B.

With reference first to block 200 of FIG. 28A, an initial step to be carried out in making another embodiment of the capacitor 90 (FIG. 6) in accordance with the present invention is to arc spray a suitable carbon cloth with molten aluminum spray so that the aluminum is impregnated deep into the tow of the fibers of the carbon cloth, just as is done in block 2204 of FIG. 22A, and shown in FIGS. 8A through 9D.

Returning to FIG. 28A, it is seen that after the carbon cloth has been sprayed and impregnated with aluminum (block 200), the impregnated carbon cloth is precut into strips having dimensions greater than 2 by 10 inches (block 202). The precut impregnated carbon cloth strips and then die cut (block 204) to more exact dimensions of 2×10 inches, and the corners of the strip are rounded to have a radius of approximately 0.03 inches. The die cut impregnated carbon cloth strips are then pressed in a mechanical press so as to be subjected to a pressure of about 1600 psi. The pressing step is further explained in connection with 2214 of FIG. 22A.

Figure 24A:
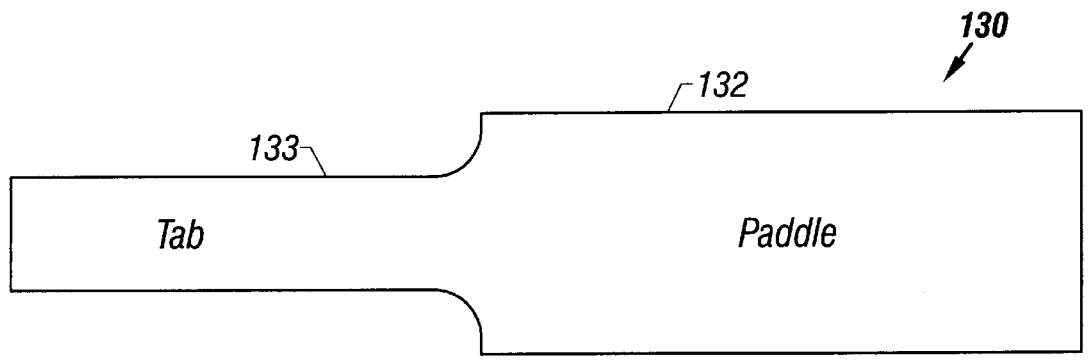

Still with reference to FIG. 28A, in a parallel path to preparing the impregnated carbon cloth strips, the foil current collectors are also prepared. A first step in preparing the foil current collectors is to precut aluminum foil to an approximate desired dimension (block 208), and then die cut the aluminum foil to the precise dimension (block 210). The preferred aluminum foil used for the current collector has a thickness of approximately 0.002 inches. The foil is cut to a shape substantially as shown in FIG. 24A which is very similar to the current collector foil of FIG. 10A, except that the tab portion is not offset from a central axis of the paddle portion. Such shape includes a paddle end 132 and a tab end 133. The tab end 133 and the paddle end 132 thus comprise a current collector foil 130 (sometimes referred to as the current collector plate). The current collector foil 130 is about ten inches long. The paddle end 132 is about 6 inches long, and the tab end 133 is about 4 inches long. The paddle end 132 has a width of about 2 inches, and the tab end has a width of about 1 inch.

Figure 24B:
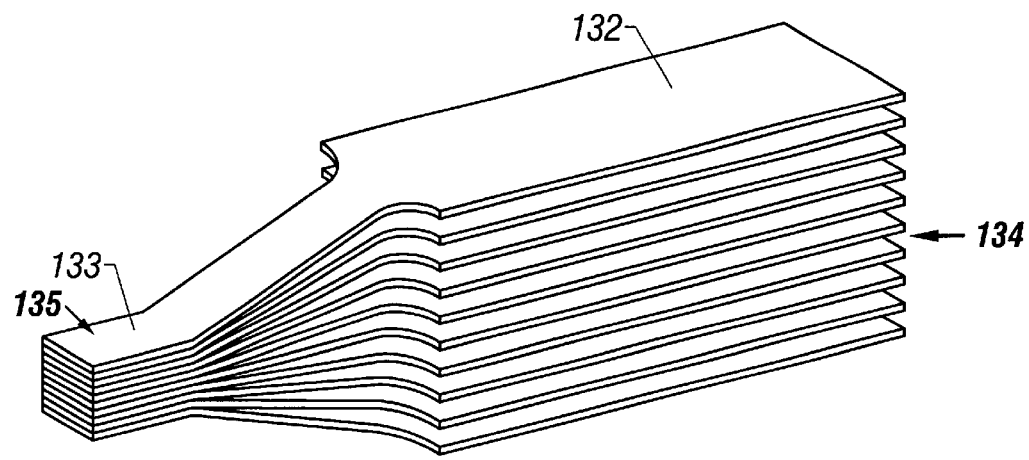
Figure 24C:
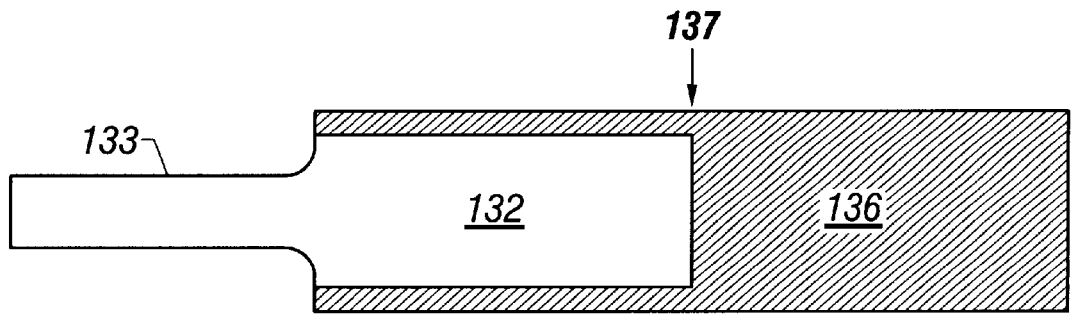
Figure 24D:
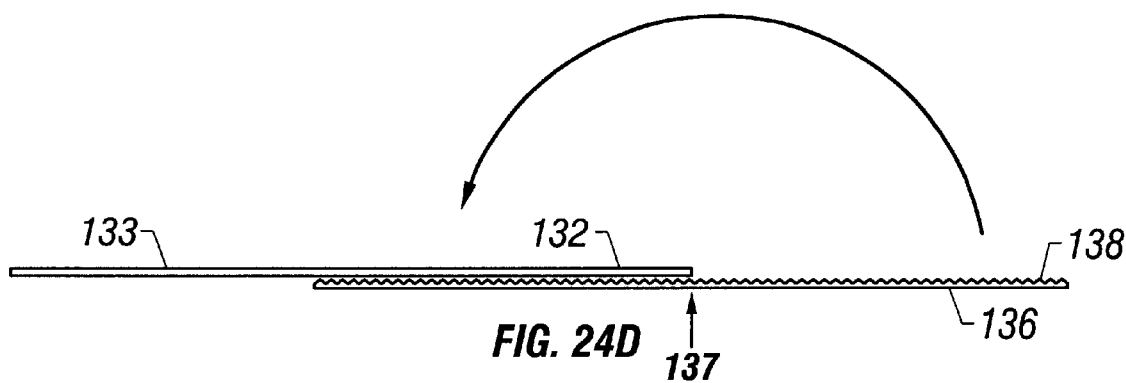

Two stacks of 25 current collector foils are next assembled (block 212, FIG. 28A) in the manner illustrated in FIG. 24B. In each stack, the tab ends 133 of the twenty-five collector foils 130 are bonded together, using any suitable bonding technique, such as sintering or ultrasonic welding, thereby forming a solid tab end 135 where each collector foil is thus electrically and mechanically connected in a secure manner to each of the other collector foils in the stack. In contrast, the paddle ends 132 of the collector foils 130 in the stack remain disconnected from the other paddle ends. Note, that "dummy foils" as discussed with reference to FIGS. 19C and 19D may be used during the ultrasonic welding process.

Referring back to FIG. 28A for the moment, it is seen that in addition to preparing the impregnated carbon cloths (blocks 200–206), and preparing the aluminum current collector foils 130 (blocks 208–212), insulator sleeves 140 (FIG. 24F) must also be prepared. Such insulator sleeves 140 function as the separator 66 (FIG. 4) in the double layer capacitor. The sleeves are made by precutting a suitable insulator/separator material (block 214, FIG. 28A), such as polypropylene or polyethylene, into strips. A suitable material for use as the separator is used, such as, Celguard 2400, as earlier described. The Celguard (or other separator material) is formed into sleeves or tubes (block 216, FIG. 28A) having a size that allows the sleeves to loosely slide over a current collector foil 130 which has an impregnated carbon cloth strip 136 folded around it, as shown in FIG. 24F. The edges of the Celguard may be securely bonded to each other in order to form the sleeve through use of any suitable sealing technique, such as thermal bonding, as is known in the art.

Once the current collector foils 130, the aluminum-impregnated carbon cloth strips 136, and the separator sleeves 140 have been formed or otherwise fabricated, an electrode package may be assembled (block 218, FIG. 28A). Such electrode package assembly involves wrapping or surrounding each of the foil paddles 132 of each electrode stack with the impregnated carbon cloth strips 136 in the manner illustrated in FIGS. 24C, 24D and 24E. As seen in these figures, the cloth strips 136 are folded at a central fold line 137, with the sprayed side of the cloth being placed against both sides of the paddle end 132 of the collector foils 130. Each collector foils in each of the two collector foil stacks has a folded cloth strip 136 placed over it in this manner, except for the topmost collector foil in one stack, and the bottommost collector foil in the other stack, which foils have a half of a cloth strip 136 positioned on the side of the collector foil that faces inward in the stack. The separator sleeves 140 are then placed over the combination of the carbon cloth strip 136 and the paddle end 132 of each of the collector foils 130 of one of the two collector foil stacks, e.g., Stack "B". The "leaves" of the two foil stacks (where a "leaf" comprises the collector foil and its accompanying carbon cloth strip), one having an separator/insulator sleeve 140 inserted over each leaf, and the other having no separator/insulator sleeve, are then interleaved with each other as depicted in FIG. 25A to form an interleaved electrode assembly 141. Alternatively, the separator sleeves 140 may simply comprise a piece of separator material folded against both sides of the paddle portions of Stack "B".

The completed electrode assembly 141 includes a flat stack of electrodes, e.g., 50 electrodes. Each electrode is made up of a current collector foil 130 that is surrounded by an aluminum-impregnated carbon cloth strip 136. Each carbon cloth strip is separated and electrically insulated from an adjacent carbon cloth stip by the separator material 140. Alternating electrodes are electrically connected in parallel by the bonded tabs 135 (Stack A) or 142 (Stack B) of the respective current collector foils.

Figure 24E:
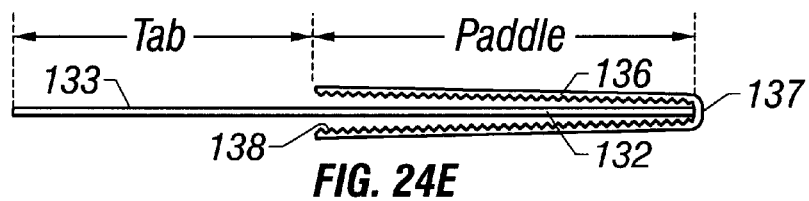

An alternative method of assembling the electrode assembly 141 is very similar to the process of assembling the winding assembly 1200 of FIG. 12. In this case, the electrodes formed in FIG. 24E are stacked such that the tab portions 133 generally face the opposite direction for adjacent electrodes. A contiguous separator sheet of Celguard is wrapped around and between each electrode and then wrapped around the electrode stack. The separator sheet wraps throughout the stack in the same serpentine manner as shown in FIGS. 11 and 12, except that the tab portions extend from opposite ends of electrode stack. Using this method, no separator sleeves are formed, since the separator sheet adequately insulates the adjacent electrodes. The tab portions 133 could be bonded together prior to winding the separator sheet or could be bonded together after the electrodes are stacked and wrapped. This alternative method is preferred since it eliminates the need to construct separator sleeves and eliminates the step of placing the separator sleeve over each electrode. Furthermore, this method is more conducive to an automated assembly procedure discussed below.

The assembly could also be automated as discussed with reference to FIG. 13. In this method, a reel of aluminum current collector foil material is unwound to be cut into current collector foils. A reel of impregnated carbon cloth is unwound and cut into strips which are then placed over the current collector foils. And a reel is unwound that contains the separator sheet is then folded over each electrode as it is stacked on top of the stack with the tab portion extending the opposite direction as the previous electrode. The stack is then wrapped one time with the separator material. The wrapped stack has a similar appearance as that shown in FIG. 12 or 25B.

Figure 25B:
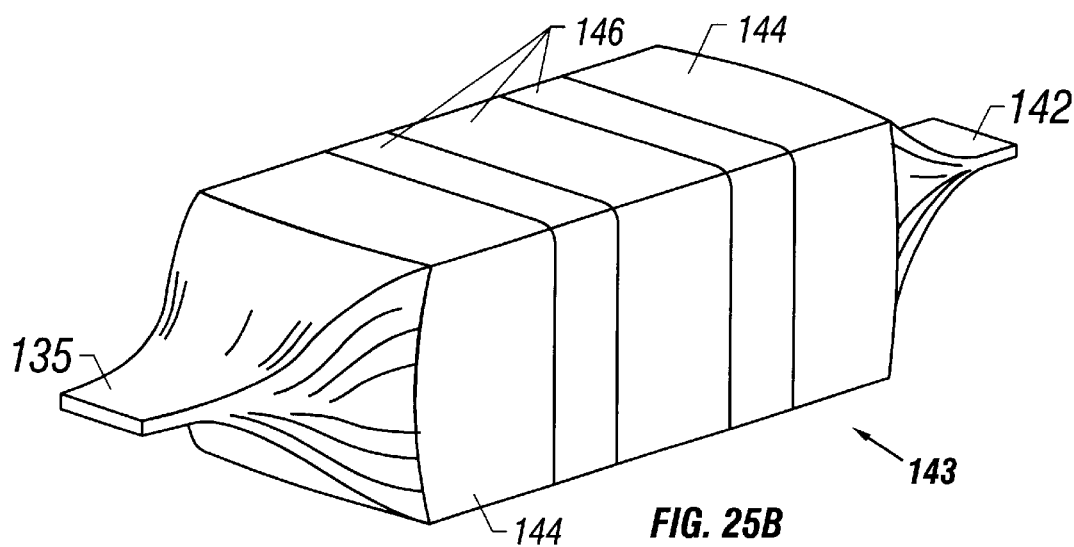
FIG. 25B depicts the electrode assembly of FIG. 25A after it is wrapped with a suitable insulator material to form an electrode package.
Figure 25C:
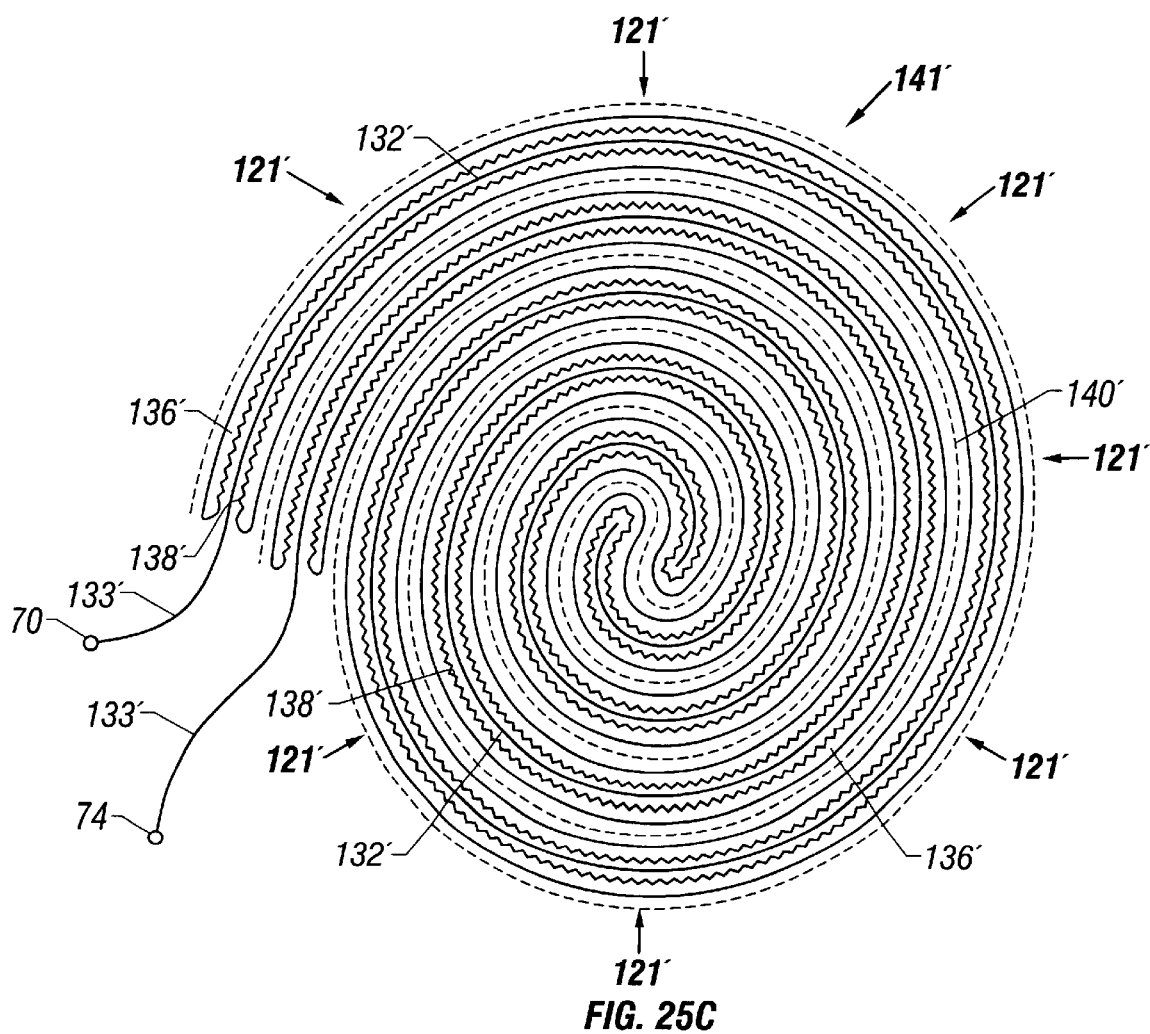
FIG. 25C depicts an alternate spiral wound configuration of the electrode assembly.

An alternate electrode assembly 141' that may be used in a spiral-wound embodiment of the invention is depicted in FIG. 25C. In FIG. 25C, two elongate current collector foils 136', each having a tab portion 133' that is connected to the appropriate capacitor terminals 70 and 74, and each having a corresponding elongate aluminum-impregnated carbon cloth 136' folded over it so that a sprayed side 138' of the cloth faces the foil 132', are spirally wound together. An insulator or separator sleeve 140' is placed over one of the foil/cloth electrodes of the wound assembly to prevent the electrodes from electrically shorting each other as they are wound together.

The length and width of the current collector foils 132' and the corresponding aluminum-impregnated carbon cloth electrodes 136' of the spiral-wound electrode assembly 141' embodiment shown in FIG. 25C may be chosen so that approximately the same electrode area is achieved as is achieved using the interleaved flat stack assembly 141 shown in FIG. 25A, or to achieve a desired performance criteria. An advantage of the spiral-wound assembly 141' is that it is somewhat easier to assemble and manufacture than the interleaved flat stack assembly 141. An advantage of the interleaved flat stack assembly 141, however, is that the resistance of the current collector foils may be lower (because it uses many parallel short current collectors as opposed to one long current collector). Additionally, the interleaved flat stack assembly 141 lends itself to more efficient use in a rectangular-shaped case, whereas the spiral-wound assembly 141' is best suited for use in cylindrical-shaped case. Depending on the application for which the capacitor is to be used, a rectangular-shaped case may prove more beneficial than a cylindrical-shaped case.

Returning to a description of the assembly of the interleaved flat stack assembly 141 (FIG. 25A), after the two electrode stacks have been interleaved to form the assembly 141, the entire assembly is wrapped in a suitable insulating material 144, such as Celguard. The insulating material 144 may be held in place with a suitable tape 146 which is also tightly wrapped around the assembly 141, thereby forming a wrapped flat stack electrode package 143. The current collector tabs 135 and 142 extend from each end of the package 143.

Figure 26:
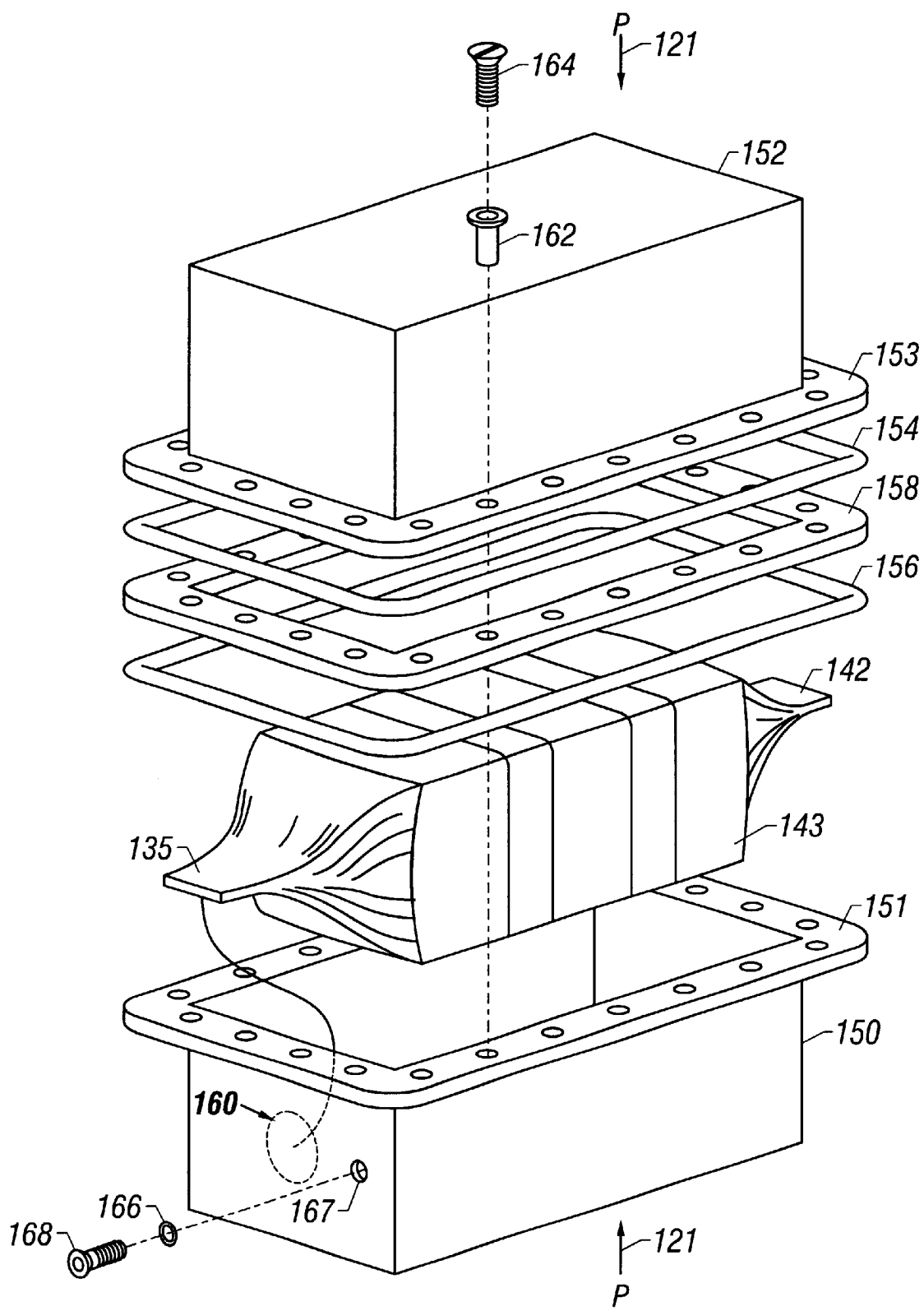
FIG. 26 is an exploded view of a "clamshell" double layer capacitor, illustrating how the electrode package of FIG. 25B is positioned inside of upper and lower conductive shells, which shells are tightly sealed one to the other to complete the capacitor assembly.
Figure 27A:
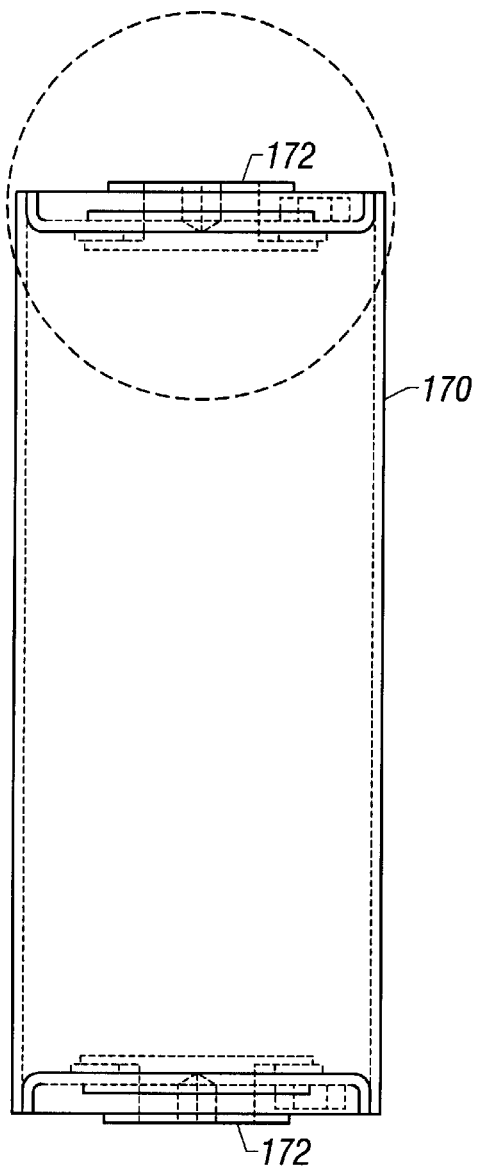
FIGS. 27A, 27B and 27C illustrate top, end, and end-sectional views, respectively, of an alternative capacitor case which may use either a conductive or a non-conductive case having capacitor terminals at each end of the case.

Once the flat stack electrode package 144 has been fabricated, the final mechanical assembly of the capacitor may be completed. Such mechanical assembly is illustrated in FIG. 26, which figure shows an exploded view of the physical components of the preferred double layer capacitor. Such components include a lower conductive shell 150 and an upper conductive shell 154. One of the tabs, e.g., tab 135, of the electrode package 143 is bonded to the inside of the lower shell 150 at location 160. The other tab, e.g, tab 142, of the electrode package 143 is bonded to the inside of the upper shell 152 at a corresponding location. Such bonding (block 224, FIG. 28A) may be achieved using any suitable bonding technique, such as spot welding, ultrasonic welding, or the like. The bond must, of course, be a low resistance bond, having a resistance of no more than about 5 $\mu\Omega$, if the overall low electrode resistance $R_{EL}$, of the capacitor is to be maintained.

Once the tabs of the electrode package 143 have been bonded to the respective upper and lower conductive shells, the capacitor case assembly is closed (block 226, FIG. 28A) by attaching and sealing the upper shell 152 to the lower shell 150 using any suitable attachment/sealing technique. Note that the upper and lower shells, in combination, comprise the case of the capacitor assembly. A preferred technique for closing the case of the capacitor, shown in FIG. 26, uses screws 164, in combination with insulating nylon bushings 162, to securely fasten a flange 153 of the upper shell 152 to a corresponding flange 151 of the lower shell 150. To assure a good seal when the flanges of the upper and lower shells are joined together, an O-ring 154 fits within a groove around the periphery of the flange 153, and another O-ring 156 fits within a similar groove around the periphery of the flange 151. Further, a polypropylene gasket 158 electrically insulates the two shells from each other.

Because, like clamshells, the case of the capacitor is closed by fastening the upper shell 152 fastened to the lower shell 150, the packaging configuration depicted in FIGS. 24A through 26 is sometimes referred to by the applicants as the "clamshell" assembly or the "clamshell" design.

An important feature of the "clam-shell" assembly shown in FIG. 26 is that the electrode package 143, in its wrapped and interleaved form, has somewhat larger dimensions than the inside dimensions of the upper and lower shells. However, because the carbon cloth is somewhat spongy, it is compressed sufficient to fit within the closed upper and lower shells. Hence, the package 143 remains slightly compressed as it placed inside of, and maintained within, the upper and lower shells. This results in the electrode package 143 being maintained under a constant modest pressure of about 10 psi when the upper shell 152 and the lower shell 150 are mechanically joined together. This continual modest pressure further serves to lower the contact and electrode resistance of the electrode assembly because it keeps the current collector foils 130 in firm mechanical contact with the sprayed side of the respective impregnated carbon cloth strips 136. The presence of such constant modest pressure is represented in the drawings by the arrows 121 which symbolically represent that the electrode assembly 141 is maintained under a constant modest pressure, "P" applied in a direction so as to force or press the electrodes in contact with the current collector foils (see FIG. 25B). Shims, such as those used in the prismatic design of FIGS. 8A through 21B may be used to apply the modest pressure as well. For the spiral-wound assembly 141', shown in FIG. 25C, the constant modest pressure "P" is applied in a radial direction, as illustrated by the arrows 121'. While the modest pressure is about 10 psi, in practice the pressure may vary anywhere from about 5 psi to 18 psi. The structural design of the upper and lower shells (or other capacitor case), while not comprising a pressure vessel per se, is nonetheless designed to withstand an internal pressure of up to about 20 psi.

An important component needed to complete the capacitor assembly is a means for filling the closed assembly with a suitable electrolytic solution, and then permanently sealing the assembly. To this end a seal plug 168, which is threadably received into a fill hole 167 located at one end of the lower shell 150, is provided, as seen in FIG. 12. An O-ring gasket 166 is used with the plug 168 is order to effectuate the seal. A similar fill hole (not shown) is located at the other end of the upper shell 152. Using two fill holes facilitates moving gases and fluids into and out of the closed assembly.

Referring again to FIG. 28A, once the case assembly has been closed (block 226), it is tested for electrical shorts. This test is performed simply by measuring the resistance between the two shells (or halves of the case) in FIG. 26, each of which is conductive, function as the electrical terminals of the capacitor. In an ideal capacitor, this resistance (for a "dry" assembly—no electrolyte yet introduced into the closed case) should be infinite. A low resistance measurement, e.g., of just a few ohms, between the upper and lower shells of the closed dry assembly, indicates that an electrical short has occurred internal to the assembly. In practice, a dry resistance of at least 20 M$\Omega$ is acceptable to pass this test for electrical shorts.

Still with reference to FIG. 28A, it is noted that a step previously performed before bonding the foil tabs to the case shells (block 224) comprises forming or otherwise fabricating the bottom shell 150 and the top shell 152 (block 220). In the presently used embodiment, the shells are each machined from a solid block of aluminum. The outside dimensions of the closed assembly, including the flanges 151 and 153 are 2.25 inches high by 2.62 inches wide and 5.60 inches long. The body of the case (not including the flanges) has a width of about 2.18 inches, which means the flanges 151 and 153 extend out from the body of the case about 0.22 inches. The internal volume of the capacitor case is about 375 cm$^3$, and the case weight is about 200 g.

As previously indicated, for the clamshell configuration shown in FIG. 26, the upper and lower shells function as the two terminals of the capacitor. It is contemplated that shells made using relatively inexpensive stamped and/or pressed copper-clad aluminum, as opposed to more-expensive machined aluminum blocks, may be used in the future. Copper-clad aluminum is preferred for this purpose, as opposed to aluminum, because it will provide a lower external contact resistance when several of the capacitors are stacked together. Using stamped and/or pressed materials to form the shells of the capacitor assembly advantageously reduces the weight of the case to about 100 g, and increases the energy density from about 2.9 W-hr/kg to about 3.5 W-hr/kg.

It should also be noted that alternative packaging schemes are also contemplated for the invention. For example, a double-ended capacitor design, shown in FIGS. 27A, 27B and 27C, may be used. The double-ended configuration shown in FIGS. 27A, 27B and 27C includes an elongated capacitor case 170 having a generally square cross-section, that has a terminal 172 at each end of the package. The terminal 172 preferably includes a threaded hole 173 to which a threaded screw or bolt may be attached. The material of the case 170 may be conductive or non-conductive. If conductive, the terminals are electrically insulated from the case by the 176 and 178. The terminal 172 is attached to each end of the double-ended assembly using a nut 174. A washer and/or gasket 176 may be used with the nut 174 to firmly secure the terminal in place and provide electrical insulation from the case when needed. An insulating gasket 178 is used on the inside of the case to seal the terminal 172 and prevent leaks. During assembly of the double-ended design, the tabs 135 and 142 of the flat stack internal electrode package 143 (FIG. 25B) are bonded to the inside of the terminals at each end of the case 170.

Figure 27B:
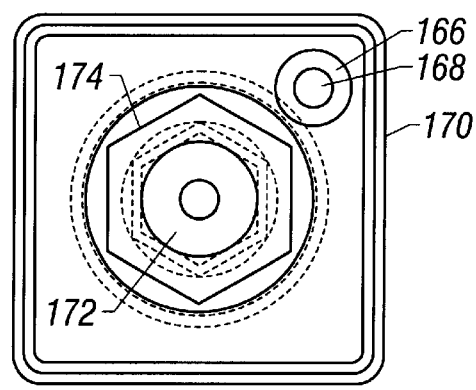
Figure 28A:
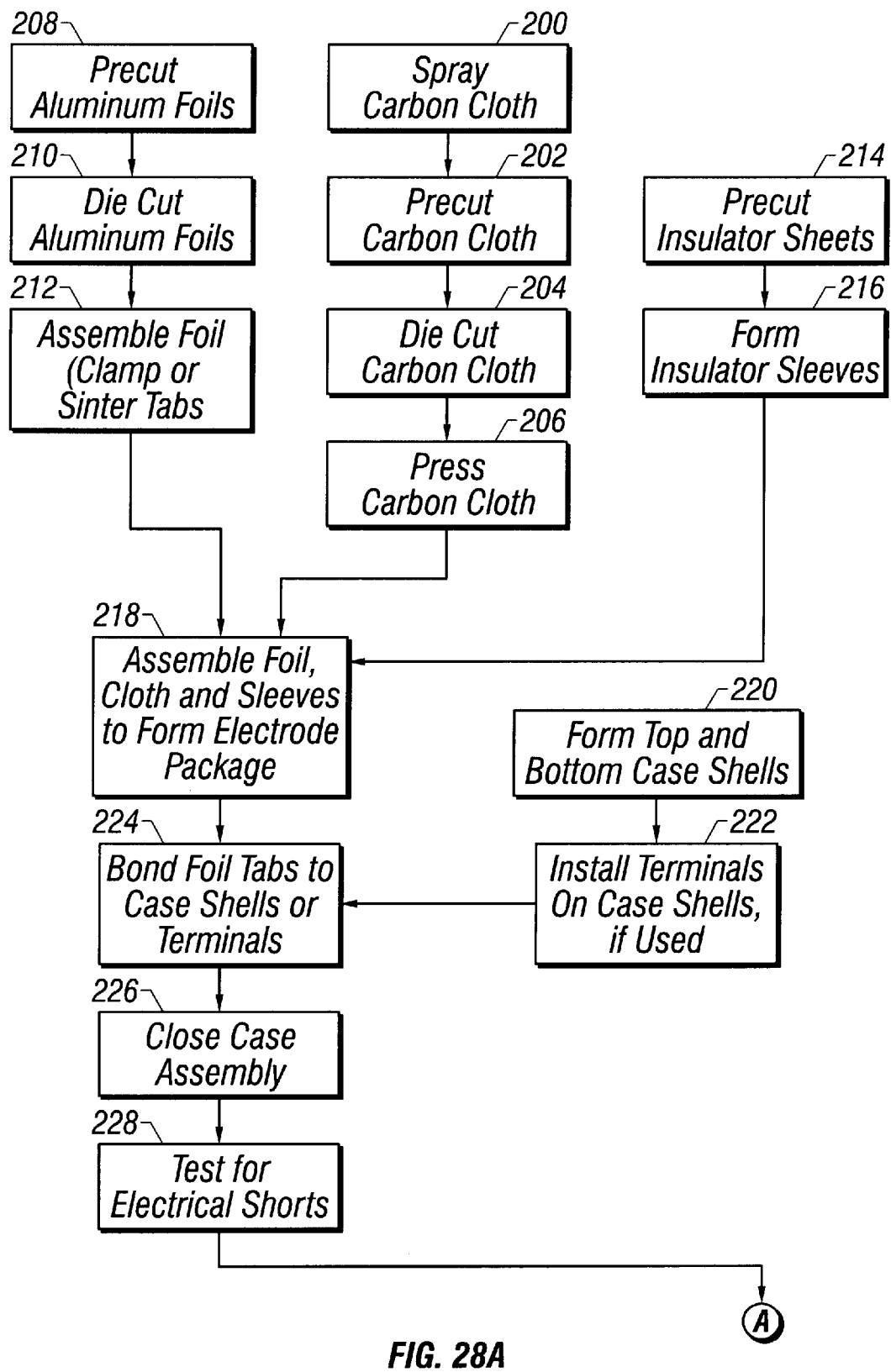
FIGS. 28A and 28B are a flow chart that illustrates the method of making and assembling the "clamshell" double layer capacitor shown in FIG. 24A through FIG. 26.
Figure 28B:
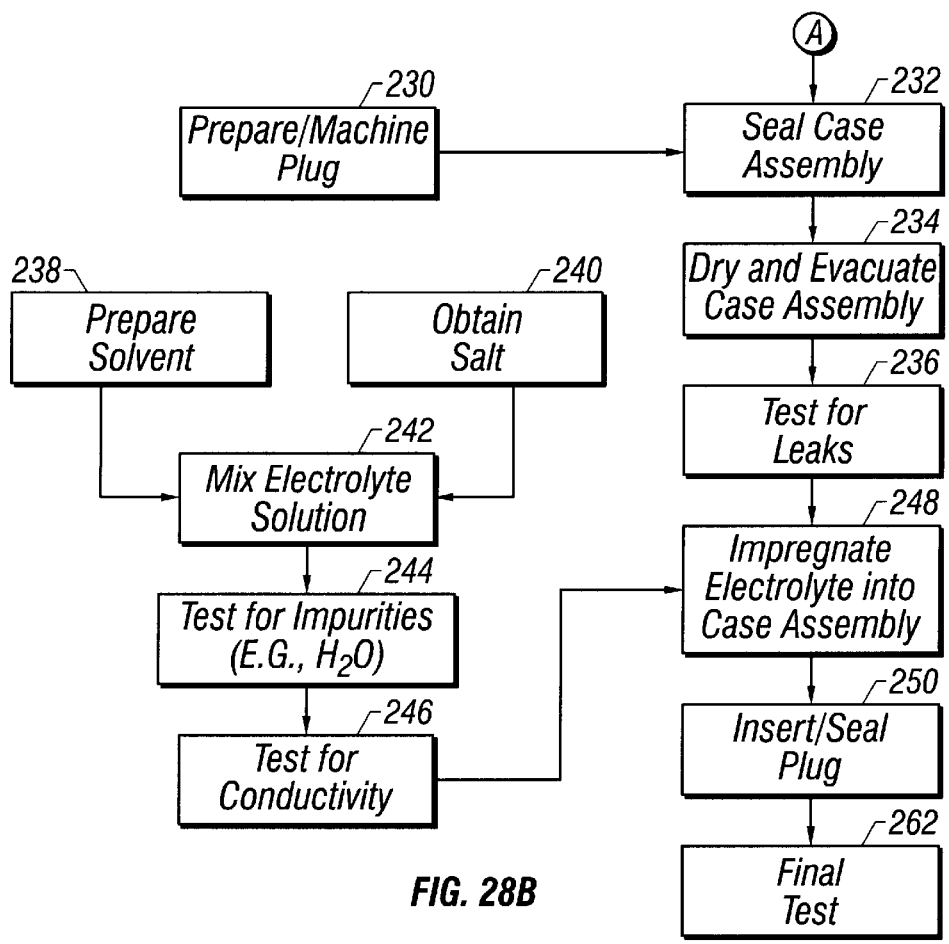

Note that a seal plug 166 and gasket 168 are made available at at least one end of the double ended capacitor, as shown in FIG. 27B. Preferably, a seal plug is made available in both ends of the capacitor to facilitate filling the assembly with the electrolytic solution.

Figure 27C:
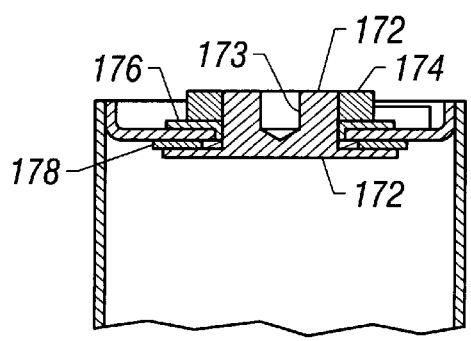

The main advantage of the double-ended configuration shown in FIGS. 27A, 27B, and 27C is that the shell material need not be a conductor (although it can be), but may be a suitable light-weight non-conductive material, such as plastic. The overall weight of the case of the double-ended capacitor shown in FIGS. 27A, 27B and 27C may thus be made significantly less than the weight of the capacitor case for the capacitor configuration shown in FIG. 26. The weight of the case is important because it contributes directly to the energy density of the capacitor.

Because some alternative packaging schemes may include terminals, as illustrated above in connection with FIGS. 27A, 27B and 27C, the flow diagram of FIG. 14A includes the step of installing the terminals on the case, if such terminals are used (block 222).

Turning next to FIG. 28B, once the capacitor has been assembled as shown in FIG. 26 (or FIG. 27A, 27B or 27C), and tested for electrical shorts (block 228, FIG. 28A), the case assembly is sealed (block 232), as required, or made sealable, using the seal plug 168 and gasket 166. The sealable case is then evacuated and the internal components are thoroughly dried (block 234). Such drying process typically takes place over a 2 or 3 day period, and comprises attaching a vacuum pump to the closed assembly, via the fill hole 167 (FIG. 26), and maintaining a constant negative pressure of about $10^{-6}$ Torr for a specified period of time, e.g., 48 to 72 hours. Once dried, the assembly is tested for leaks (block 236). Such leak testing may be done using any suitable technique as is known in the art. A preferred leak test includes spraying an inert gas, e.g., helium (He), over and around the closed case while it is still connected to the vacuum pump, and while a negative pressure is still maintained within it. If there is a leak, the negative pressure inside the case sucks the He gas through the leak, and the He gas can then be detected in the outstream flow of the vacuum pump.

If the leakage test is successfully passed, then the case is ready to be impregnated, through the fill hole, with a prescribed amount of a specified electrolytic solution (block 248).

The steps 238–246 in FIG. 28B are the same as those discussed in steps 2238–2246 in FIG. 22B. See FIG. 22B for further details.

After the prescribed amount of electrolytic solution has been impregnated into the closed case, the plugs 168 are inserted into the fill holes 167 to finally seal the case (block 250; FIG. 28B). Then, final electrical tests of the capacitor are performed (block 262) to test whether the capacitor meets its specified performance criteria.

The final acceptance tests performed are detailed in Appendix A, attached hereto and incorporated herein by reference. (In this regard, it is noted that the flat stack clamshell capacitor design described herein, and shown in FIG. 12, is referred to in Appendix A as the "UC3000".) Generally, the acceptance tests include charging the capacitor to is specified working voltage, $V_W$, for six hours and then allowing the capacitor to self-discharge over a fourteen hour period. The voltage drop that occurs during this 14 hour self-discharge period provides a measure of the equivalent parallel resistance of the capacitor, which should be at least 200 ohms, preferably over 350–400Ω, e.g., at least 360Ω. (A self-discharge resistance of 200Ω corresponds to a self-discharge time constant of at least 5.8 days.)

Figure 29:
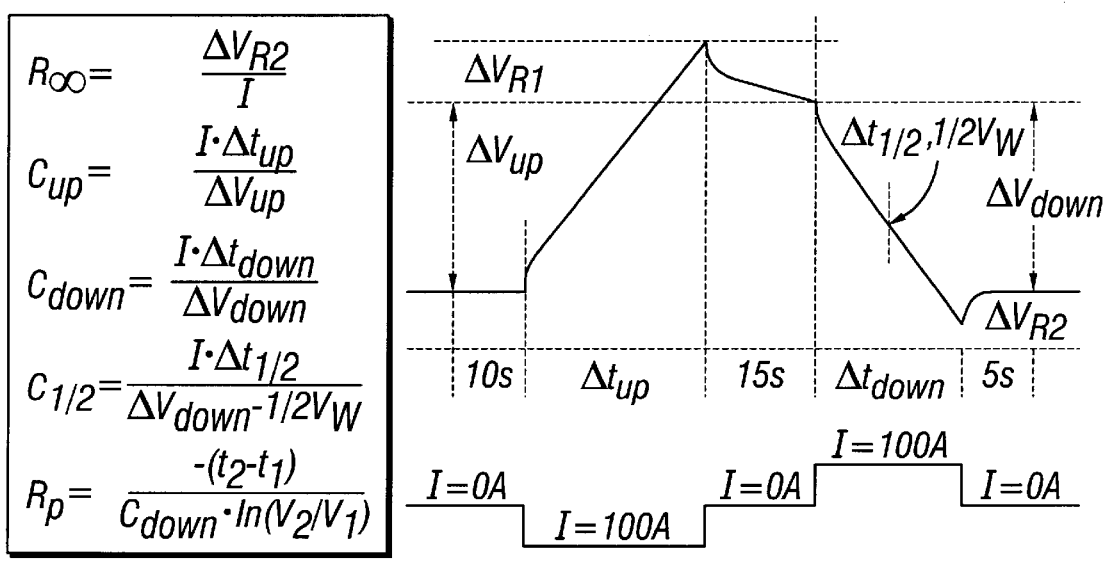
FIG. 29 depicts current and voltage waveforms associated with testing a double layer capacitor made in accordance with FIGS. 22A, 22B, 28A, and 28B.

Additional acceptance tests that are performed include subjecting the capacitor to a constant current cycle test to determine the cycling capacitance and steady state series resistance. This test is performed by applying a biphasic 100 amp and/or 200 amp current to the capacitor as shown in FIG. 29. The voltage waveform resulting from application of the current is measured. From the current and voltage waveforms, which includes time measurements, a large number of parameters are determined to characterize the capacitor. Such parameters include the charge capacitance, $C_{up}$; the discharge capacitance, $C_{down}$; the half discharge capacitance, $C_{1/2}$, and the steady state resistance, $R_\infty$. In order to meet presently-imposed desired performance criteria, these values should be $C_{down}$>2200 Farad, $C_{1/2} \geq C_{down}$ by about 150 Farad; $R_\infty$<1 milliohm, $C_{up}/C_{down}$>0.98; and $C_{down}/C_{up}$<1.05.

For the first group of single cell, multi-electrode double layer capacitors that have been made in accordance with the present invention, i.e., using the clamshell design shown in FIG. 26, the acceptance test data is as shown in Table 3.

TABLE 3

| Parameter | Value | Std. Deviation |
|---|---|---|
| $C_{down}$ | 2422 f | 44.6 f |
| $R_\infty$ | 0.908 mΩ | 0.058 mΩ |
| $C_{up}/C_{down}$ | 1.01 | |
| $R_{parallel}$ | 387 Ω | 53 Ω |

The final acceptance tests also include ac impedance tests. The extremely low impedance of the double layer capacitor makes the ac impedance measurements difficult using standard equipment and techniques. The key parameter to measure is the initial resistance, $R_0$. This resistance affects the peak power the capacitor can deliver. It is measured at 1000 Hz using a Solatron 1250 Frequency Response Analyzer and a PARC 273 Poteniostat. $R_0$ should be about one-half of the value of $R_\infty$, or about 0.45 mΩ.

At described above, it is thus seen that the single cell, multi-electrode double layer capacitor provided by the present invention represents a significant advance in the double-layer capacitor art. The use of carbon cloth impregnated with aluminum, folded around a current collector foil plate, forms an efficient electrode structure that provides very low electrode resistance. By connecting a large number, e.g., twenty-five, of such electrodes in parallel in a first electrode stack, and interleaving the electrodes of the first electrode stack with a second electrode stack wherein each electrode is further surrounded by a suitable separator/insulator electrode sleeve, and then by packaging such interleaved electrode package within a sealed case that maintains the electrode package under a modest pressure, and then by further impregnating the sealed case with a prescribed amount of highly-conductive non-aqueous electrolyte, a double layer capacitor is realized that exhibits capacitance values in excess of 2200 Farad at a nominal working voltage of about 2.3 volts, an electrode resistance of about 0.8 m$\Omega$, a time constant of about 2 seconds, an energy density in the range of 2.9–3.5 W-hr/kg, and a power rating of over 1000 W/kg at a 400 Amp discharge. Advantageously, these operating parameters can improve even more when the capacitor is operated at a higher voltage, e.g., 2.7 volts, or even 3.0 volts (which can be readily be done once all the impurities are removed from the electrolytic solution) and the weight of the case is reduced. For example, at an operating voltage of 3.0 volts, the energy density rises to 5.9 W-hr/kg. Further, by using a polyethylene separator material, instead of a polypropylene separator, the effective electrode resistance may be reduced even further, allowing the time constant of the capacitor to be reduced to around 1.5 seconds.

While the invention described above has been described by means of specific embodiments and applications thereof, numerous modifications and variations could be made thereto by those of skill in the art without departing from the scope of the invention set forth in the claims.

Attorney Docket No. 69958

LOW RESISTANCE BONDING IN
A MULTI-ELECTRODE DOUBLE LAYER CAPACITOR
HAVING SINGLE ELECTROLYTE SEAL AND
ALUMINUM-IMPREGNATED CARBON CLOTH ELECTRODES

APPENDIX A

Acceptance Test Procedures for
UC3000 (Clamshell) Double Layer Capacitor

UC-3000 Acceptance Test Procedures

Each UC-3000 is subjected to two acceptance tests, a constant current charge and discharge cycle test and a self-discharge rate test. Electrical performance is determined from these tests and benchmarked against minimum performance values. All electrical tests are performed at 20 °C. The procedures and fixtures needed for conducting each test are described below.

UC-3000 Test Fixture

In order to standardize testing procedures, a special test fixture is used in testing the UC-3000. FIG. A1 is a diagram of this testing fixture. The UC-3000 module is placed between the two copper connection plates. The aluminum case of a UC-3000 serves as the negative and positive terminals of the cell. The top half-case serves as one terminal, and the bottom half-case serves as the opposite terminal. The device is non-polar so it can be charged in either direction. (It is recommended that once a polarity is chosen, the same polarity is kept during operation. This is true because there may be some long term-life issues associated with reversing the polarity.) An insulating gasket has been used to electrically isolate the two half-cases, thereby preventing an electrical short circuit. Non-conducting support plates are used to apply a modest amount of pressure to ensure good electrical contact. Each copper connection plate has two copper posts welded to the back side. These posts allow a four terminal resistance measurement to be made. On each plate, one post is used to supply current to the cell, the other is used to measure the voltage. This configuration during measurement eliminates inclusion of unwanted contact resistances.

Self-Discharge Test Procedure

The self-discharge characteristics of the UC-3000 are measured by placing the device in the Test Fixture and charging to the working voltage, $V_w$, for 6 hours. The capacitor is then allowed to self-discharge over a fourteen hour period. The equivalent parallel resistance, $R_p$, is calculated from the voltage drop that occurs starting after the first hour through the fourteenth hour. The resistance is calculated from the following equation:

$$R_p = \frac{-(t_2 - t_1)}{C_{down} \cdot \ln(V_2/V_1)} \qquad [1]$$

where:
  $t_1$ is the initial time in seconds (about one hour into the test)
  $t_2$ is the final time in seconds (about fourteen hours into the test)
  $V_1$ is the voltage at $t_1$
  $V_2$ is the voltage at $t_2$
  $C_{down}$ is the discharge cycling capacitance The value of $R_p$ must be at least 200 ohm. This value corresponds to a self-discharge time constant of at least 5.8 days. A regulated power supply, preferably with a maximum current of more than 10 amps, a timer, and a volt meter are needed to conduct this test.

Constant Current Cycling Test

After the self-discharge test has been completed a constant current cycle test is used to determine cycling capacitance and steady state series resistance. FIG. A2 shows a typical current and voltage versus profile from a single cycle from this test. The capacitor is cycled at 100 and 200 amp, and the charge capacitance is calculated using the following equation (see the diagram for a definition of the symbols):

A2

$$C_{up} = \frac{I \cdot \Delta t_{up}}{\Delta V_{up}} \qquad [2]$$

Similarly, the discharge capacitance is calculated from:

$$C_{down} = \frac{I \cdot \Delta t_{down}}{\Delta V_{down}} \qquad [3]$$

Because the capacitance is voltage dependent in the UC-3000, increasing with voltage, and most applications discharge the capacitor to half voltage, the capacitance is also measured over the top half of the voltage profile. The half discharge capacitance is calculated from the following equation:

$$C_{\frac{1}{2}} = \frac{I \cdot \Delta t_{\frac{1}{2}}}{\Delta V_{down} - \frac{1}{2}V_w} \qquad [4]$$

The steady state resistance, $R_{ss}$, is measured from the voltage recovery 5 seconds after the current is shut-off. The calculation can be expressed as:

$$R_{ss} = \frac{\Delta V_{R2}}{I} \qquad [5]$$

The UC-3000 must meet the following criteria to pass the constant current acceptance test:

$C_{\frac{1}{2}}$ > 2300 farad
$C_{down}$ > 2200 farad
$R_{ss}$ < 1.2 mohm
$C_{up}/C_{down}$ > 0.98; and Cup/Cdown < 1.05
$\Delta V_{R1}/I \cdot R_{ss}$ > 0.99; and $\Delta V_{R1}/I \cdot R_{ss}$ < 1.20

A Bitrode Model FT Battery Cycler driven by a PC computer are used to conduct these tests.

AC Impedance Tests

AC impedance techniques are being developed to measure the frequency dependence of the capacitance and resistance. The extremely low impedance of the UC-3000 makes this measurement difficult using standard equipment and techniques. The key parameter that should be measured from this test is the initial resistance, $R_o$. This resistance will effect the peak power the device can deliver. Currently, the impedance can be measure from 0.001 to 10 Hz. To measure the initial resistance accurately, the frequency needs to be increased to 1,000 Hz. Each UC-3000 is characterized using AC impedance, but it is not used as an acceptance test at this time. Typically, the value of $R_o$ is one half the value of $R_{ss}$. A Solatron 1250 Frequency Response Analyzer with a PARC 273 Potentiostat are used to conduct these test.

Test Reporting

FIG. A3 is the data sheet that is used to record the data for each UC-3000. It contains the electrical performance, acceptance criteria, and results of the acceptance tests.

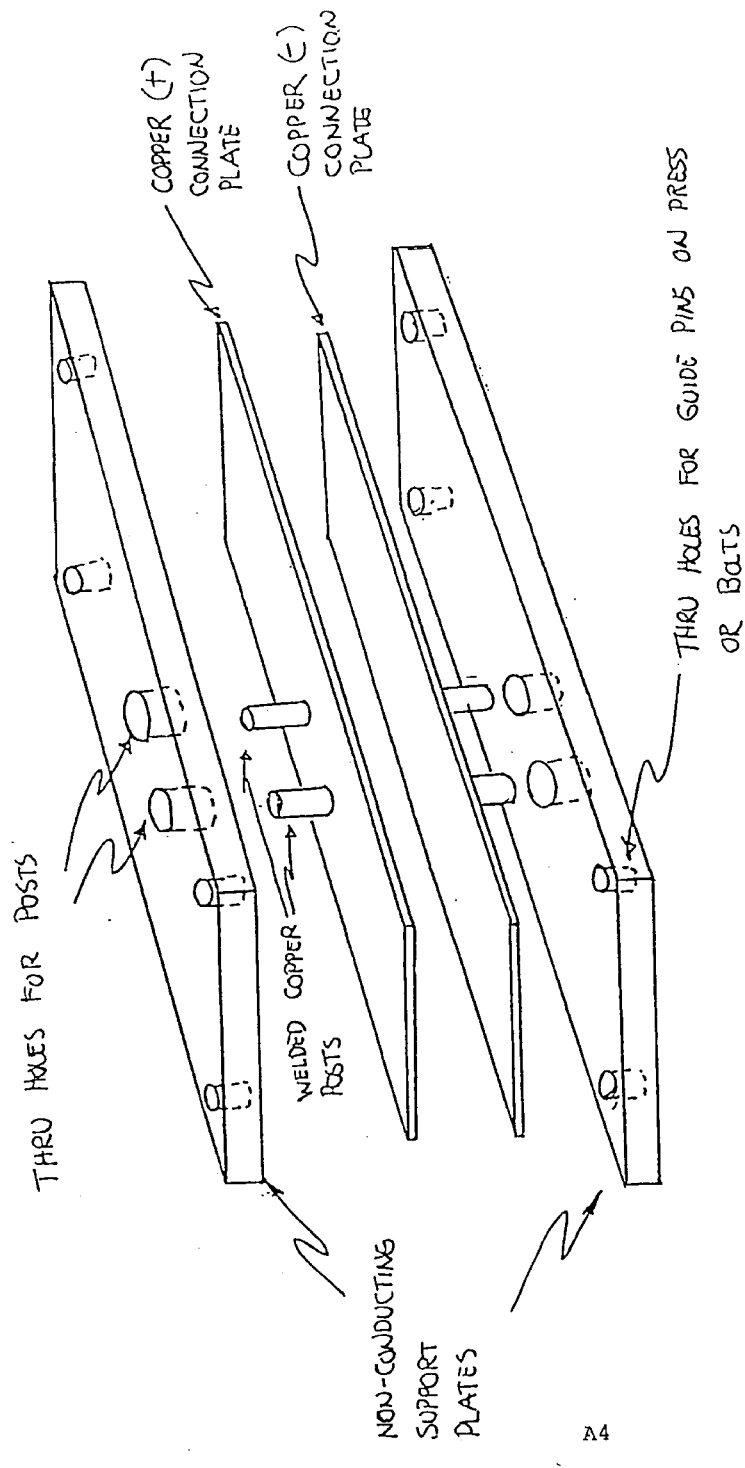
FIG. A1

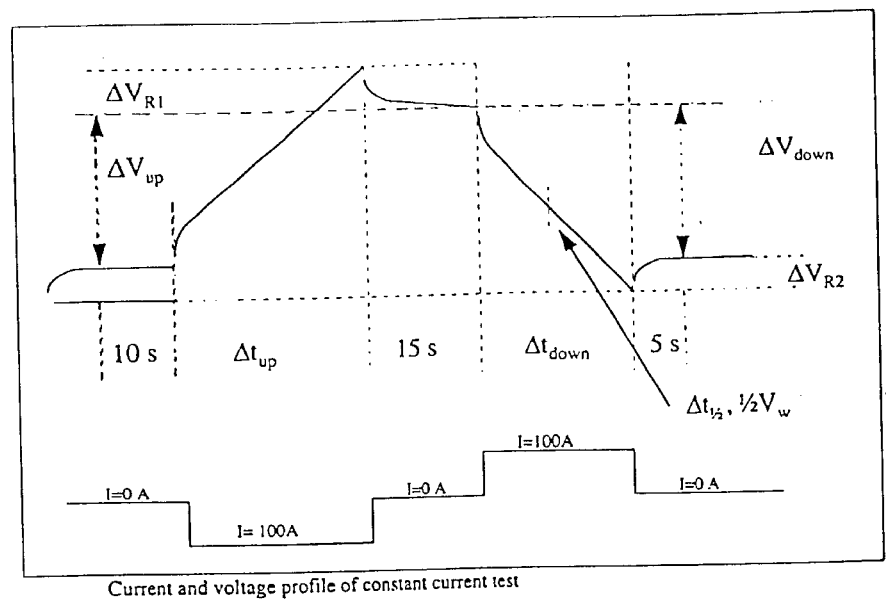
Current and voltage profile of constant current test
FIG. A2

UC-3000 Acceptance Data Sheet

| Model No. | | Serial No. | | | |
|---|---|---|---|---|---|
| *Electrical Tests at 20 °C* | | Date | | *Weight (g)* | |
| Self-discharge[a] | Time (s) | | Voltage (V) | Leakage Current at t=0 | |
| 0 hour-OC | | | | $R_p$ (ohm) | |
| 1 hour | $t_1=$ | | $V_1=$ | | |
| 14 hour | $t_2=$ | | $V_2=$ | | |
| Acceptable Level | $R_p=200$ ohm | | | Passed____ Failed____ | |
| Constant Current[b] | Data File | $C_{up}$(F) | $C_{down}$(F) | $R_\sim$ (mohm) | $C_{up}/C_{down}$ | $\Delta V_{R1}/I \cdot R_\sim$ |
| 100 amp to Vw | | | | | | |
| 200 amp to Vw | | | | | | |
| Acceptable Value | Test | >2350 | >2,200 | <1.10 | $0.98 < C_{up}/C_{down} < 1.05$ | $0.99 < \Delta V_{R1}/I \cdot R_\sim < 1.20$ |
| | Pass/Fail | | | | | |
| AC Impedance | Real @ 0V (ohm) | | Imaginary @ 0V (ohm) | | |
| 0.01 Hz | | | | | |
| 0.10 Hz | | | | | |
| 1.00 Hz | | | | | |
| 10.0 Hz | $R_o=$ | | | | |

[a] charge for 6 hour at $V_w$   [b] 3rd cycle

Acceptance Datasheet

FIG. A3

What is claimed is:

1. An ultrasonically bonded electrical interconnection for use in a double layer capacitor comprising:
   ten or more current collector foils bonded together; and
   at least one dummy collector foil bonded to the ten or more current collector foils.

2. The interconnection of claim 1 wherein said ten or more current collector foils comprise twenty-five or more current collector foils.

3. The interconnection of claim 1 wherein each of said at least one dummy collector foil comprises a portion of respective ones of said ten or more current collector foils, wherein other ones of said ten or more current collector foils do not have a respective portion.

4. The interconnection of claim 1 wherein each of said at least one dummy collector foil comprises an extra portion of a respective one of said ten or more current collector foils, wherein the extra portion is folded over others of the ten or more current collector foils.

5. The interconnection of claim 1 wherein the at least one dummy collector foil is positioned on a portion of a stack of the ten or more current collector foils where a high frequency horn is used to bond the ten or more current collector foils and the at least one dummy collector to each other.

6. The interconnection of claim 1 wherein said ten or more current collector foils and said at least one dummy collector foil are bonded together proximate to one end of the ten or more current collector foils.

7. The interconnection of claim 1 wherein each of the ten or more current collector foils and said at least one dummy collector foil comprise aluminum.

8. The interconnection of claim 1 wherein the ten or more current collector foils have a first length and the at least one dummy collector foils has a second length, wherein the first length is greater than the second length.

9. The interconnection of claim 1 wherein each of the ten or more current collector foils comprise a portion of a tab portion of a current collector foil also having a paddle portion.

10. The interconnection of claim 9 wherein the at least dummy collector foil has a length less than a length of the tab portion of each of the ten or more current collector foils.

11. The interconnection of claim 1 wherein the ten or more current collector foils are ultrasonically bonded together and the at least one dummy collector foil bonded is ultrasonically bonded to each other and to the ten or more current collector foils.

12. The interconnection of claim 11 wherein the at least dummy foil is damaged from being ultrasonically bonded.

* * * * *